United States Patent [19]

Nakagawa et al.

[11] Patent Number: 5,045,664
[45] Date of Patent: Sep. 3, 1991

[54] MACHINE TOOL WITH GRINDING FUNCTION AND TRUING/DRESSING METHOD OF GRINDING STONE USING IT

[75] Inventors: Takeo Nakagawa, 223-4, Ichinotsubo, Nakahara-ku, Kawasaki-shi, Kanagawa-ken; Kiyoshi Suzuki, Kanagawa; Tetsutaro Uematsu, Tokyo; Norihiko Shimizu; Sakae Hatano, both of Aichi; Munetada Kurita, Gifu; Kanji Sato, Aichi; Yoshiharu Takada, Chiba, all of Japan

[73] Assignees: Yamazaki Mazak Corporation, Aichi; Takeo Nakagawa, Kanagawa, both of Japan

[21] Appl. No.: 550,794

[22] Filed: Jul. 9, 1990

Related U.S. Application Data

[63] Continuation of Ser. No. 277,883, Aug. 3, 1988, abandoned.

[30] Foreign Application Priority Data

| | | |
|---|---|---|
| Aug. 3, 1987 [JP] | Japan | 62-194031 |
| Aug. 3, 1987 [JP] | Japan | 62-194032 |
| Aug. 3, 1987 [JP] | Japan | 62-194033 |

[51] Int. Cl.⁵ .............................................. B23H 1/00
[52] U.S. Cl. ................................... 219/69.2; 219/69.15
[58] Field of Search ............... 219/69.12, 69.15, 69.17, 219/69.2; 51/5 D; 125/11 R; 82/49, 120, 121

[56] References Cited

U.S. PATENT DOCUMENTS

| | | | |
|---|---|---|---|
| 2,827,037 | 3/1958 | Wallace et al. | 125/11 R |
| 3,122,628 | 2/1964 | Inoue | 219/69.2 |
| 3,398,253 | 8/1968 | Rye | 125/11 R |
| 4,316,071 | 2/1982 | Bonga | 219/69.15 |
| 4,731,954 | 3/1988 | Lilieufein | 125/11 R |
| 4,849,599 | 7/1989 | Kuromatsu | 219/69.17 |

FOREIGN PATENT DOCUMENTS 1093460  5/1984  U.S.S.R. .......................... 219/69.12

Primary Examiner—Geoffrey S. Evans
Attorney, Agent, or Firm—Wenderoth, Lind & Ponack

[57] ABSTRACT

A machining tool is provided with an electric discharge truing/dressing apparatus comprising a spindle stock for containing and supporting a workpiece spindle which is driven for rotation while holding a workpiece or an electrode; a tool rest which moves parallel and perpendicular to the spindle of the spindle stock and holds an electrode machining tool and a grinding wheel; a feed electricity means disposed between a workpiece supporting portion of the spindle and the tool rest; a magazine disposed at an outside area of a machining area of the tool rest and adapted to store the workpiece and the electrode; and a loading device disposed between the magazine and the spindle. The grinding wheel on the tool rest is subjected to truing/dressing by feeding the electrode from the magazine to the spindle stock.

16 Claims, 30 Drawing Sheets

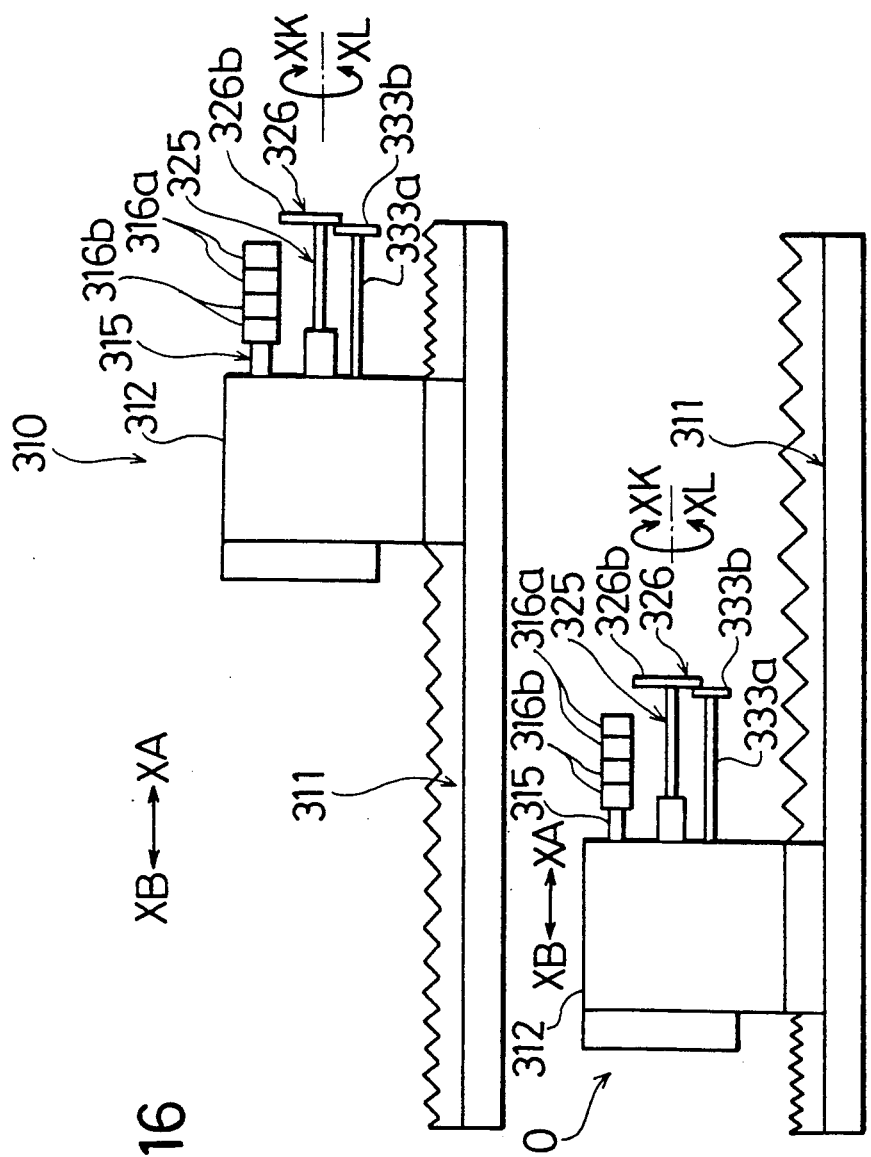

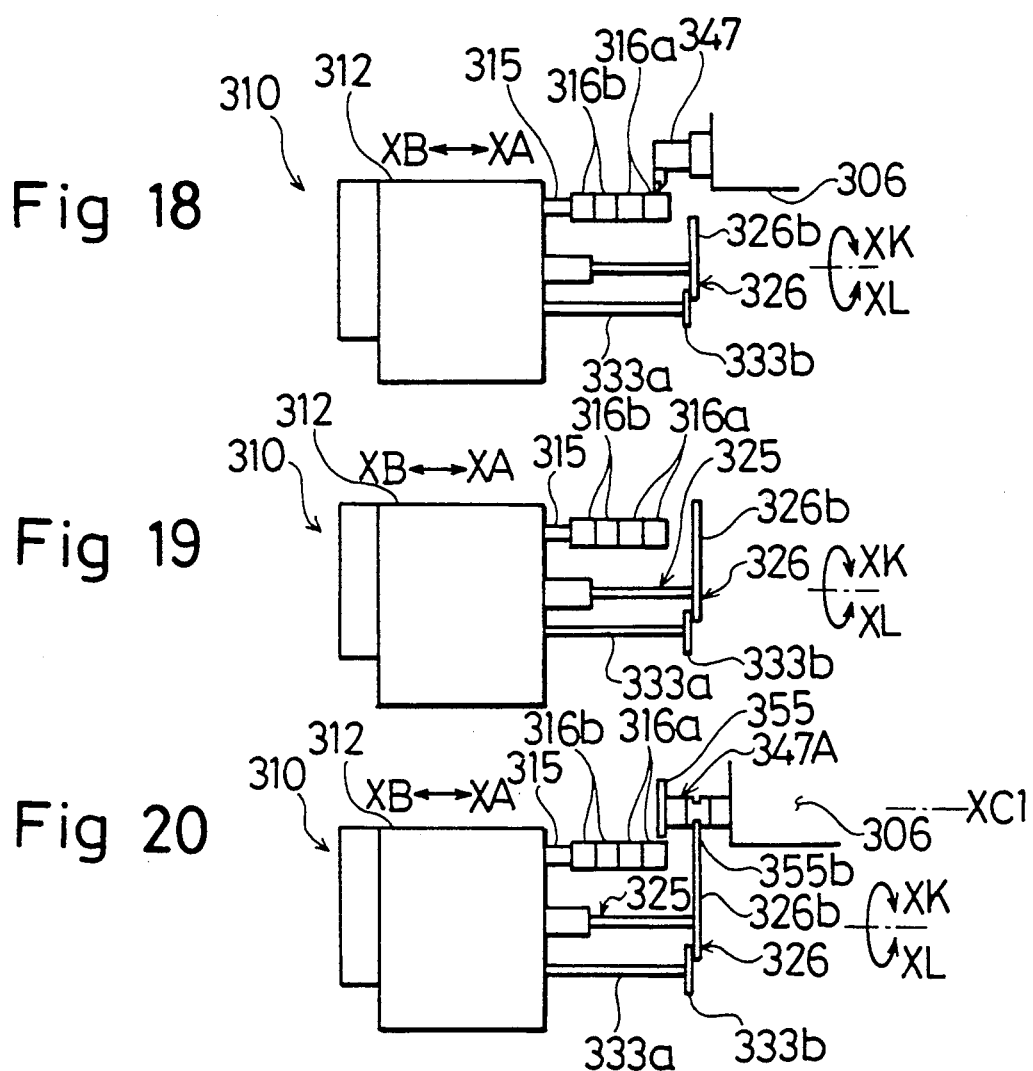

Fig. 25
Fig. 26
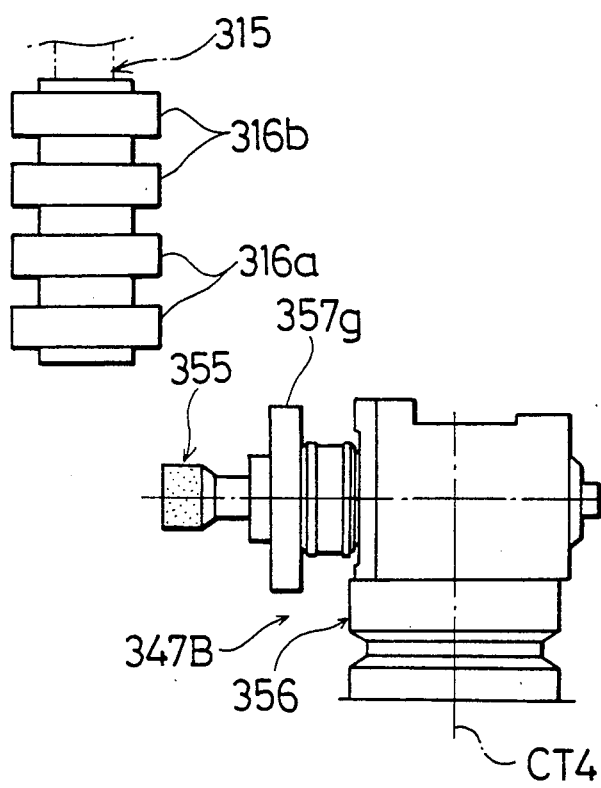
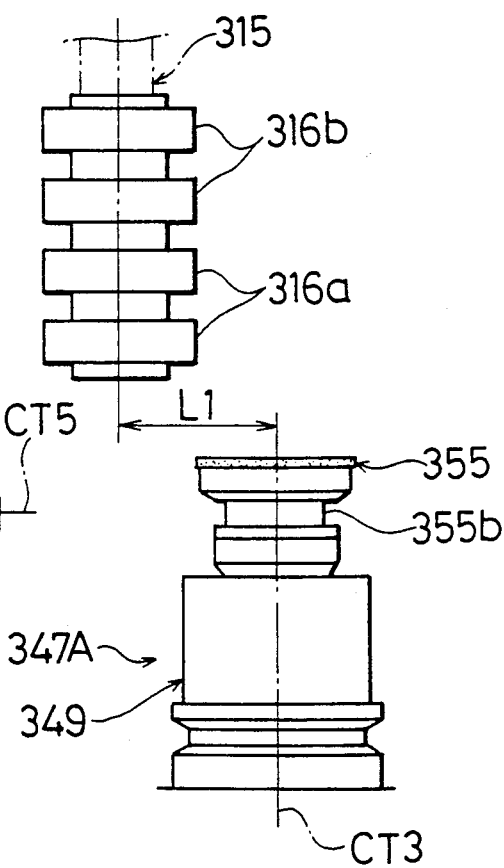

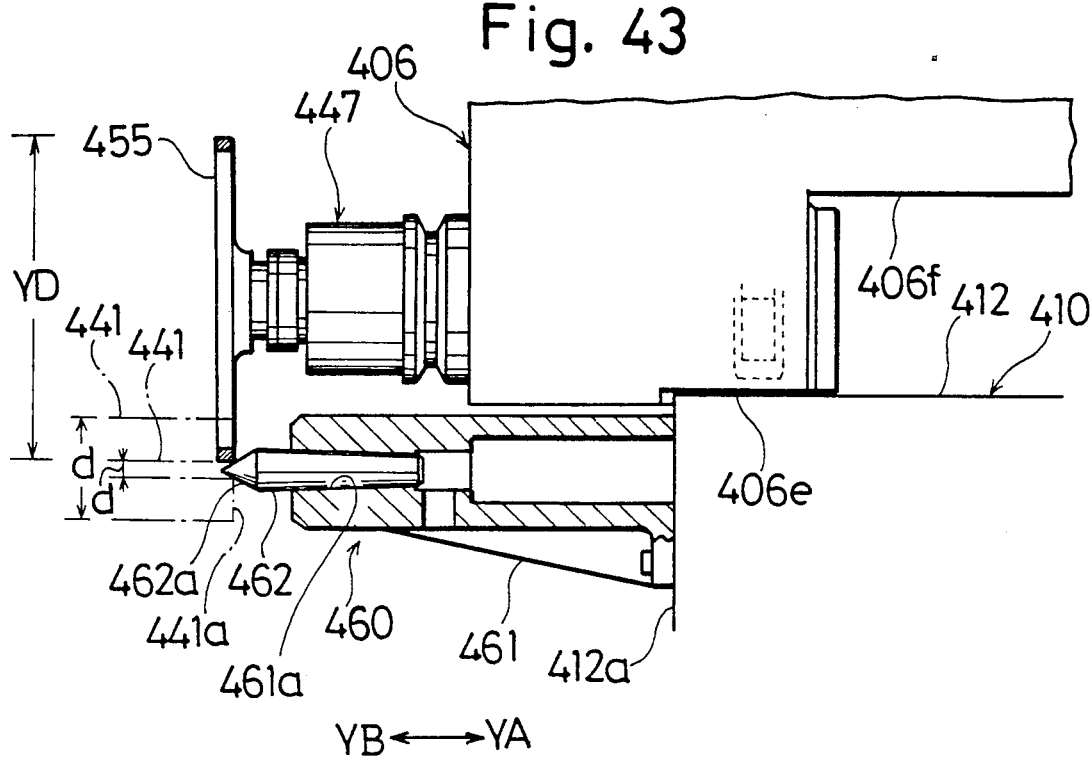
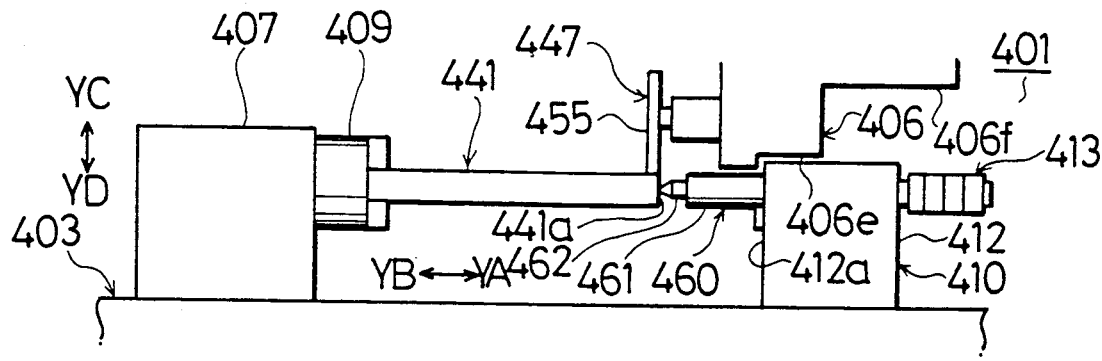
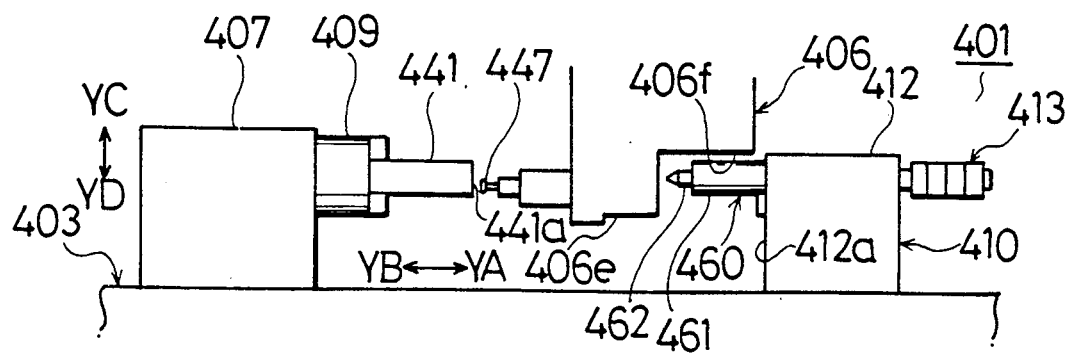

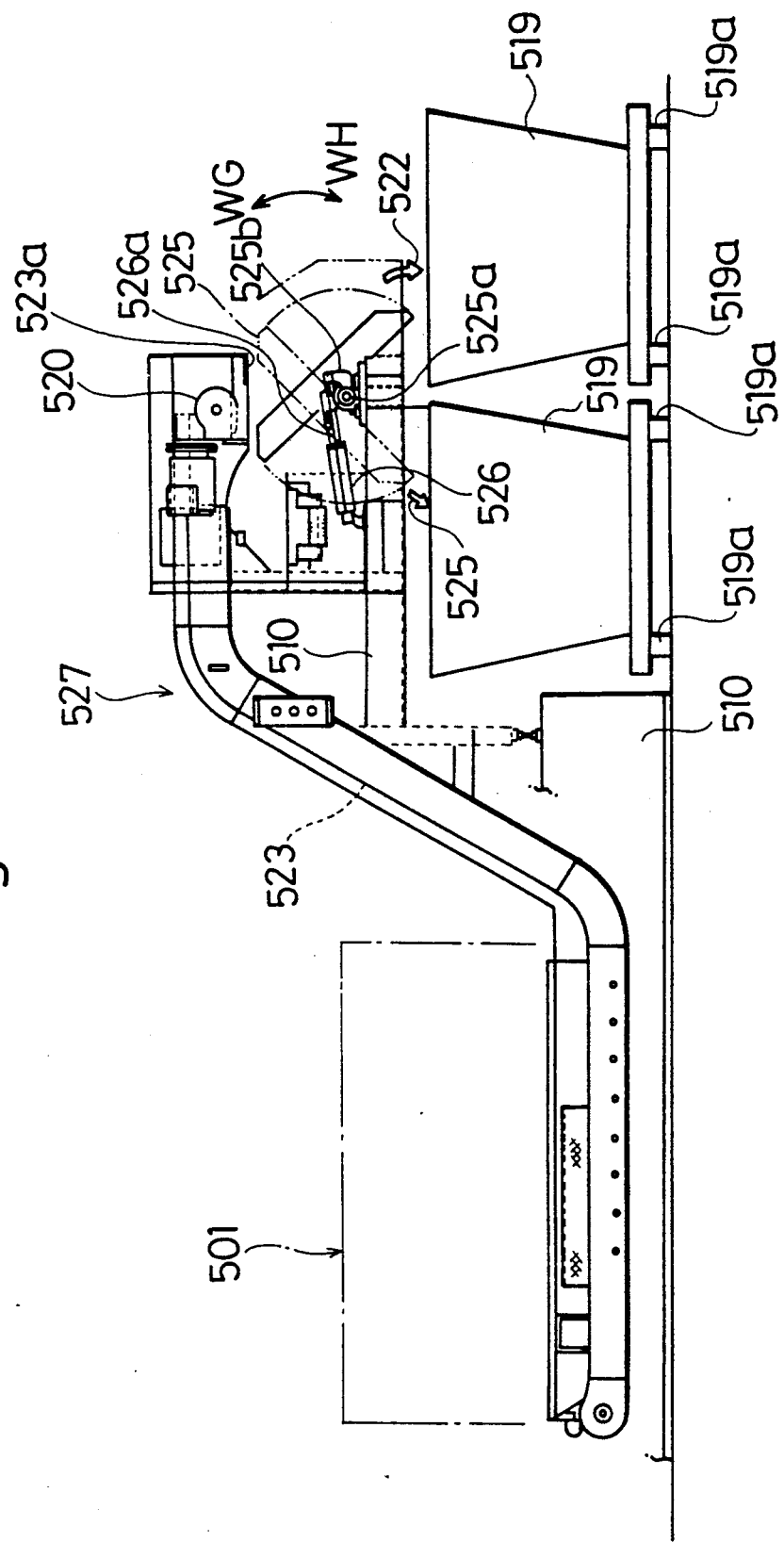

MACHINE TOOL WITH GRINDING FUNCTION AND TRUING/DRESSING METHOD OF GRINDING STONE USING IT

This application is a continuation of now abandoned application, Ser. No. 07/277,883 filed on Aug. 3, 1988.

BACKGROUND OF THE INVENTION

This invention relates to a machining tool with grinding function equipped with an electric discharge truing/dressing apparatus of a metal bond grinding wheel for grinding a workpiece.

And, this invention relates to a machine tool having grinding function capable of performing a center work machining and the like and capable of dressing in state that a tool for grinding is installed in a tool rest, a dressing apparatus being used for it and the dressing method, and grinding tool.

Furthermore, this invention relates to a chip collecting apparatus using for a machine tool such as a lathe and its collecting method.

In recent years, ceramic materials or the like have caught much attention because of their characteristics such as resistance to high temperature and resistance to wear, and have been applied to various kinds of devices. Therefore, developments and proposals have been made on machining art or technique so that ceramic materials can be cut and/or ground as easily as iron materials can. The present inventors have tried to grind a hard and fragile material using a cast iron bond diamond grinding wheel and a machining center. As a result, they have confirmed that the high efficient machining of ceramics and cemented carbide or sintered hard alloy was effective.

In order to perform the grinding machining by a cast iron bond diamond grinding wheel with high accuracy and efficiency, however, truing/dressing is indispensable on the body of a machining tool. Heretofore, it was said that no effective truing/dressing methods were present with respect to a metal bond grinding wheel. The present inventors have proposed a wire electric discharge truing/dressing method on the body of a machining tool.

The illustrations of FIGS. 4 and 5 show the principle thereof, in which an electric discharge machining is performed between a wire electrode 95 and a metal bond grinding wheel 90 using a wire cut electric discharge power source 96. Since electric discharge truing/dressing is performed on the body of a machining tool, there can be obtained a high accuracy with least errors. The present inventors have proposed a turing center in which the afore-mentioned dressing method was applied.

Furthermore, the present inventors have proposed an electric discharge truing by a block-like electrode as an improvement of an electric discharge truing/dressing method by the afore-mentioned wire electric discharge. The present inventors also have proposed a method for performing an electric discharge truing/dressing of a metal bond grinding wheel mounted on a tool spindle using a generated electrode obtained by cutting an electrode into a desired configuration by a tool mounted on a tool spindle.

However, since the machining by the wire electric electrode was required the use of a wire electrode, the electric discharge was partially taken place and an average electric current was limited. Therefore, the removing efficiency of the metal portion of the metal bond grinding wheel became insufficient and the truing/dressing efficiency became worse. In addition, since the wire was limited in thickness, the shape truing of the grinding wheel was limited in configuration. For example, there arose such a problem in that an irregularity having a sharp angle or a complexed configuration could not be generated.

The proposals of the electric discharge truing by the block-like electrode were all no more than the proposals of the principle of the electric discharge truing/dressing method. The proposals were still insufficient in solving the problems relating to the structure and arrangement of the truing/dressing apparatus, particularly in the respect that they were applied to a turning center for grinding machining a cylindrical workpiece with high efficiency. That is, in the conventional special machining such as electro-chemical machining, one-to-one automatic machining was available but there was no such machine in which workpieces W having various configurations could be continuously machined without manpower. Therefore, in the prior art, it was impossible to attain automation by saving manpower, etc.

And, heretofore, the proposal is advanced relating a dressing apparatus by which truing and the like are performed by means of electric discharge machining toward the grinding stone portion which is blinded. In prior art, in order to perform truing and the like by means of the dressing apparatus, rough turing and dressing are perfomed toward the grinding stone portion which is blinded by using a machining electrode for rough machining at first. Thereafter, the machining electrode for rough machining is detached from the dressing apparatus and the machining electrode for finishing machining is attached to it in return. In this way, the finishing truing and dressing are performed.

However, in this method, it is necessary that the machining electrode for rough machining is detached after rough truing toward the grinding stone portion of a grinding tool and the machining electrode for finishing machining is attached. And, it is inconvenient that finishing truing and the like can't be performed immediately.

To realize the attempt needs the development of the art. That is, it is that electricity is fed to a grinding stone portion via the electrode by connecting the electrode with the grinding stone portion being free to connect and separate. But, such an art is far from development.

Moreover, in the prior art, when a center work machining and the like are performed by means of a complex machining machine tool, one edge portion of a workpiece is held by the spindle of the machine tool via a chuck, and the other edge portion is supported by the center of a tailstock. In this state, a workpiece is cut at the predetermined form by the tool being installed in a tool rest.

In recent years, the proposal, to perform grinding machining toward a workpiece by installing the tool for grinding in a tool rest in a complex machining machine tool, is advanced. But, in case that the blinding rises in a grinding tool, it is necessary to perform dressing. Then, the method in which dressing is performed by electric discharge machining toward the grinding stone which is blinded is adopted in the prior art. On this occasion, dressing is performed in such a manner that the tool for grinding which is blinded is detached from the tool rest and is attached to an electrical discharge machine being provided in the shape of being separated from the complex machining machine tool.

However, according to this method, a worker must perform the operations of the detachment and attachment of a grinding tool whenever dressing is performed. And, it is difficult to perform grinding activity automatically without manpower in the complex machining machine tool. Then, it is thinkable that a dressing apparatus is disposed on the machine body of the complex machining machine tool and dressing is performed in the state that the grinding tool is installed in the tool rest by means of the apparatus. In this method, the new problem occurs. That is, there is a case that the machining can't be performed because of the interference between the tailstock which is provided being free to move on the machine body in the same manner as the dressing apparatus and the dressing apparatus, when center workpiece machining and the like is performed.

In the conventional machine tool such as a lathe, when the machining is performed toward workpieces in the different kind of material, differentiation of machining isn't present except for specific case. Therefore, the chip produced is collected in the shape of mixing different kind of chip.

This method is defective in complication of separation and classification operations of chip for the object in which resource is effectively utilized. In case that the workpiece which is different completely in character such as metal and ceramics is machined, the chip collecting apparatus capable of collecting in the shape of classifying the chip produced from first is desirable.

It is therefore an object of the present invention to provide an electric discharge truing/dressing apparatus suitably used for a turning center in which electric discharge truing/dressing of a metal bond grinding wheel is performed on the body of a machining tool.

Another object of the present invention is to provide a machining tool with a grinding function, in which an electrode is automatically exchanged in order to perform the electric discharge truing/dressing of a metal bond grinding wheel of a turning center on the machine body, thereby to attain a long time driving without manpower.

A further object of the present invention is to provide a machining tool with a grinding function, in which an electrode is disposed on a workpiece spindle stock so that electric discharge truing/dressing of a metal bond grinding wheel of a turning center is performed on the machine body.

A still further object of the present invention is to provide an electric discharge truing/dressing apparatus which can sufficiently cope with thermal displacement of a spindle stock by mounting an electrode on the spindle stock of a turning center.

A yet further object of the present invention is to provide a most suitable constitution of a CNC machining tool with an electric discharge truing/dressing apparatus and more particularly to provide a machining tool, in which an electrode machining tool and a grinding wheel are mounted on a tool rest so that a plural kinds of workpieces can be machined.

And, it is an object of the present invention to provide a truing/dressing apparatus capable of improving machining efficiency in such a manner that rough truing and dressing is performed toward the grinding stone portion of the grinding tool, and thereafter finishing truing and dressing is performed immediately without reattaching the electrode, in order to eliminate the above-described defects.

Moreover, it is an object of the present invention to provide the grinding tool capable of installing in a machine tool and capable of perform truing and dressing in such a manner that electric discharge machining is performed toward the grinding stone portion in state that the electrode is certainly connected with the grinding stone portion being free to connect and separate.

And, it is an object of the present invention to provide the machine tool with a dressing apparatus capable of performing center workpiece machining and the like and capable of performing dressing in state that a grinding tool is installed in the tool rest.

Furthermore, it is an object of the present invention to provide the chip collecting apparatus capable of classifying and stocking the chip produced easily if the material to be machined changes.

SUMMARY OF THE INVENTION

From one aspect of the present invention, there is essentially provided a machining tool with a grinding device comprising a spindle stock for containing and supporting a workpiece spindle which is driven for rotation while holding a workpiece or an electrode; a tool rest which moves parallel and perpendicular to the spindle of the spindle stock and holds an electrode machining tool and a grinding wheel; a feed electricity means disposed between a workpiece supporting portion of the workpiece spindle and the tool rest; a magazine disposed at an outside area of a machining area of the tool rest and adapted to store the workpiece and the electrode; and a loading device disposed between the magazine and the spindle.

In this way, if a workpiece magazine with an electrode placed thereon is stored, a dressing/truing of a metal bond grinding wheel can be performed by handling an electrode as like a workpiece. Furthermore, since a workpiece and an electrode tool are placed on a workpiece magazine, a grinding wheel on the tool rest can be corrected and a plurality of workpieces can be machined without attaching or detaching the grinding wheel every time the dressing/truing is performed. Therefore, a various kinds of workpieces can be machined for a long time without manpower.

From another aspect of the present invention, the present invention includes an electric discharge truing/dressing apparatus comprising a spindle stock for containing and supporting a workpiece spindle which is driven for rotation while holding a workpiece; a tool rest which moves parallel and perpendicular to the workpiece spindle of the spindle stock and holds an electrode machining tool and a metal bond grinding wheel; an electrode holding means which is driven for rotation while holding an electrode disposed at an upper portion of the spindle stock; and a feed electricity means for the use of electric discharge machining disposed between the electrode holding means and the tool rest.

From a further aspect of the present invention, the present invention includes an electric discharge truing/dressing apparatus comprising a spindle stock for containing and supporting a workpiece spindle which is driven for rotation while holding a workpiece; a tool rest which moves parallel and perpendicular to the workpiece spindle of the spindle stock and holds an electrode machining tool and a grinding wheel; an electrode holding means which is driven for rotation while holding an electrode disposed at an upper portion of the spindle stock; a feed electricity means for the use of electric discharge machining disposed between the electrode holding means and the tool rest; a magazine disposed at an outside area of a machining area of the tool rest and adapted to store the workpiece and the electrode; and a loading device in order to feed or discharge a workpiece disposed between the magazine and the spindle.

In this way, if an electrode is disposed on a spindle stock, a workpiece machining position and a truing/dressing position are near and the movement of a tool rest for holding a grinding tool can be limited small in amount. Furthermore, the machining accuracy can be prevented from becoming degraded due to thermal displacement of a workpiece spindle, since an electrode holding means is provided separately from the workpiece spindle.

From a still further aspect of the present invention, the present invention includes an electric discharge truing/dressing apparatus truing and dressing a grinding wheel by an electric discharge using a positioning function of a numerical controller, comprising; a spindle stock for containing and supporting a workpiece spindle which is driven for rotation while holding a workpiece; an electrode holding means disposed opposite the main spindle stock; a tool rest which moves parallel and perpendicular to the workpiece spindle of the spindle stock and holds an electrode machining tool and a grinding wheel; and a feed electricity means for the use of electric discharge machining disposed between the electrode holding means and the tool rest.

In this way, if an electrode holding means is disposed opposite a workpiece spindle and a tool rest is movably disposed in parallel and perpendicular to a workpiece spindle, the electric discharge truing/dressing can be efficiently performed.

And, this invention is comprised as follows. That is, machining electrodes are provided with the machine body of the machine tool being free to rotate around the axis center in such a manner that the axis center is parallel to Z axis direction. Moreover, the tool electrode with which the electric feed means such as a electrode bar capable of engaging and contacting with the tool for grinding is provided, is provided with the machine body being free to move in Z axis direction and being free to rotate, moving and driving means for moving the tool electrode in Z axis direction such as a positioning cylinder are connected with the tool electrode, and rotating and driving means for rotating the electric feed means such as a supporting cylinder, an engaging member, a rotating shaft, a cylinder for rotating and a spring are connected with the tool electrode.

Accordingly, in case that dressing and the like are performed toward a grinding tool, by driving the moving and driving means and the rotating and driving means, the tool electrode is moved in Z axis direction and is rotated with the predetermined angle, and the tool electrode and the tool for grinding are connected with each other via the electric feed means. In this state, electric discharge machining is performed toward the grinding stone portion in state that the grinding stone of the tool for grinding and the machining electrode are distant with the predetermined interval each other. In this way, dressing and the like can be performed toward the grinding tool. Therefore, dressing and the like can be performed in state that the grinding tool being installed in the tool rest of a complex machining machine tool is installed in the tool rest as it is.

Furthermore, the present invention has a main body, a machining electrode supporting portions such as a electrode supporting portion are provided with the main body being free to rotate and drive, and the plural number of the machining electrodes are installed in the machining electrode supporting portion being free to detach and attach.

With the above-descrived constitution, the machining electrodes having various kinds of forms are installed in the machining electrode supporting portion, and the machining electrode is selected among the machining electrodes according to the form of the grinding stone of the grinding tool for performing truing/dressing. Then, truing/dressing can be performed toward the grinding stone by means of the selected machining electrode. Accordingly, truing/dressing can be performed toward the grinding stones having different and plural forms by means of one truing/dressing apparatus without detaching and attaching the machining electrodes.

And, in case that the machining electrodes different in material, that is to say, the machining electrode which is composed of copper for finishing machining and the machining electrode which is composed of black lead for rough machining, are installed in the machining electrode supporting portion, rough truing/dressing is performed toward the grinding stone of the grinding tool by means of the machining electrode for rough machining, thereafter finishing truing/dressing is performed by the machining electrode for finishing machining without detaching and attaching the electrode immediately. In this way, machining efficiency can be improved.

Furthermore, the present invention has a main body capable of installing in a machine tool such as a comprex machining machine tool and the electrode engaging means such as an electrode connecting groove, and a grinding stone is rotatably provided with the main body.

With the above-descrived constitution, in case that dressing and the like are performed toward the grinding tool being installed in the machine tool, the tool electrode is connected with the electrode engaging means, and electricity can be fed toward the grinding stone portion from the tool electrode via the electrode engaging means. Accordingly, the grinding tool capable of installing in the machine tool and in which the tool electrode can be certainly connected with the grinding stone portion being free to connect and disconnect can be provided.

And, the present invention is comprised as follows. That is, a dressing main body such as a main body is provided with the machine body of the complex machining machine tool being free to move and drive in Z axis direction, tailstock means such as a tail center portion is provided with the dressing main body, and dressing means such as a machining electrode portion and an electric feed mechanism for tool is provided with the dressing main body.

Therefore, in case that center work machining and the like are performed, one edge of a workpiece is supported by the tailstock means. In this state, the workpiece can be machined by means of the tool by moving the tool rest together with the tool in Z axis direction. And, when dressing is performed toward the grinding tool, dressing can be performed toward the tool by means of the dressing means by moving the dressing main body and the tool rest in Z axis direction relatively, and something like that. In result, center work machining and the like can be performed and dressing can be performed in state that the grinding tool is installed in the tool rest.

Moreover, according to the present invention, a change -over plate is provided being free to rotate and move in the reciprocal directions at the chip collecting side such as the macine tool side or at the chip elimination side such as the chip elimination orifice of the chip conveyer, and a driving means for rotating and moving the change-over plate such as a driving cylinder are provided with the change-over plate.

With the above-described constitution, the chip different in material can be collected in the shape of sorting properly in such a manner that the driving means is driven according to material to be machined to switch the change-over plate to the reciprocal directions.

Accordingly, the collection and separation of the chip can be easily performed, the reclamation of resource can be promoted, and the chip different in property such as ceramic and metal can be collected in the shape of sorting from the first.

BRIEF DESCRIPTION OF THE DRAWINGS

FIGS. 16 through 24 are views for showing the process at which dressing is performed toward a grinding tool by means of the dressing apparatus according to the present invention;

FIGS. 25 through 28 are views for showing the position relation between the grinding tool being installed in the tool rest of the complex machining machine tool as shown in FIG. 14 and the machining electrode;

FIG. 34 is a right side elevation of the FIG. 33;

FIG. 43 is a view for showing the engaging condition between the tool rest and the center portion of the truing/dressing apparatus;

FIGS. 45 and 46 are views for showing the process at which the center workpiece grinding machining and the chuck workpiece grinding machining are performed by using the complex machining machine tool according to the present invention;

FIG. 52 is a front elevation for showing the other embodiment of the present invention.

DESCRIPTION OF THE PREFERRED EMBODIMENTS

The present invention will be described in detail hereunder with reference to the accompanying drawings.

Figure 1:
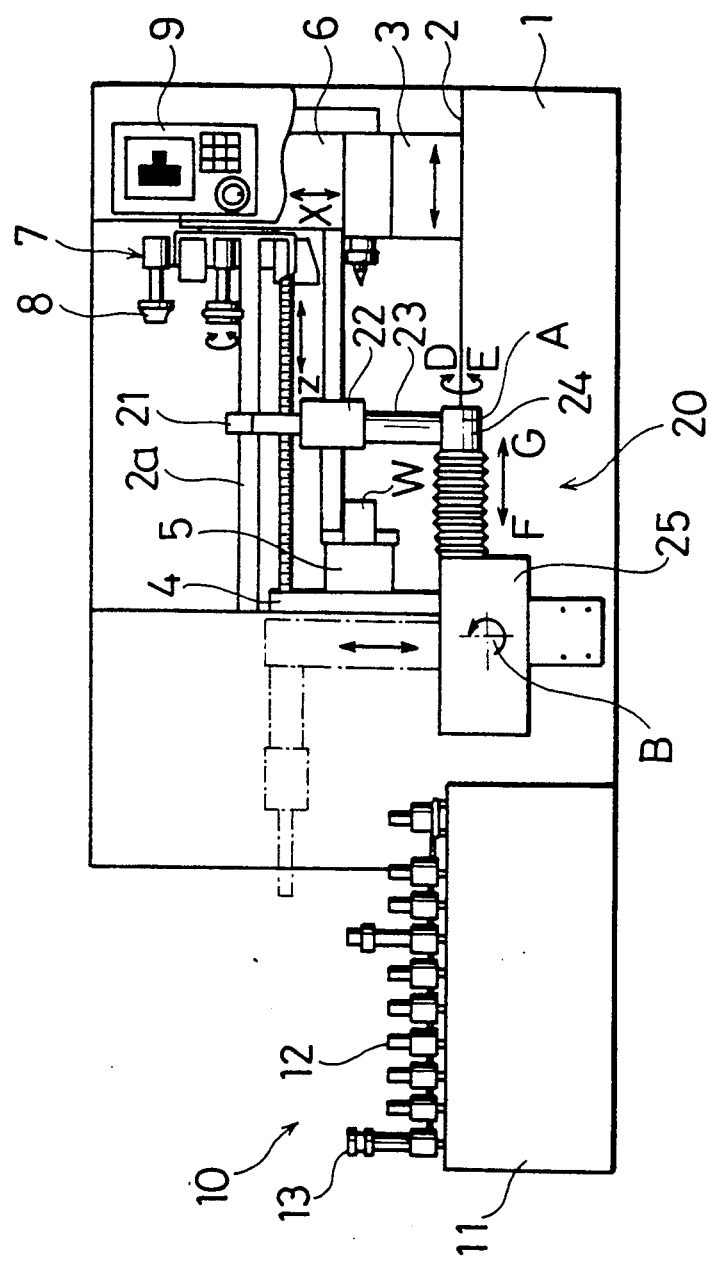
FIG. 1 is a front view of a turning center to which an electric discharge truing/dressing apparatus is applied.

A turning center as a machining tool has a bed 1 constituting its body as shown in FIG. 1. The bed 1 is provided thereon with a horizontal slide guiding surface 2. A spindle stock 4 is rotatably provided with a workpiece spindle. This workpiece spindle is driven by a rotation driving means such as an electric motor known per se. The workpiece spindle is provided with a workpiece chuck 5. The workpiece chuck 5 is provided with a workpiece W and an electrode 13 secured thereto. A tailstock 3 is slidably disposed on the horizontal slide guiding surface 2 for sliding in Z axis direction (the right and left directions in the figure). A tool rest 6 is slidably disposed to an inclined slide surface 2a, i.e., a slant surface which is inclined by certain angles with respect to the horizontal slide guiding surface 2.

This tool rest 6 is movably provided in the longitudinal and transversal directions, i.e., the Z- and X-axis directions. The tool rest 6 is provided thereon with a tool turret 7 disposed around the tool turret shaft. The tool turret 7 are provided with a plurality of tools 8 stored around the turret. The tools 8 stored in the tool turret 7 include cutting or grinding tools for the used of a turning center such as, for example, a machining bite, a boring drill, a shaping end mill and grinding wheel for grinding the inner or outer peripheral surface of a workpiece.

Furthermore, instead of the ordinary grinding wheels, a metal bond grinding wheel 31 for grinding a hard material such as ceramics is stored therein. In addition, a measuring touch sensor, etc. are also stored in the tool turret 7. These tools 8 are exchangable according to necessity such as wear, change of a workpiece or the like. The tools 8 stored within the tool turret 7 are rotationally driven so that a required tool will be brought to a tool fixing place and secured for use.

The movements of the above components are controlled by a numerical control apparatus 9. Adjacent to the bed 1, a magazine 10 containing workpieces 12 and electrodes 13 is located. The magazine 10 comprises a magazine table 11 with a number of workpiece 12 and electrodes 13 connected in a loop shape. The loop is connected to a driving device, and the workpiece 12 and electrode 13 at the required place are divided according to the commands from the numerical control apparatus 9. The holders of the workpieces 12 and electrodes 13 are each assigned with a magnetic and mechanical identification mark. The kinds of the workpieces and the kinds of the electrodes are stored in a memory within a numerical control apparatus 9. The required workpiece 12 and electrode 13 are called with reference to the identification mark and the data stored within the memory.

A loader 20 adapted to take out workpieces 12 and electrodes 13 within the magazine 10 and transfer to the chuck 5 is located at the front surface of the bed 1. The loader 20 is provided at its foremost end with a holding nail 21. The holding nail 21 is opened and closed its two fingers by a holding nail driving means 22 such as oil pressure so as to hold or release the workpiece 12 and electrode 13. The holding nail 21 is disposed at the foremost end of a swing arm 23. The swing arm 23 is secured to one end of a pivot shaft 24. The pivot shaft 24 is disposed at a loader body 25.

Figure 2:
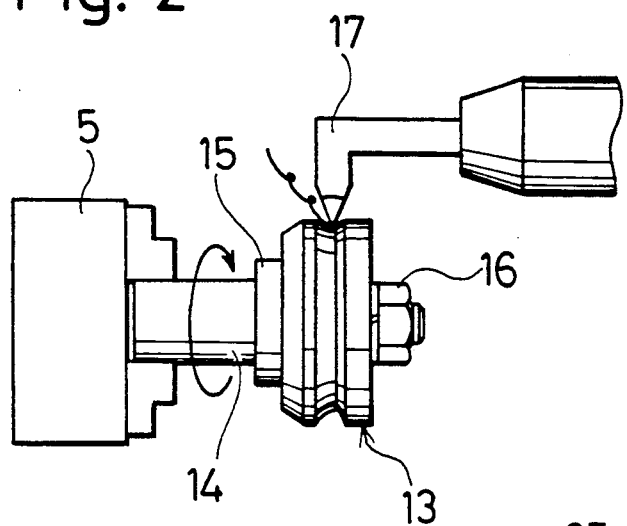
FIG. 2 is an illustration in which an electrode is being cut.

The pivot shaft 24 is pivoted about the pivot axis A in the direction as shown by the arrow D, E within the loader body 25 and is slided in the direction as shown by the arrow F, G. The loader body 25 is swung by 90 degrees about the axis B vertical to the pivot axis of the pivot shaft 24. After swung, the loader body 25 is brought to the position shown by the chain line. FIG. 2 illustrates the electrode 13 now being cut by the bite 17. The electrode 13 has a cylindrical configuration and is formed of a conductive material such as black lead and copper. The electrode 13 is tightened to a flange 15 formed on a rotating shaft 14 by a nut 16 and secured to the rotating shaft 14. When the electrode 13 is required to be exchanged due to wear and breakage, the electrode 13 is removed from the rotating shaft 14 by untightening the nut 16.

The electrode 13 is taken out of the magazine 10 by the loader 20 and is held by the chuck 5. As shown in FIG. 2, when the electrode 13 is fixed to the chuck 5, the cutting bite 17 cuts the outer periphery of the electrode 13. The electrode 13 is cut into a desirably formed electrode 13a by the numerical control apparatus 9. That is, the formed electrode 13a, as will be described, is generated into a configuration where the projection and the depression or irregularities are exhibited in the opposite way as those of the metal bond grinding wheel 31 which is to be subjected to the truing/dressing machining.

Figure 3:
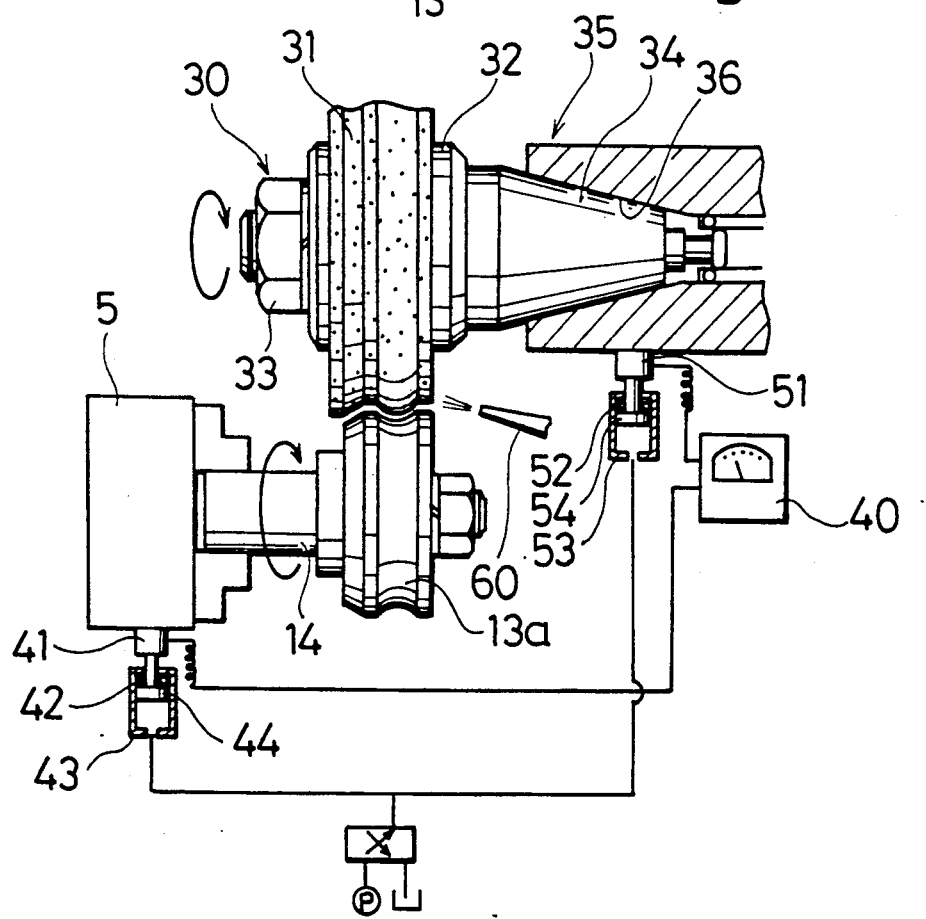
FIG. 3 is an illustration showing the state of electric discharge truing/dressing.
Figure 4:
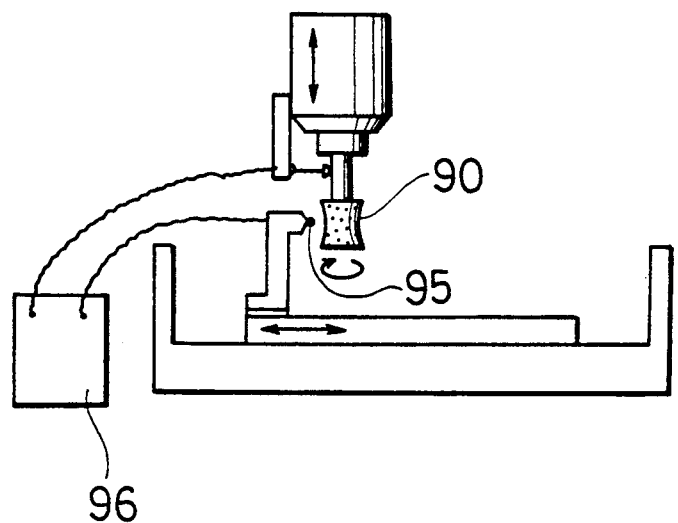
FIGS. 4 and 5 are illustrations showing the prior art.
Figure 5:
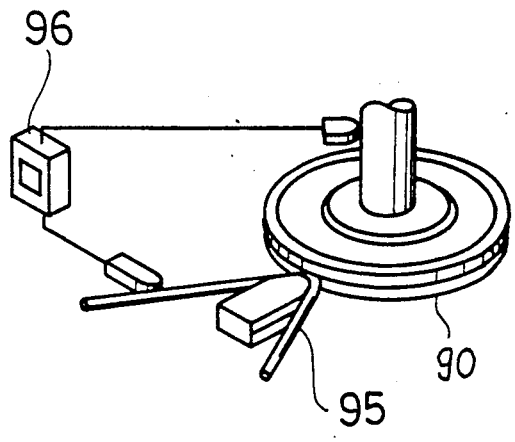

FIG. 3 illustrates the electric discharge truing state by the generated formed electrode 13a. The formed electrode 13a is held by the chuck 5 in the same manner as when generated by the bite 17 and still mounted on the rotating shaft 14. Accordingly, the axial runout of the formed electrode 13a is not occurred. Instead of the bite 17 within the tool turret, the metal bond grinding wheel 31 is brought to the use-position and secured thereto. The metal bond grinding wheel 31 is removably secured to the flange 32 of the tool holder 30 by the nut 33. A taper shank 34 of a stationary holder is locked in a taper hole 36 of the tool spindle 35 by a fixing means known per se.

The metal bond winding wheel 31 according to the present embodiment is a cast iron bond diamond grinding wheel 31. That is, the metal bond winding wheel 31 comprises diamond grains solidified with a cast iron bond. However, the present invention is not limited to this. As long as it is a metal bond grinding wheel, it may be bonded by any other suitable bonding agent. Vitrified bonding agents or resinoid bonding agents are also acceptable if they are processed so as to have conductive property. For example, in case of vitrified bonding agents, the porous portion thereof may be applied with immersion plating. In case of resinoid bonding agents, they may be mixed with conductive fibers.

Upon completion of the indexing of the metal bond grinding wheel 31, the rotating metal bond grinding wheel 31 and formed electrode 13a are gradually approached. At this time, the metal bond grinding wheel 31 and the formed electrode 13a are incurred with voltage by an electric discharge machining power source device 41 through feed electricity brushes 41 and 51. The feed electricity brush 41, in this embodiment, is urged against the peripheral surface of the chuck 5. When not operating, a piston 44 is succesively returned by a spring 42 disposed within a cylinder 43, and the feed electricity brush 41 and the chuck 5 are separated.

The similar mechanism is provided on the tool spindle 35. In this case, a feed electricity brush 51 is caused to contact with the tool spindle 35 by a piston 54 which is actuated by oil pressure within a cylinder 53 and caused to be separated from the tool spindle 35 by a spring 52. When oil pressure is acted on both the cylinders 43 and 53, the pistons 44 and 54 are actuated to contact the feed electricity brushes 41 and 51 with the chuck 5 and the spindle 35. As a result, the metal bond grinding wheel 31 and the formed electrode 13a are approached and start electric discharge.

At this time, a machining liquid is fed from a machining liquid nozzle 60 to the outer peripheral surface of the metal bond grinding wheel 31. As a result, only the metal portion of the metal bond grinding wheel 31 is dissolved by the electric discharge and removed. As a result, only the diamond abrasive grains are embossed. The principle for removing the metal portion by the electric discharge is basically much the same to that for the ordinary electric discharge machining. Upon completion of the truing/dressing machining, the metal bond grinding wheel 31 is retreated and returned to its original position.

Then, the workpiece W held by the chuck 5 is subjected to the ordinary grinding machining. The time of the truing/dressing machining is established by judging the accuracy of the configuration of the metal bond grinding wheel 31, the finished surface of a material to be ground, detection of the grinding torque, etc. in the same manner as the ordinary tool machine art.

Operation of the electric discharge truing/dressing apparatus will now be described in detail.

As shown in FIG. 1, the workpiece W is held by the chuck 5. The spindle is rotated in accordance with the command from the numerical control device 9, thereby to rotate the chuck 5. The tool turret 7 of the tool rest 6 is rotated to index the predetermined tool 8. The tool rest 6 is moved in the Z- and X-axis directions in order to machine the workpiece W. The workpiece W required to be ground is ground by the metal bond grinding wheel 31.

When the grinding quality of the metal bond grinding wheel 31 became dull, the workpiece W is removed from the chuck 5 by the loader 20 and the electrode 13 on the magazine 10 is taken out and held by the chuck 5. Then, the spindle is rotated to rotate the electrode 13. The electrode 13 is cut by the bite 17 in order to correct the configuration and runout. Thereafter, the metal bond grinding wheel 31 is indexed and approached to the formed electrode 13a. Then, oil pressure is introduced into the cylinders 43 and 53 to actuate the feed electricity brushes 41 and 51 so as to contact with the chuck 5 and the tool spindle 35. An electric current passage capable state is created between the metal bond grinding wheel 31 and the formed electrode 13a, and the electric discharge machining power source 40 is actuated. As a result, both of them starts electric discharge.

Only the metal portion of the metal bond grinding wheel 31 is removed and the truing/dressing machining is performed. Upon completion of the truing/dressing machining, the formed electrode 13a is returned into the magazine 10 by the loader 20.

The loader 20 of the preceding embodiment is specially designed for the exclusive use of the turning center of this embodiment. However, instead of the loader 20, a general purpose robot may be employed. In other words, any robot or the like may be employed as long as it has such a function as to move the electrode 13 to the chuck 5. In the preceding embodiment, the magazine 10 is provided only with the electrode 13 and workpiece W. However, the magazine 10 may be provided therein with a tool 8 such as the metal bond grinding wheel 31, so that the tool 8 on the tool turret 7 will be exchanged by the loader 20. By virtue of the foregoing arrangement, wide range of tools 8 become usable.

Although the tool turret 7 of the above-mentioned embodiment is of the type in which the tool 8 is disposed at the outer periphery of the polygonal turret body, a chain type tool turret may be employed.

Figure 8:
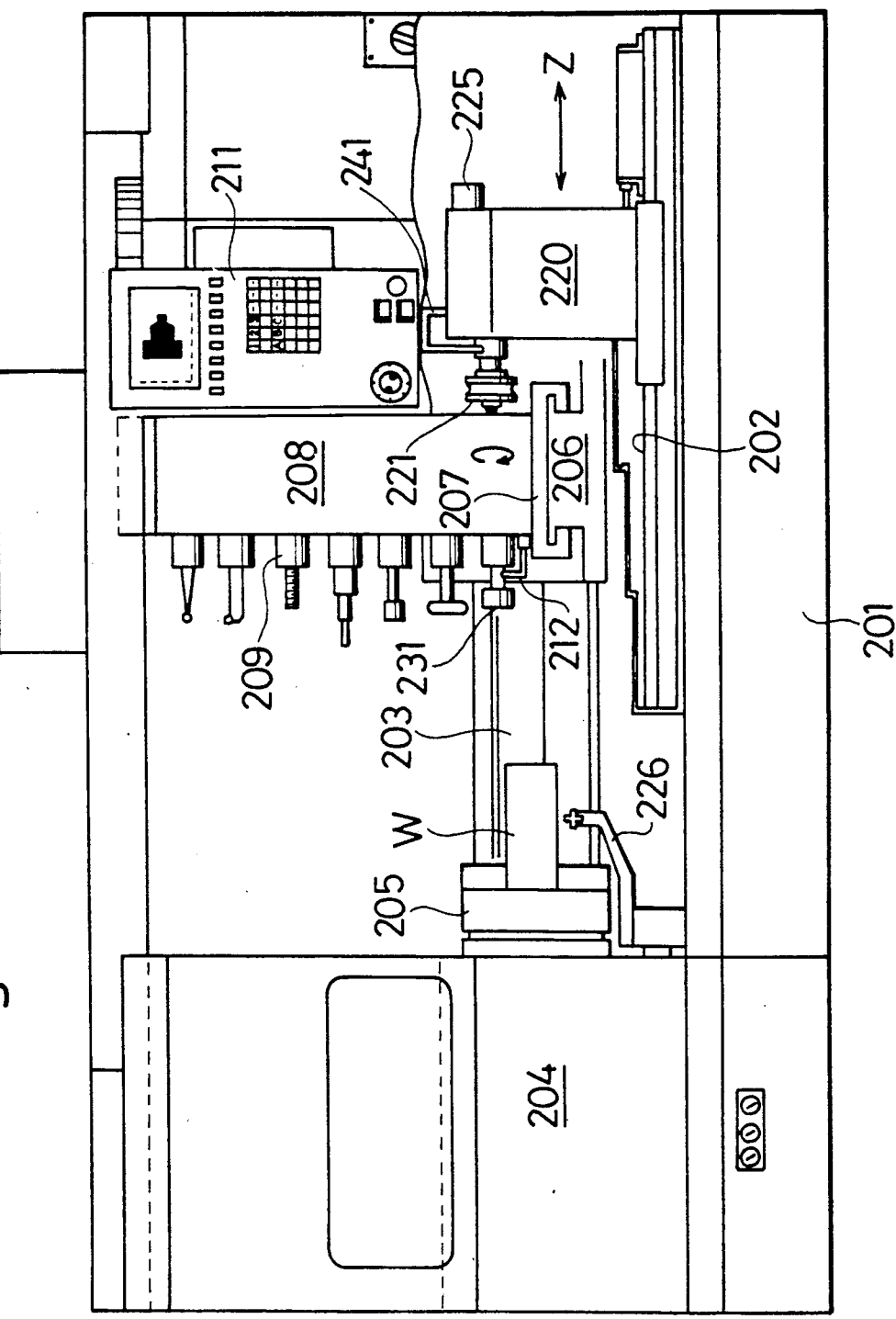
FIG. 8 is a front view showing another example of the turning center to which an electric discharge truing/dressing apparatus is applied.
Figure 11:
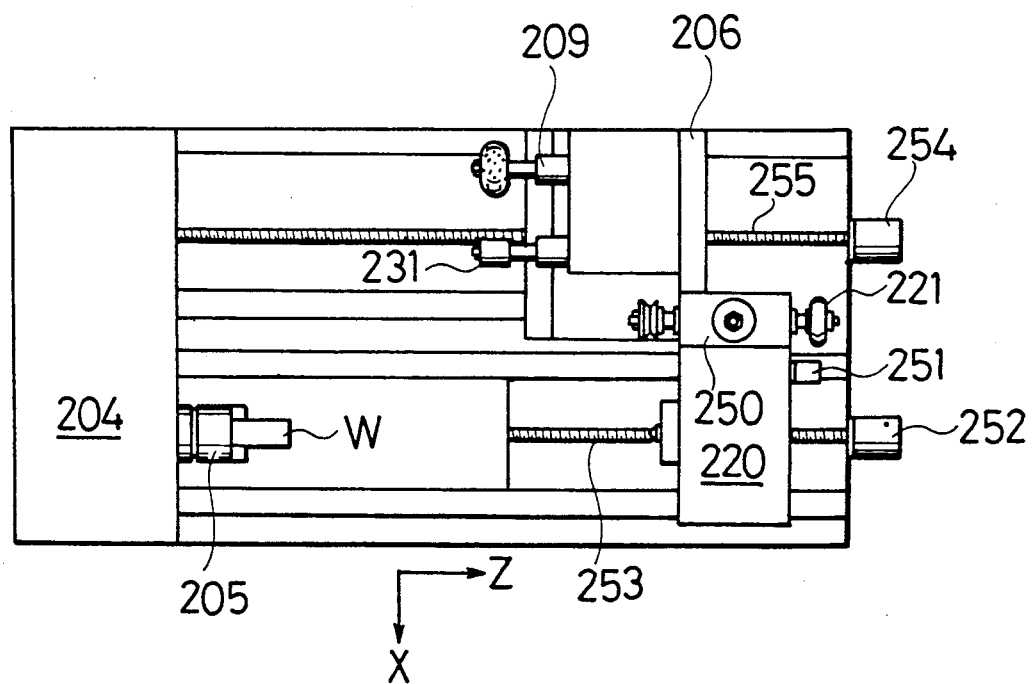
FIG. 11 is an illustration showing still another embodiment.

Referring now to FIG. 8 and FIG. 11, another embodiment of the present invention will be described. A turning center as a machining tool, as shown in FIG. 8, comprises a bed 201 constituting the body thereof and a horizontal slide guiding surface 202 is disposed on the bed 201. The turning center further includes an inclined slide guiding surface 203 which is inclined with respect to the horizontal slide guiding surface 202. A workpiece spindle is rotatably mounted on a spindle stock 204 and is driven by a rotation driving means such as an electric motor known per se. The workpiece spindle is attached with a workpiece chuck 205. A workpiece W is held by the chuck 205 and fixed thereto.

The inclined slide guiding surface 203 is a guiding surface so-called "slant type" and is inclined with respect to the horizontal slide guiding surface 202 by certain angles. A reciprocating table 206 is slidably disposed on the inclined slide guiding surface 203 in the Z-axis direction. A cross feed table 207 is slidably disposed on the reciprocating table 206 in the direction perpendicular to the sliding direction of the reciprocating table 206. A tool magazine 208 is disposed on the cross feed table 207. The tool magazine 208 contains therein a plurality of tools 209. The tools 209 contained in the tool magazine 208 include various kinds of cutting and grinding tools for the use in a turning center such as, for example, cutting bites, boring drills, shaping end mills and grinding wheels for grinding the inner and outer surfaces.

In addition, instead of these ordinary grinding wheels, a metal bond grinding wheel is contained in the tool magazine 208. A touch sensor for measuring is also contained therein. These tools can be exchangable according to necessity such as wear, the change of an object to be machined. The tools 209 within the tool magazine 208 are linked by a chain to form a loop (not shown). A tool 209 required for machining is indexed and brought to a tool fixing place, i.e., machining place, by rotating the chain and fixed thereto.

Figure 10:
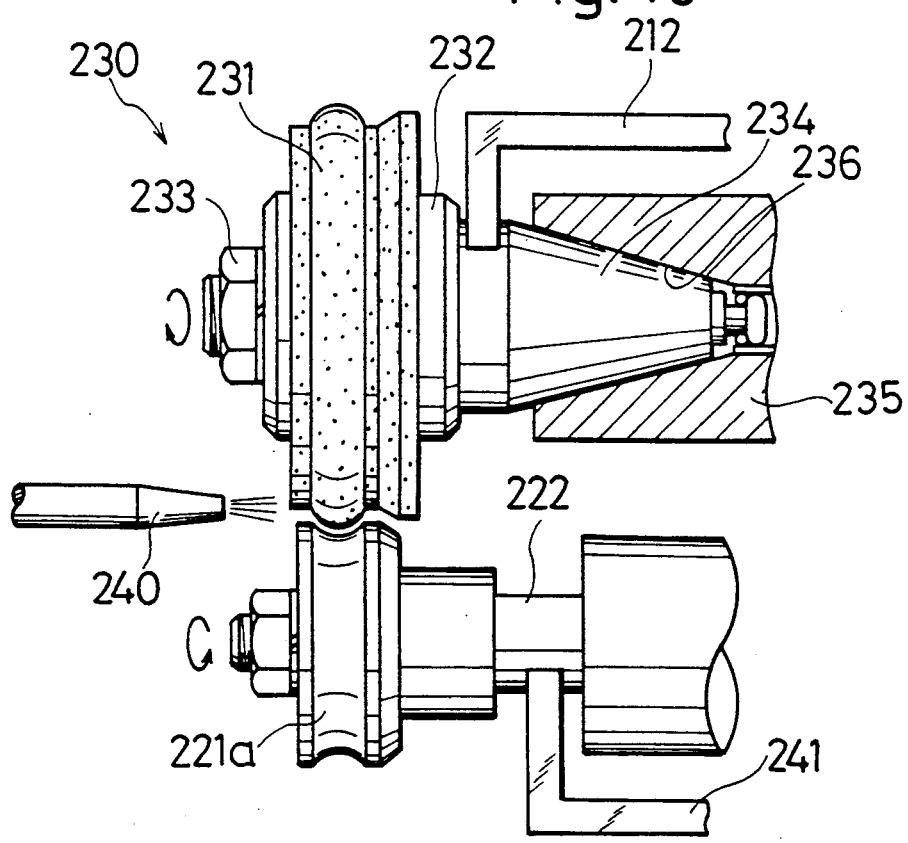
FIG. 10 is an illustration showing the state of electric discharge truing/dressing.

The movements of these components are controlled by a numerical control apparatus 211. In this embodiment, a tool, when used for machining, is indexed and fixed to the lowermost end of the tool magazine 208. A feed electricity brush 212 is placed on the cross feed table 207 as shown in FIG. 10. The feed electricity brush 212 is adapted to electrically conducting the cross feed table 207 and the tool 209. When the tool 209 has been fixed to the afore-mentioned machining position, the brush portion of the feed electricity brush 212 is contacted with the tool 209. The feed electricity 212 is brought to be contacted with the tool 209 and separated from the tool 209 by a driving device (not shown).

This driving device uses a driving means such as solenoid, air pressure and oil pressure known per se. The driving means is driven in accordance with the commands of the numerical control device 211 only when the tool 209, which has been indexed for being held, requires an electric conduction as will be described. A tailstock 220 is disposed on a bed 201 at a position opposite the spindle stock 204. The tailstock 220 is slidable on the horizontal slide guiding surface 202 in the direction parallel to the axis of the spindle. It is driven by a hydraulic cylinder, a feed screw driving device, etc.

The tailstock 220 is provided with an ordinary machining center and an electrode 221. The electrode 221 is fixed to an upper portion of the tailstock 220 by a holding means such as a socket. The electrode 221 is rotated about the axis thereof by an electric motor 225. The tailstock 220 is driven by the driving device thereof and moved to the fixing position of the metal bond grinding wheel 231 to perform the truing/dressing machining based on the afore-mentioned principle. Instead of moving the tailstock 220, the reciprocating table 206 may be moved to the position of the tailstock 220 when the truing/dressing machining is to be perfomed.

Figure 9:
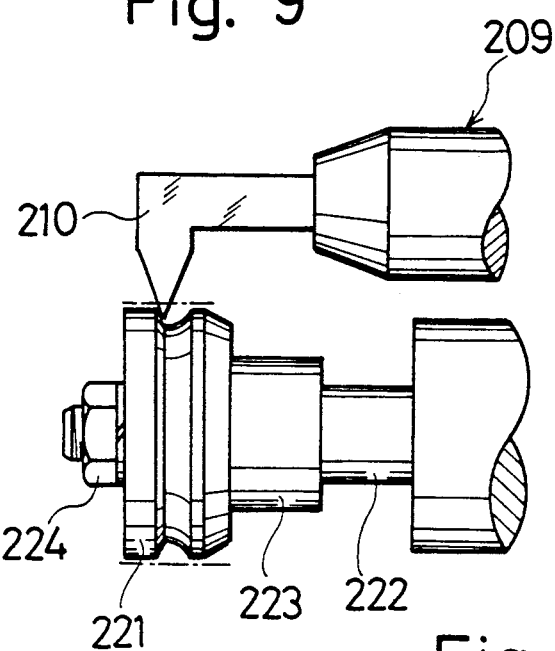
FIG. 9 is an illustration in which an electrode is being cut.

FIG. 9 illustrates the electrode 221 which is now being cut by the bite 210. The electrode 221 is of a cylindrical shape and made of a conductive material such as black lead and copper. The electrode 221 is secured to a flange 223 formed on a rotating shaft 222 by tightening a nut 224 and is fixed to the rotating shaft 222. When the electrode 221 is to be exchanged, the electrode 221 is removed from the flange 223 by untightening the nut 224. Otherwise, the structure of the rotating shaft 222 can be held by a tool chuck, so that the electrode 221 can be removed and exchanged.

The rotating shaft 222 is rotated by reducing the rotating speed of the motor 225 or by being directly connected to motor 225. When the tool 209 of the tool magazine 208 has been indexed to the machining position and fixed thereto, the cutting bite 210 cuts the outer periphery of the electrode 221. The electrode 221 is cut into a desirous formed electrode 221a by the numerical control apparatus 211. In other words, the formed electrode 221a is generated into a configuration where the projection and the depression or irregularities are exhibited in the opposite way as those of the metal bond grinding wheel which is to be subjected to the truing/dressing machining.

FIG. 10 illustrates one state of the electric discharge truing/dressing machining by the generated formed electrode 221a. The electrode 221a is still mounted on the rotating shaft 222 as when generated. Instead of the bite 210, the metal bond grinding wheel 231 is indexed to the use position and fixed thereto. The metal bond grinding wheel 231 is removably secured to the flange 232 of the tool holder 230 by the nut 233. A taper shank 234 of the fixing holder is locked to a taper hole 236 of a tool spindle 235 by a fixing means known per se. Of course, the fixing means of the tool is not limited to the use of a taper shank as in this embodiment. Alternatively, a straight shank may be used as the fixing means of the tool.

The metal bond winding wheel 231 according to the present embodiment is a cast iron bond diamond grinding wheel. That is, the metal bond grinding wheel 231 comprises diamond grains solidified with a cast iron bond. However, the present invention is not limited to this. As long as it is a metal bond grinding wheel, it may be bonded by any other suitable bonding agent. Vitrified bonding agents or resinoid bonding agents are also acceptable if they are processed so as to have conductive property. For example, in case of vitrified bonding agents, the porous portion thereof may be applied with immersion plating. In case of resinoid bonding agents, they may be mixed with conductive fibers so as to render a conductive property.

Upon completion of the exchange of the metal bond grinding wheel 231, the rotating metal bond grinding wheel 231 and formed electrode 221a are gradually approached. At this time, the metal bond grinding wheel 231 and the formed electrode 221a are incurred with voltage by an electric discharge machining power source device (not shown) through feed electricity brushes 212 and 241. Therefore, when the metal bond grinding wheel 231 and the formed electrode 221a are approached, they start electric discharge. At this time, a machining liquid is fed from a machining liquid nozzle 240. As a result, only the metal portion of the metal bond grinding wheel 231 is dissolved by the electric discharge and removed. As a result, only the diamond abrasive grains are embossed. This principle is basically much the same to that of the ordinary electric discharge machining.

Upon completion of the truing/dressing machining, the metal bond grinding wheel 231 is retreated and returned to its original position and the formed electrode 221a is also retreated and returned to its original position. Then, the workpiece W held by the chuck 205 is subjected to the ordinary grinding machining.

The time of the truing/dressing machining is established by judging the accuracy of the configuration of the metal bond grinding wheel 231, the finished surface of a material to be ground, detection of the grinding torque, etc. in the same manner as the ordinary tool machine art.

Operation of the electric discharge truing/dressing apparatus according to the present embodiment will now be described in detail.

The workpiece W held by the workpiece chuck 205 is rotated. The reciprocating table 206 is slided on the slide guiding surface 203 and the workpiece W is ground by the metal bond grinding wheel 231 within the tool magazine 208 of the reciprocating table 206. When the metal bond grinding wheel 231 is subjected to the truing/dressing machining, the bite 210 within the tool magazine 208 is indexed. The reciprocating table 206 is moved to bring the bite 210 to the position of the electrode 221. By the bite 210, the electrode 221 on the tailstock 220 is cut and the formed electrode 221a is generated.

When the generating machining of the formed electrode 221a is over, the bite 210 within the tool magazine 208 is withdrawn and the metal bond grinding wheel 231 is indexed. The metal bond grinding wheel 231 and the formed electrode 221a are relatively rotated by the grinding machining motor and the electric motor 225 and approached and a voltage is incurred to a space between them so as to discharge electricity. The metal portion of the metal bond grinding wheel 231 is removed by the electric discharge, and the dressing and truing machining are performed.

FIG. 11 is a plan view showing a modified embodiment of the electrode 221 of the above-mentioned embodiment. The tailstock 220 is provided at its side surface with an electrode turret 250. The electrode turret 250 is provided on its peripheral surface with a plurality of electrodes 221. The electrode turret 250 is indexed and the electrodes themselves 221 are rotated by the driving motor 251. When the electric discharge dressing/truing machining is performed, the tailstock 220 is moved in the Z-axis direction by rotating the feed screw 253 by the tail stock driving motor 252. Otherwise, the Z-axis driving motor 254 is driven to rotate the feed screw 255, thereby to move the reciprocating table 206 in the Z-axis direction. By the movement of the tailstock 220 or the reciprocating table 206, the metal bond grinding wheel 231 and the formed electrode 221a are subjected to the electric discharge dressing/truing machining. The electrode is also subjected to the configuration machining in the same manner as the above-mentioned embodiment.

Figure 6:
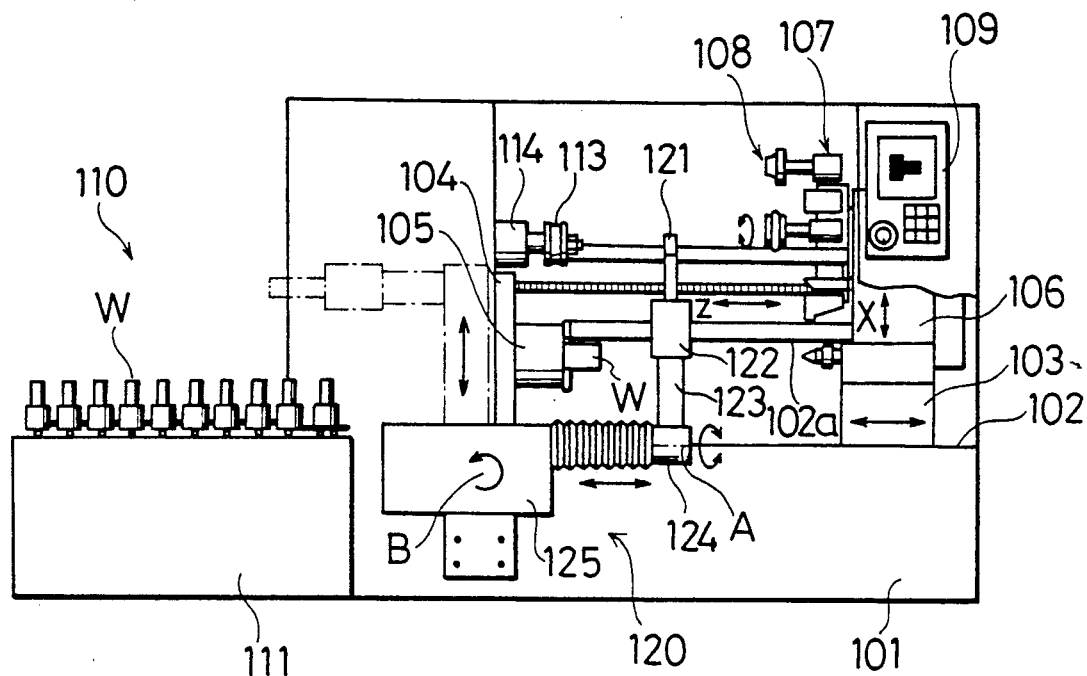
FIG. 6 is a front view showing a modified embodiment of the turning center to which an electric discharge truing/dressing apparatus is applied.
Figure 7:
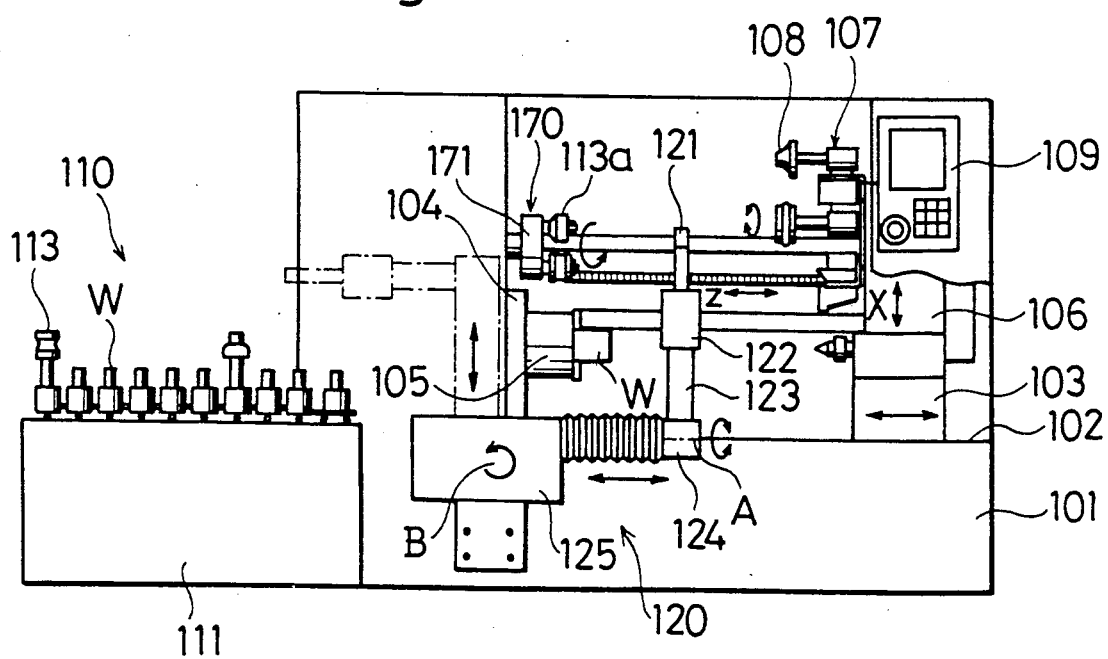
FIG. 7 is a front view showing another embodiment.

Referring now to FIGS. 6 and 7, another embodiment of the present invention will be described. A turning center as a machining tool has a bed 101 constituting its body as shown in FIG. 6. The bed 101 is provided thereon with a horizontal slide guiding surface 102. A main spindle stock 104 is rotatably provided with a workpiece spindle. This workpiece spindle is driven by a rotation driving means such as an electric motor known per se. The workpiece spindle is provided with a workpiece chuck 105. A workpiece W is held by the workpiece chuck 105 and fixed thereto.

A tailstock 103 is slidably disposed on the horizontal slide guiding surface 102 for sliding in the Z-axis direction. A tool rest 106 is slidably disposed to an inclined slide surface 102a, i.e., a slant surface which is inclined by certain angles with respect to the horizontal slide guiding surface 102. This sliding direction is movably provided in the longitudinal and transversal directions, i.e., the Z-and X-axis directions. The tool rest 106 is provided thereon with a tool turret 107 disposed around the tool turret shaft. The tool turret 107 are provided with a plurality of tools 108 stored around the turret. The tools 108 stored in the tool turret 107 include cutting or grinding tools for the used of a turning center such as, for example, a machining bite, a boring drill, a shaping end mill and grinding wheel for grinding the inner or outer peripheral surface.

Furthermore, instead of the ordinary grinding wheels, a metal bond grinding wheel for grinding a hard material such as ceramics is stored therein. In addition, a measuring touch sensor, etc. are also stored in the tool turret 107. These tools 108 are exchangable according to necessity such as wear, change of a workpiece or the like. The tools 108 stored within the tool turret 107 are rotationally driven so that a required tool will be indexed to a tool fixing place and secured thereto for use.

The movements of the above components are controlled by a numerical control apparatus 109. Adjacent to the bed 101, a magazine 110 for containing workpieces W is located. On the magazine table 111, a plurality of workpieces W are connected in a loop shape. The loop is connected to a driving device, and the workpiece W at the required place is indexed according to the commands from the numerical control apparatus 109. The holders of the workpieces W are each assigned with a magnetic and mechanical identification mark. The kinds of the workpieces W are stored in a memory within the numerical control apparatus 109. The required workpiece W is called with reference to the identification mark and the data stored within the memory.

A loader 120 adapted to take out a workpiece W within the magazine 110 and transfer it to the chuck 105 is located at the front surface of the bed 101. The loader 120 is provided at its foremost end with a holding nail 121. The holding nail 121 is opened and closed its plurality of fingers by a holding nail driving means 122 such as oil pressure so as to hold or release the workpiece W. The holding nail 121 is disposed at the foremost end of a swing arm 123. The swing arm 123 is secured to one end of a pivot shaft 124. The pivot shaft 124 is disposed at a loader body 125.

The pivot shaft 124 is pivoted about the pivot axis A within the loader body 125 and is reciprocally slided in the direction of the pivot axis direction. The loader body 125 is swung by 90 degrees about the axis B vertical to the pivot axis A of the pivot shaft 124. When swung, the loader body 125 and the pivot shaft 124 are brought to the position shown by the chain line. An electrode holder 114 adapted to hold the electrode 113 is rotatably disposed on the main spindle stock 104 at the upper portion of the chuck 105. The electrode holder 114 is rotated by a rotation driving device (not shown). The cutting of the electrode 113 and the dressing of the metal bond grinding wheel 31, which is performed thereafter, are performed in the same manner as in FIGS. 2 and 3.

FIG. 7 illustrates still another embodiment of the electrode holder 114, in which an electrode turret 170 is disposed. A turret body 171 is provided on its outer periphery with a plurality of electrodes 113. The turret body 171 is capable of rotating indexing, whereas the electrode 113 is capable of rotation. A plurality of formed electrodes 113a having various configurations can be stored. The loader 120 of the above-mentioned embodiment is for the exclusive use of the turning center of the present embodiment. However, instead of the loader 120, a general purpose robot may be employed as apparent from the foregoing description. In other words, any robot or the like may be employed as long as it has such a function as to move the workpiece W from the magazine 110 to the chuck 105.

Thereafter, the other embodiments of the present invention will be described according to FIGS. 12 through 39.

Figure 13:
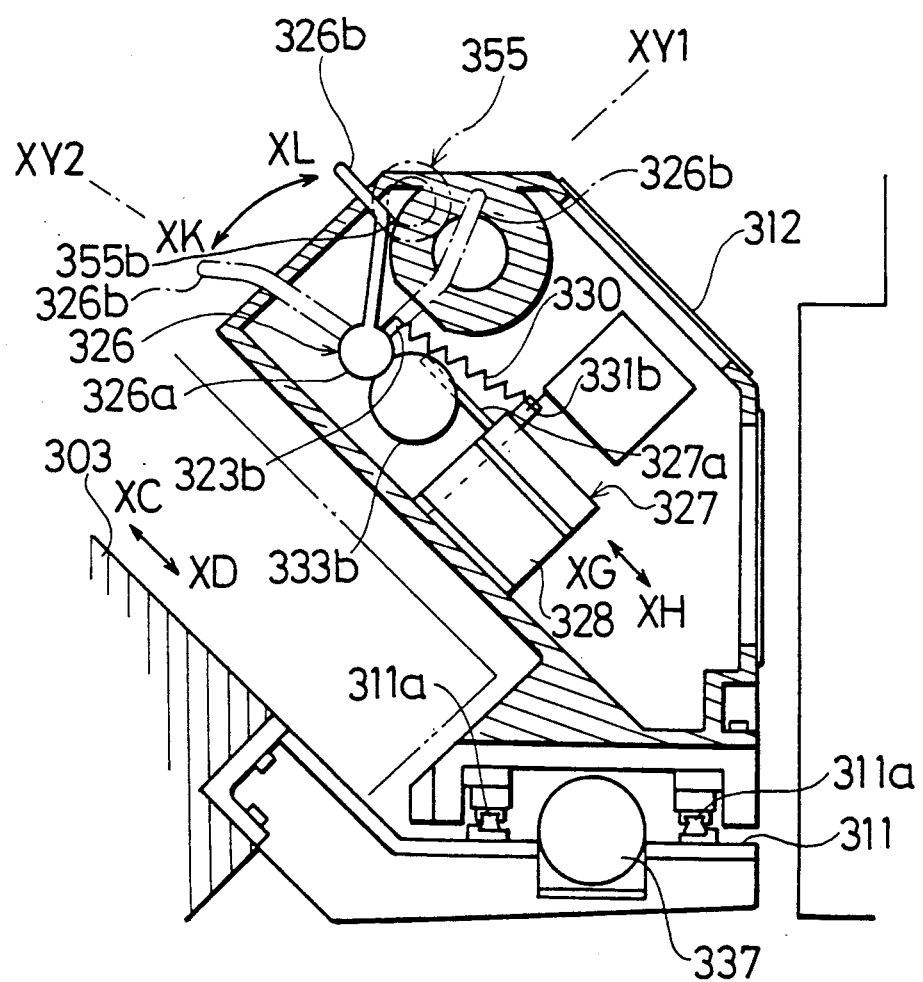
FIG. 13 is a left side elevation of FIG. 12.
Figure 14:
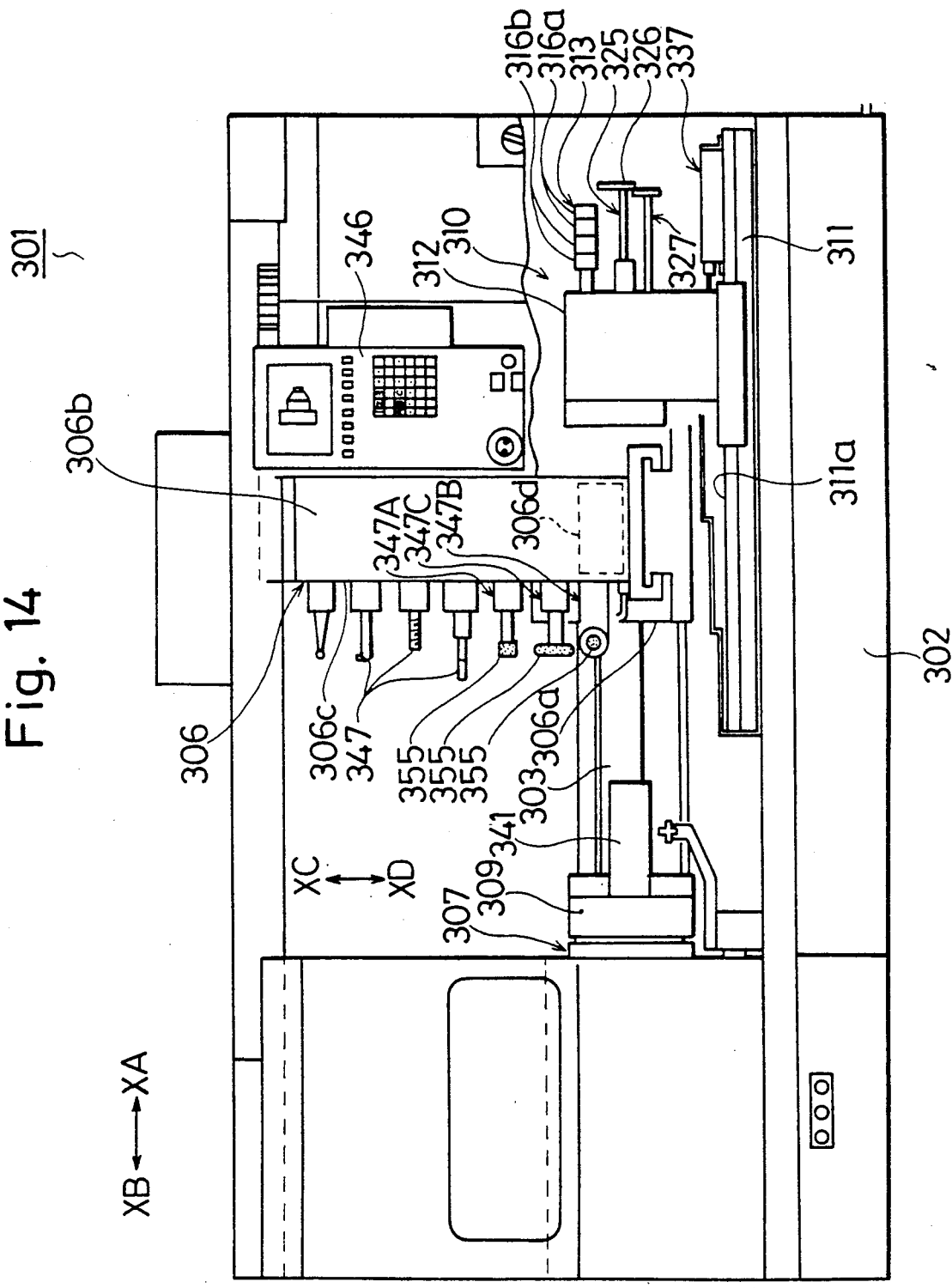
FIG. 14 is a front elevation for showing the complex machining machine tool being installed the apparatus of an embodiment of the dressing apparatus according to the present invention.

A complex machining machine tool 301 has a machine body 302 as shown in FIG. 14, and a bed 303 is provided on the machine body 302. A carrier 306a which is comprised of a tool rest 306 is supported being free to move and drive along the bed 303 in the directions as shown by the arrows XA and XB (that is, in Z axis direction) on the bed 303. The tool rest 306 has a main body of the tool rest 306b as well as the carrier 306a. That is, on the carrier 306a, the main body of the tool rest 306b is provided being free to move and drive in the perpendicular direction (that is, the directions as shown by the arrows XC and XD in FIG. 13) toward the directions as shown by the arrows XA and XB (that is, Z axis direction). And, a tool holding portion 306d is provided on the main body of the tool rest 306b as shown in FIG. 14. A chain type tool magazine 306c is provided on the main body of the tool rest 306b in the shape of supplying the tool with the tool holding portion 306d selectively. Since the tool rest 306 having the chain type tool magazine 306c, the tool holding portion 306d and the like is already known, the detailed description is omitted here.

A lot of tools 347 are installed in the chain type tool magazine 306c. In the tools 347, grinding tools 347A, 347B, 347C and the like which are different in kinds are involved. The gringding tools 347A, 347B and 347C will be explained hereunder.

Figures 33, 34:
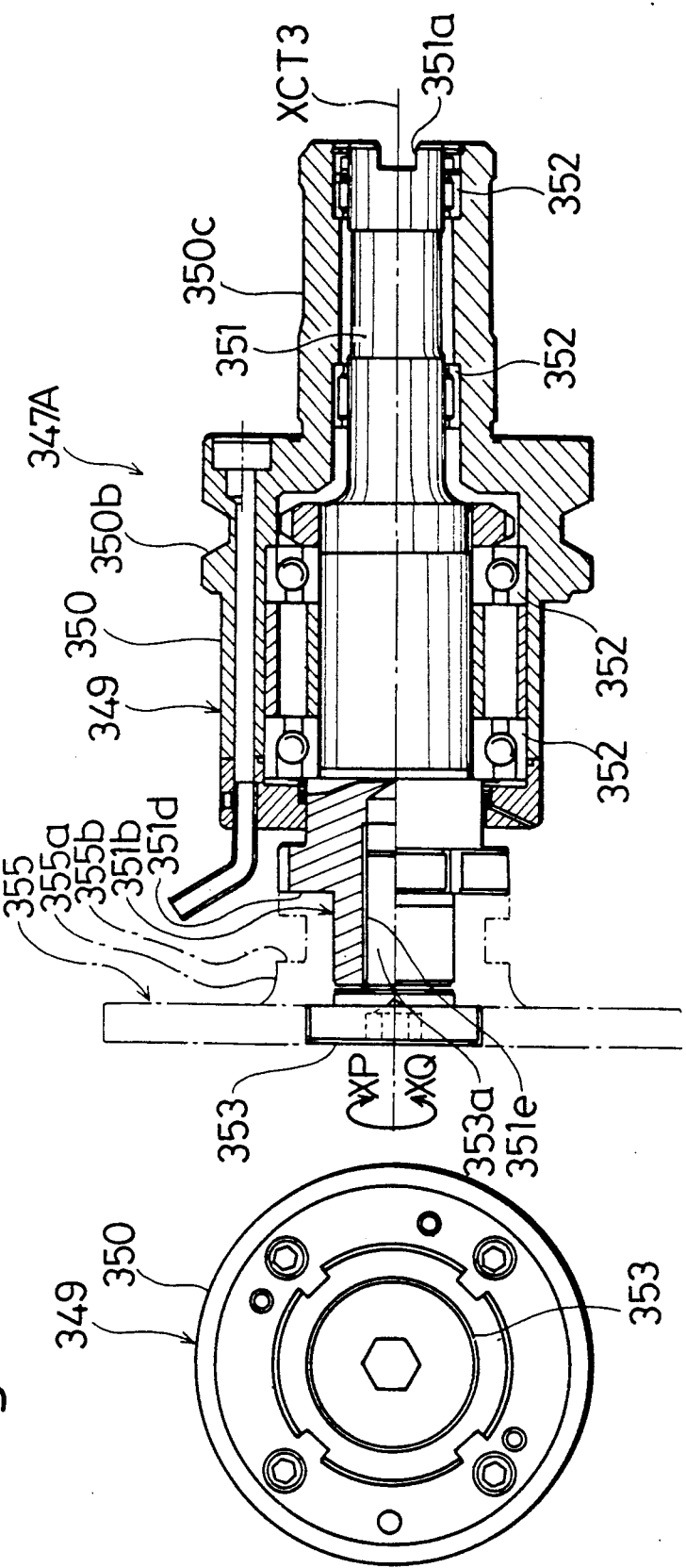
FIG. 33 is a front elevation for showing an example of the grinding tool being installed in the tool rest of the complex machining machine tool as shown in FIG. 14.
FIG. 34 is a left side elevation of the FIG. 33.
Figure 35:
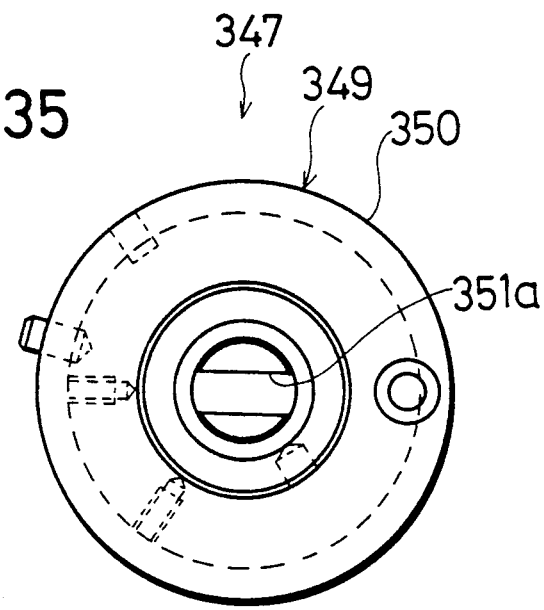
FIG. 35 is a view for showing the shank portion of the grinding tool of FIG. 33.
Figure 36:
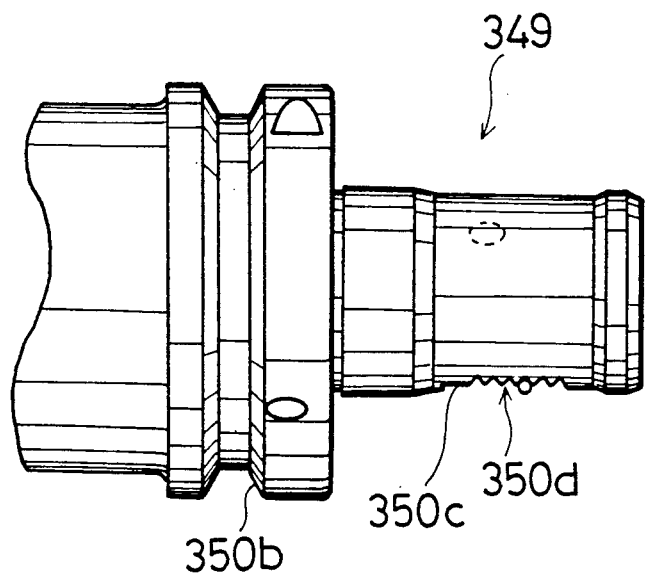
FIG. 36 is a front elevation for showing the other example of the grinding tool being installed in the tool rest of the complex machining machine tool as shown in FIG. 14.

The grinding tool 347A has a grinding stone holder 349 being formed in a hollow state as shown in FIG. 33, and the grinding stone holder 349 has a main body 350. A holding groove 350b is formed along the outer circumference face on the outer circumference face of the main body 350 in the figure. A serration groove 350d is provided at the shank portion 350c of the main body 350 as shown in FIG. 36. And, a grinding stone holding shaft 351 is rotatably supported via plural bearings 352 with an axis center XCT3 of the grinding stone holding shaft 351 as its center in the directions as shown by the arrows XP and XQ in the main body 350 as shown in FIG. 33. A connecting groove 351a capable of engaging with a rotation axis (not shown) being provided at the tool holding portion 306d is formed at the right edge portion of the grinding stone holding shaft 351 in the figure.

A grinding stone holding portion 351b is provided in the shape of projecting toward the left hand in the figure in comparison with the main body 350 with the grinding stone holding shaft 351 as shown in FIG. 33, and a holding face 351d is formed at the grinding stone holding portion 351b. A female screw 351e is formed at the grinding stone holding portion 351b in the direction of the axis center XCT3 of the grinding stone holding shaft 351. And, a clamping member 353 is connected with the grinding stone holding portion 351b by fitting the screw portion 353a in the male screw 351e. A grinding stone 355 being formed in a disk state is installed in the grinding stone holding portion 351b being free to detach and attach in the shape of being held between the clamping member 353 and the holding face 351d. An electrode connecting groove 355b is formed at a boss 355a of the grinding stone 355 along the outer circumference face of the boss 355a in the perpendicular direction toward the directions as shown by the arrows XA and XB that are the directions of the dressing/truing of the grinding stone 355.

Figure 28:
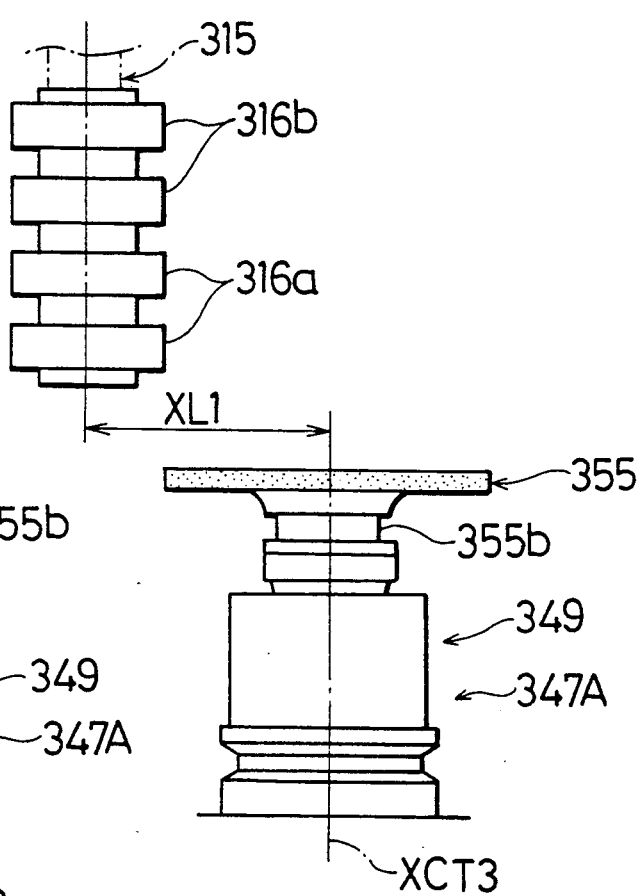
Figure 37:
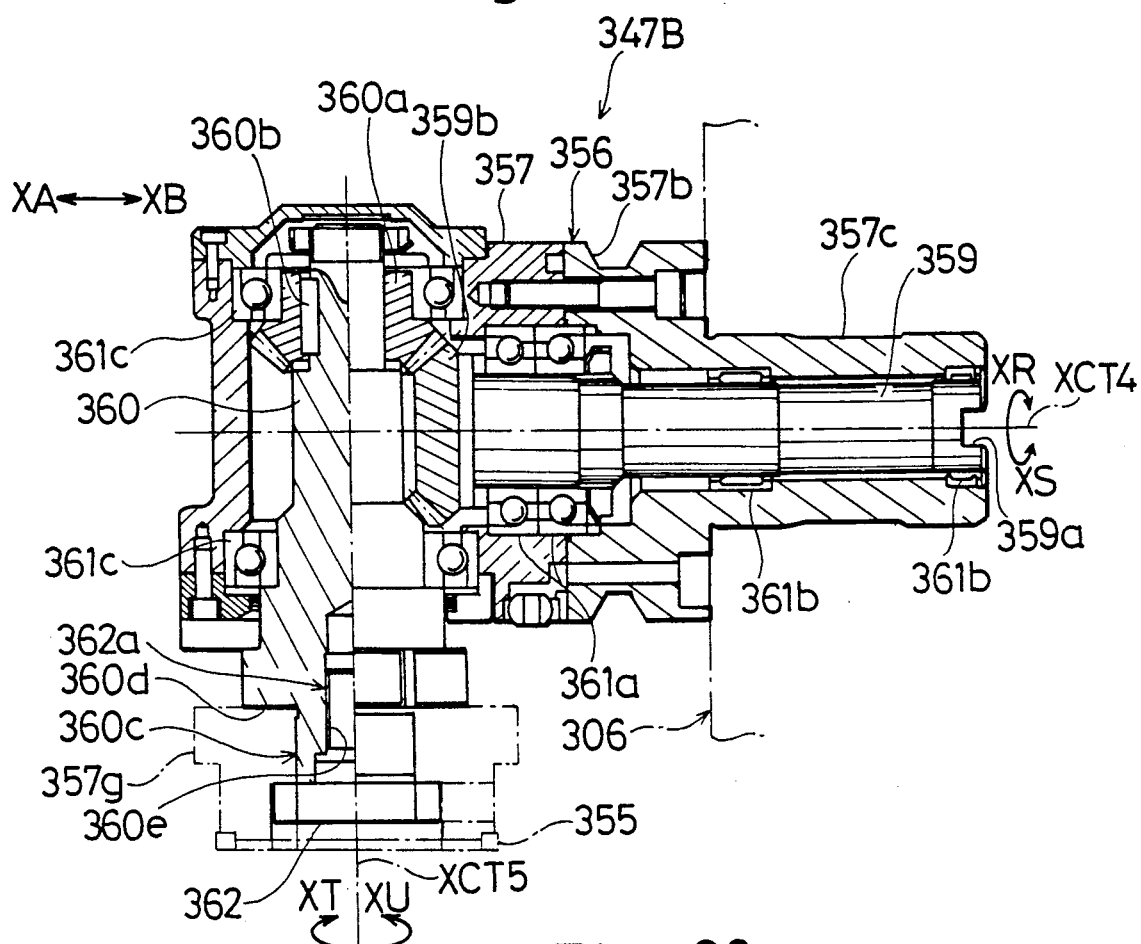
Figure 38:
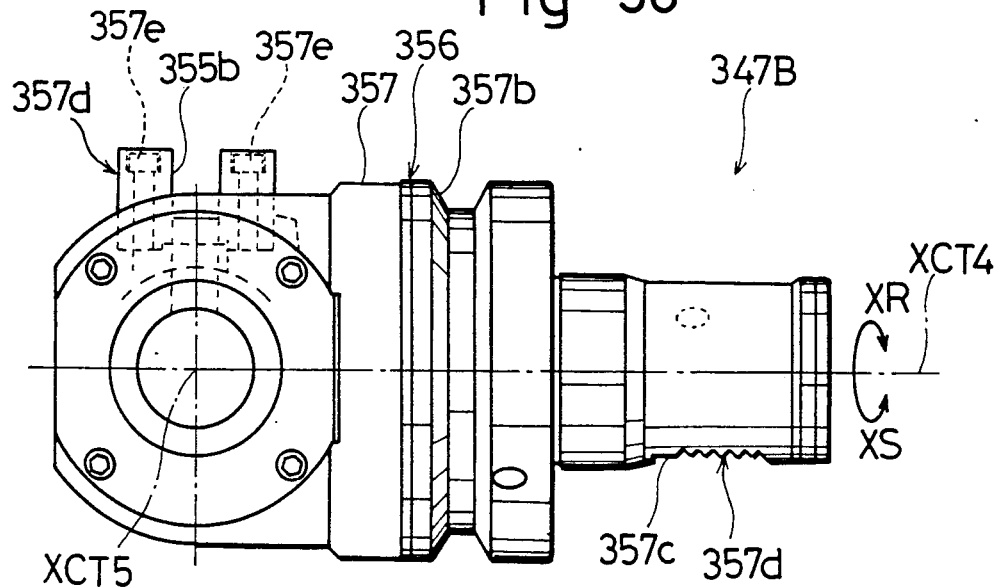
FIG. 38 is a top view of FIG. 37.

The grinding tool 347B has a grinding holder 356 as shown in FIG. 37, and the grinding holder 356 has the main body 357 formed in the shape of an elbow. A holding groove 357b is formed along the outer circumference face at the outer circumference face of the main body 357 in the figure. And, a serration groove 357d is formed at the shank portion 357c of the main body 357 as shown in FIG. 38. And, an electrode connecting member 357d being composed of insulating material is fixed to the main body 357 as shown in FIG. 28 via bolts 357e and 357e. An electrode connecting groove 355b is formed at the electrode connecting member 357d at the predetermined degrees (90 degrees in the present embodiment) to the directions as shown by the arrows XA and XB (the directions of the dressing/truing of the grinding stone 355 described thereinafter).

A connecting shaft 359 is inserted and supported being free to rotate in the main body 357 as shown in FIG. 37 via bearings 361a, 361b and the like with the axis center XCT4 of the connecting shaft 359 as its center in the directions as shown by the arrows XR and XS. A connecting groove 359a capable of engaging with a rotation axis (not shown) which is provided at the tool holding portion 306d is formed at the right edge portion of the connecting shaft 359 in the figure. A bevel gear 359b is installed in the left edge portion of the connecting shaft 359 in FIG. 37.

A grinding stone holding shaft 360 is inserted and supported in a main body 357 being free to rotate with the axis center XCT5 as its center in the directions as shown by the arrows XT and XU via bearings 361c and 361c. The axis center XCT5 of the holding shaft 360 is perpendicular to the axis center XCT4 of the connecting shaft 359. A bevel gear 360a is installed in the upper edge portion of the grinding stone holding shaft 360 in the figure via a key 360b. The bevel gear 360a meshes with the above-described bevel gear 359b being free to rotate in the directions as shown by the arrows XT and XU. And, a grinding stone holding portion 360c is provided at the lower edge portion of the grinding stone holding shaft 360 in FIG. 37 in the shape of projecting toward the down portion in the figure in comparison with the main body 357. A holding face 360d is formed at the grinding stone holding portion 360c. Moreover, a female screw 360e is formed in the direction of the axis center XCT5 of the grinding stone holding shaft 360 at the grinding stone holding portion 360c. A clamping member 362 is connected with the grinding stone holding portion 360c by fitting the screw portion 362a in the female screw 360e. And, the grinding stone 355 having ring annular form is installed in the grinding stone holding portion 360c in the shape of being held between the clamping member 362 and the holding face 360d.

Figure 39:
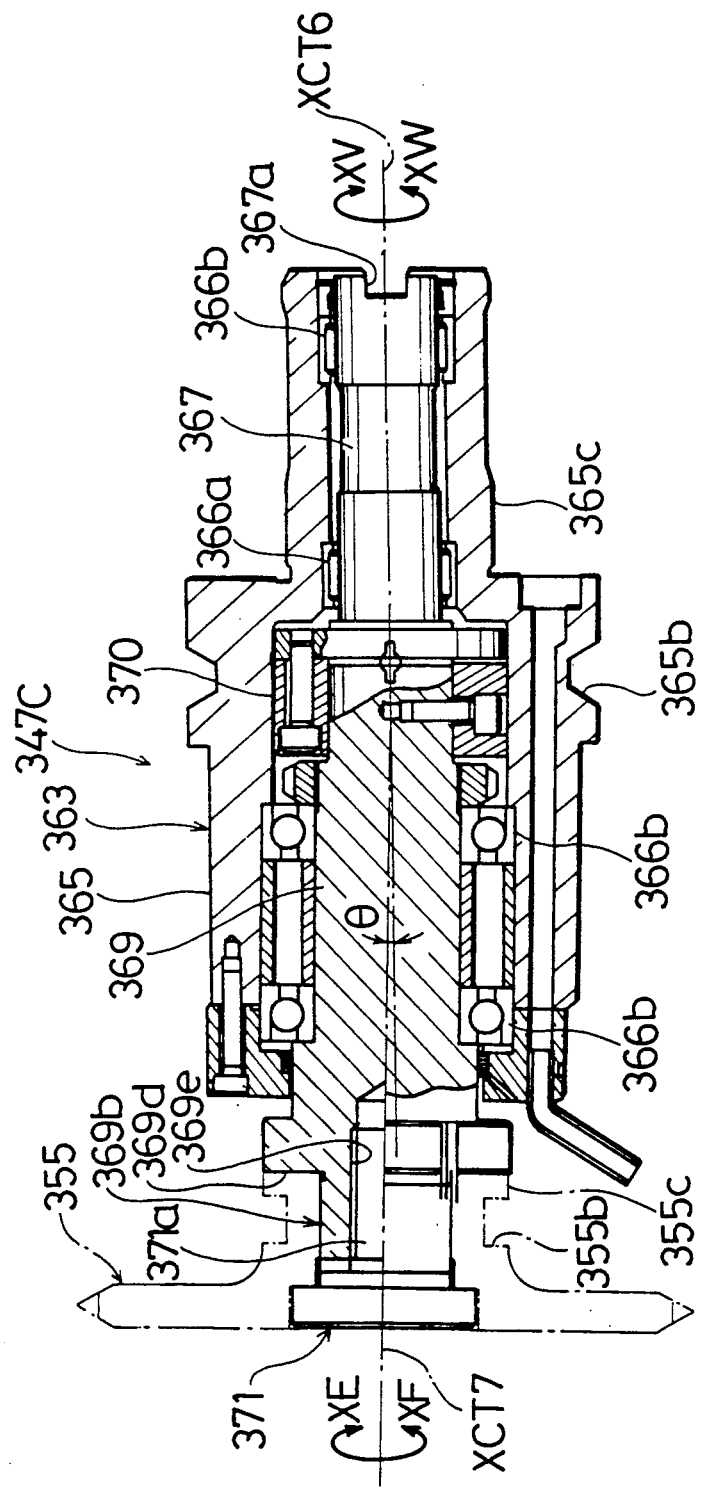
FIG. 39 is a front elevation for showing the another example of the grinding tool being installed in the tool rest of the complex machining machine tool as shown in FIG. 14.

A grinding tool 347C has a grinding stone holder 363 being formed in a hollow state as shown in FIG. 39, and the grinding stone holder 363 has a main body 365. A holding groove 365b is formed along the outer circumference face at the outer circumference face of the main body 365 in the figure. And, a serration groove (not shown) is formed at a shank portion 365c of the main body 365. And, a connecting shaft 367 is rotatably inserted in the main body 365 as shown in FIG. 39 via bearings 366a and 366a with the axis center XCT6 of the connecting shaft 367 as its center in the directions as shown by the arrows XV and XW. A connecting groove 367a is formed at the right edge portion of the connecting shaft 367 in the figure.

A grinding stone holding shaft 369 is inserted and supported in the main body 365 via bearings 366b and 366b being free to rotate around the axis center XCT7 in the directions as shown by the arrows XE and XF. The axis center XCT7 of the holding shaft 369 is given a slope with the predetermined degrees $\theta$ to the axis center XCT6 of the connecting shaft 367. The grinding stone holding shaft 369 connects with the above-described connecting shaft 367 via a flexible joint 370. And, a grinding stone holding portion 369b is provided in the grinding stone holding shaft 369 in the shape of projecting toward the left hand in FIG. 39 in comparison with the main body 365. A holding face 369d is formed at the grinding stone holding portion 369b. A female screw 369e is formed at the grinding stone holding portion 369b in the direction of the axis center XCT7 of the grinding stone holding shaft 369. And, a clamping member 371 is connected with the grinding stone holding portion 369b by fitting the screw portion 371a in the female screw 369e. And, a grinding stone 355 having the ring annular form is installed in the grinding stone holding portion 369b as shown in FIG. 39 in the shape of being held between the clamping member 371 and the holding face 369d. An electrode connecting groove 355b is annularly formed at the boss 355c of the grinding stone 355 along the outer circumference face of the boss 355c in the figure at 90 degrees to the directions as shown by the arrows XA and XB (the directions of dressing/truing of the grinding stone 355).

A spindle stock 307 is provided at the left hand of the machine body 302 in FIG. 14. A chuck 309 is installed in the spindle stock 307 via a spindle (not shown) being free to rotate and drive. A workpiece 341 is held by the chuck 309 being free to detach and attach.

Figure 12:
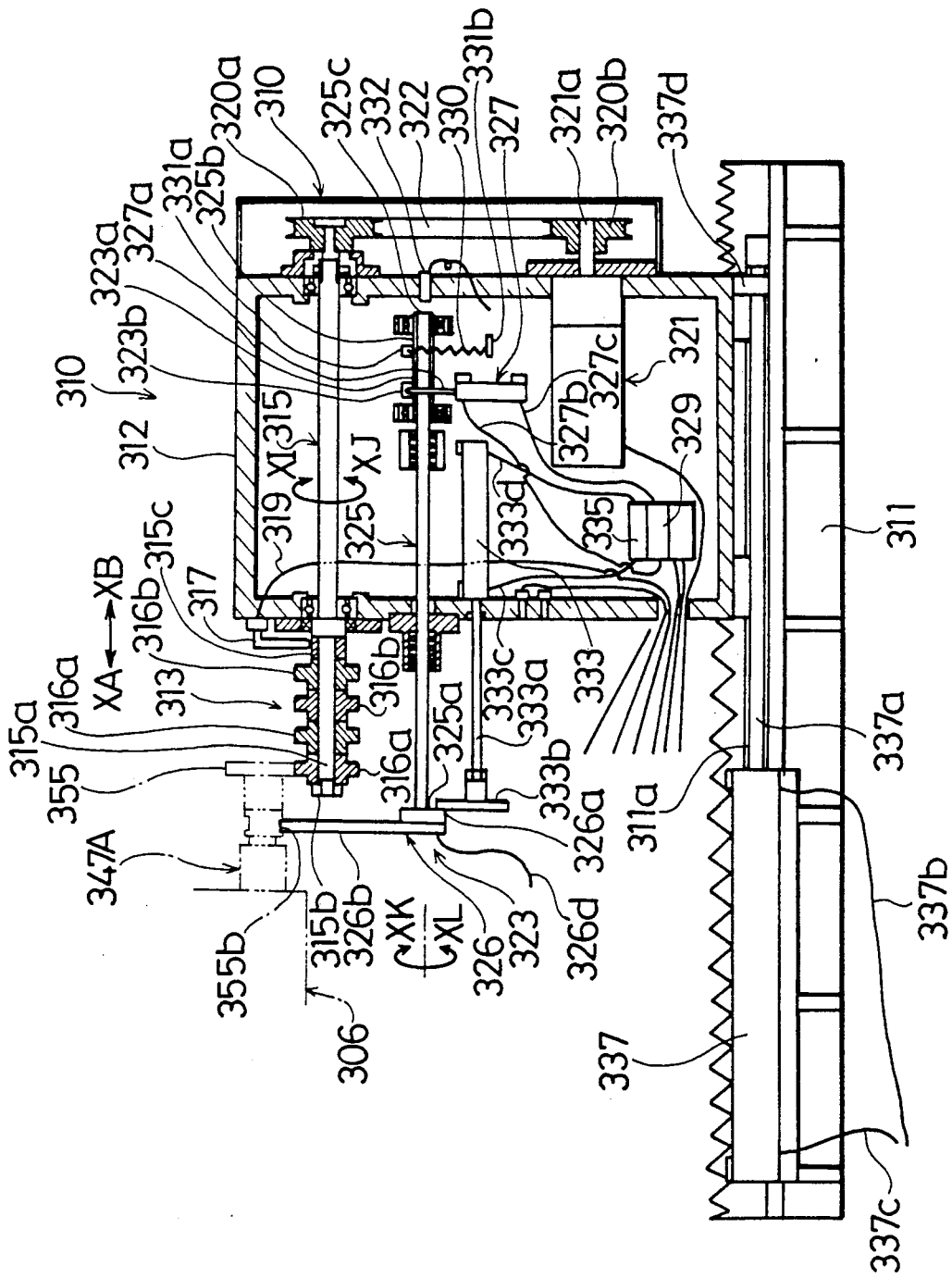
FIG. 12 is a back elevation of the dressing apparatus as shown in FIG. 14.

A dressing apparatus 310 according to the present invention is provided at the machine body 302 as shown in FIG. 14. The dressing apparatus 310 has a base 311, a main body 312, a driving cylinder 327 and the like as shown in FIG. 12. That is, the base 311 is provided on the machine body 302 in the shape of lengthening in the directions as shown by the arrows XA and XB (that is, Z axis direction). The main body 312 is provided at the base 311 via guiderails 311a and 311a along the base 311 being free to move in the directions as shown by the arrows XA and XB (that is, Z axis direction). A machining electrode portion 313 is provided at the main body 312 as shown in FIG. 12. The machining electrode portion 313 has a supporting shaft 315, a machining electrode for finishing machining and rough machining 316a, 316b, a driving motor 321 and the like.

The supporting shaft 315 is provided with the main body 312 as shown in FIG. 12 via the plural number of bearings and the like, and the axis center is provided parallel with the directions as shown by the arrows XA and XB (that is, Z axis direction). And, the supporting shaft 315 is rotatably provided in the directions as shown by the arrows XI and XJ. An electrode supporting portion 315a is formed at the supporting shaft 315 in the shape of projecting in the direction as shown by the arrow XA in comparison with the main body 312. An initial power receiving ring 315c having ring annular form is fixed to the right edge portion of the electrode supporting portion 315a in the figure. And, the machining electrode 316a, 316a being composed of copper for finishing truing/dressing and the machining electrode 316b, 316b being composed of black lead for rough truing/dressing are installed in the electrode supporting portion 315a in the shape of pushing to the initial power receiving ring 315c by means of a clamping member 315b in series in the directions as shown by the arrows XA and XB. An electrode 317 is slidably connected with the initial power receiving ring 315c. The electrode 317 is connected with an electric discharge unit which isn't shown in the figure via a feed cable 319.

A pulley 320a is installed in the right edge portion of the supporting shaft 315 of FIG. 12. And, the driving motor 321 is provided at the lower edge portion of the main body 312 in the figure in the shape of being distant with the predetermined distance from the supporting shaft 315 to the lower hand in the figure. A driving shaft 321a is rotatably supported by the driving motor 321. A pulley 320b is installed in the driving shaft 321a. A belt 322 having no edge is provided in the shape of being stretched between the pulley 320a which is installed in the supporting shaft 315 and the pulley 320b.

An electric feed mechanism for tool 323 is provided at the main body 312 as shown in FIG. 12. The electric feed mechanism for tool 323 has a supporting cylinder 323a, rotating shaft 325, a cylinder for rotating 327, a positioning cylinder 333 and the like. That is, the supporting cylinder 323a being formed in a hollow state is provided with the main body 312 being free only to rotate in the directions as shown by the arrows XK and XL via the plural number of bearing and the like. An engaging member 323b is provided in the shape of bedding at the outer circumference face of the supporting cylinder 323a as shown in FIG. 13. In the supporting cylinder 323a, the rotating shaft 325 is inserted and supported via a sliding means (not shown) such as a key being free to move in the directions as shown by the arrows XA and XB (that is, Z axis direction) only. The tool electrode 326 is installed in the left edge portion 325a of the rotating shaft 325 in the figure via the boss 326a being composed of the electrode 326. An electrode bar 326b being formed in the shape of an elbow is provided at the boss 326a in the shape of engaging and contacting with the above-described grinding tool 347A and the like as shown in FIG. 13.

Figure 15:
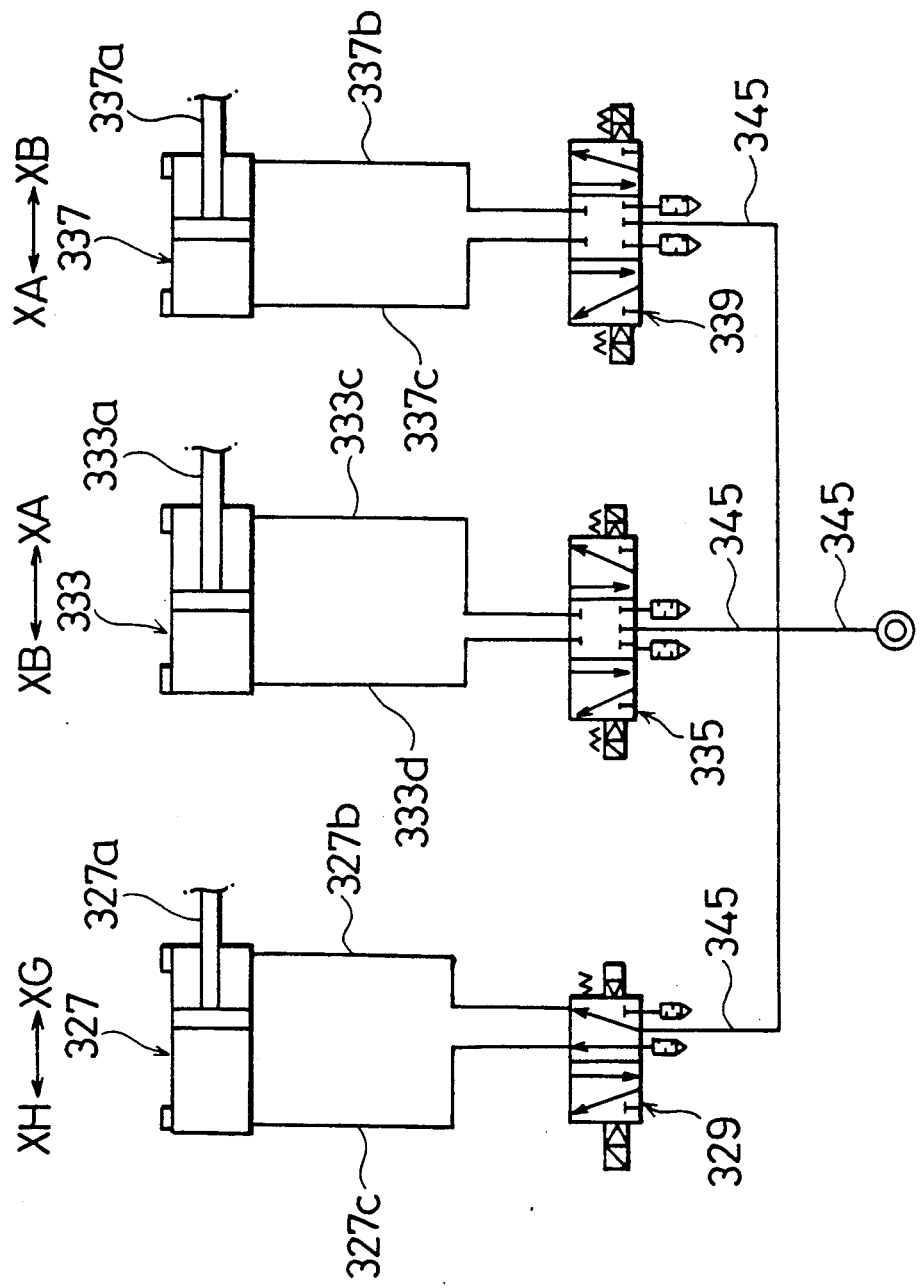
FIG. 15 is a air-circuit view of the dressing apparatus according to the present invention.

The cylinder for rotating 327 is provided at the lower portion of the supporting cylinder 323a of the main body 312 in FIG. 12 via a base 328. A rod 327a is supported by the cylinder for rotating 327 being free to project and retreat in the directions as shown by the arrows XG and XH in FIG. 13. And, the cylinder for rotating 327 is connected with a solenoid valve 329 via tubes 327b and 327c as shown in FIG. 15. The solenoid valve 329 connects with a compressed air supply means which isn't shown in the figure.

A spring 330 is provided in the shape of stretching between the base 328 and the supporting cylinder 323a via supporting blocks 331a and 331b. The supporting cylinder 323a (that is, the rotating shaft 325) is always energized by the spring 330 in the direction as shown by the arrow XL. A rotating shaft terminal acknowledge sensor 332 is provided at the main body portion 312 which is distant with the predetermined distance form the right edge 325c of the rotating shaft 325 to the right hand in FIG. 12.

A positioning cylinder 333 of which the electric feed mechanism for tool 323 is composed is provided with the main body 312 as shown in FIG. 12 in the shape of being distant with the predetermined distance from the rotating shaft 325 to the down portion in the figure. A rod 333a is supported by the positioning cylinder 333 being free to project and retreat in the directions as shown by the arrows XA and XB (that is, Z axis direction). A pressure plate 333b being formed in a disk state is provided with the top edge portion of the rod 333a in the figure in such a manner that the above-described tool electrode 326 is pressurized in the direction as shown by the arrow XA. A solenoid valve 335 is connected with the positioning cylinder 333 via tubes 333c and 333d as shown in FIG. 15. The solenoid valve 335 connects with a compressed air supply source (not shown) via the tube 345.

On the other hand, a cylinder 337 of which the dressing apparatus 310 is composed is provided between guiderails 311a and 311a on the base 311 as shown in FIG. 13. A rod 337a is supported by the cylinder 337 being free to project and retreat in the directions as shown by the arrows XA and XB (that is, Z axis direction). The top edge portion of the rod 337a in FIG. 12 connects with the down edge portion of the main body 312 in the figure via the connecting member 337d. A solenoid valve 339 is connected with the cylinder 337 via tubes 337b and 337c as shown in FIG. 15. The solenoid valve 339 connects with a compressed air supply source (not shown) via the tube 345.

With the above-described constitution of the complex machining machine tool 301, grinding machining is performed toward the workpiece 341 by using the complex machining machine tool 301 as follows. That is, the workpiece 341 to be machined is installed in the spindle stock 307 as shown in FIG. 14 via the chuck 309. And, the chain tool magazine 306c of the tool rest 306 is properly rotated to supply the grinding tool 347A to be used for machining with the tool holding portion 306d which is provided with the tool rest main body 306b among the plural number of the tools 347 which is installed in the magazine 306c.

Thereafter, the workpiece 341 is rotated via the chuck 309 in such a manner that the grinding stone 355 of the grinding tool 347A as shown in FIG. 33 is rotated and the spindle which isn't shown in the figure is driven. In this state, the tool rest main body 306b is moved with the predetermined distance along the carrier 306a together with the grinding tool 347A in the direction as shown by the arrow XD in FIG. 14, and the carrier 306b is properly moved and driven along the bed 303 in the directions as shown by the arrows XA and XB. Then, the workpiece 341 is grinded by means of the grinding stone 355 of the grinding tool 347A. It is off course that the predetermined grinding machining can be performed toward the workpiece 341 by means of the grinding tools 347B and 347C instead of the grinding tool 347A in such a manner that the grinding tools 347B and 347C which are installed in the chain tool magazine 306c are supplied with the tool holding portion 306d of the tool rest main body 306b respectively.

In the process of such a grinding machining, each grinding stone 355 of the grinding tools 347A, 347B and 347C become to be deformed and blind. In case that the blinding and the like becomes ugly, it is necessary to perform truing and dressing toward those grinding tools 347A, 347B and 347C in order to keep machining accuracy. The explanation which is described hereinafter is in relation to the case that dressing and the like are performed by using the dressing apparatus 310 as shown in FIG. 12 in state that the grinding tools 347A, 347B and 347C are installed in the tool holding portion 306d of the tool rest 306.

The solenoid valve 335 as shown in FIG. 15 is switched, the positioning cylinder 333 as shown in FIG. 12 is driven, and the rod 333a is projected together with the pressure plate 333b in the direction as shown by the arrow XA. Then, the pressure plate 333b abuts on the boss 326a of the tool electrode 326. And, the tool electrode 326 is pushed by the pressure plate 333b to extract the rotating shaft 325 from the supporting cylinder 323a in the direction as shown by the arrow XA, and moves with the predetermined distance in the direction as shown by the arrow XA and is positioned at the predetermined waiting position. Thereafter, in this state, the solenoid valve 339 as shown in FIG. 15 is properly switched to drive the cylinder 337 as shown in FIG. 12, and the rod 337a is moved in the direction as shown by the arrow XB. Then, the main body 312 of which the dressing apparatus is composed is moved from the waiting position as shown in FIG. 16 in the direction as shown by the arrow XB in the shape of being pushed by the rod 337a via the connecting member 337d and is positioned at the dressing position as shown in FIG. 17.

In this state, the driving motor 321 as shown in FIG. 12 is driven and the driving shaft 321a is rotated together with the pulley 320b. According to this, the supporting shaft 315 is rotated together with the machining electrodes 316a, 316a 316b and 316b via the belt 322 and the pulley 320a in the direction as shown by the arrow XI or XJ. And, by rotating the chain type tool magazine 306c of the tool rest 306 as shown in FIG. 14 properly, the tool for cutting 347 which is installed in the magazine 306c such as a bite is supplied with the tool holding portion 306d.

Moreover, in this state, the tool rest main body 306b is fed with the predetermined distance together with the tool 347 such as a bite along the carrier 306a in the direction as shown by the arrow XD in FIG. 13. And, the tool rest main body 306b is properly moved and driven together with the tool 347 via the carrier 306a in the directions as shown by the arrows XA and XB. Then, the machining electrodes 316a and 316a for finishing machining and the machining electrodes 316b and 316b for rough machining of the dressing apparatus 310 as shown in FIG. 18 are cut in the shape of a cylinder and molded in the outer circumference in the figure by means of the tool. When the forming of the machining electrodes 316a, 316a, 316b and 316b is finished, the tool rest 306 is moved with the predetermined distance together with the tool 417 in the direction as shown by the arrow XC. According to this, the tool rest 306 is retreated from the dressing apparatus 310.

In this way, when the machining electrodes 316a and 316b are formed, the operation is performed for connecting the tool electrode 326 of which the electric feed mechanism for tool 323 is comprised with the grinding tool 347A for performing dressing. For performing the operation, the rod 327a of the cylinder for rotating 327 is projected in the direction as shown by the arrow XG in FIG. 13 by switching the solenoid valve 329 as shown in FIG. 15. Then, the rod 327a abuts on the engaging member 323b which is provided with the supporting cylinder 323a in the shape of bedding. Moreover, in this state, it is moved with the predetermined distance in the direction as shown by the arrow XG. Then, the supporting cylinder 323a resists elasticity of the spring 330 together with the rotating shaft 325 in the shape of being pushed by the rod 327a via the engaging member 323b, and rotates the predetermined degrees in the direction as shown by the arrow XK. Therefore, the tool electrode 326 which is installed in the rotating shaft 325 is rotates the predetermined degrees from the waiting position XY1 in the direction as shown by the arrow XK, and is positioned at the connecting preparation position XY2 (see FIG. 19).

On the other hand, the grinding tool 347A for performing dressing is supplied with the tool holding portion 306d by rotating the chain type tool magazine 306c of the retreating tool rest 306 properly. Moreover, in this state, the tool rest 306 is properly moved and driven together with the grinding tool 347A in the directions as shown by the arrows XA and XB and in the directions as shown by the arrows XC and XD. Then, the grinding tool 347A is positioned at the predetermined electrode connecting position XC1 (see FIG. 20), and the electrode connecting bar 355b is faced to the electrode bar 326b.

Next, in this state, the rod 327a of the cylinder for rotating 327 is retreated in the direction as shown by the arrow XH in FIG. 13 by switching the solenoid valve 329 as shown in FIG. 15. Then, the engaging member 323b rotates the predetermined degrees together with the supporting cylinder 323a in the direction as shown by the arrow XL by the elasticity of the spring 330 since the regulation of movement in the direction as shown by the arrow XL by means of the rod 327a is released. In result, the rotating shaft 325 which is supported by the supporting cylinder 323a rotates the predetermined degrees together with the tool electrode 326 in the direction as shown by the arrow XL, and the electrode bar 326b of the tool electrode 326 inserts and engage with the grinding tool 347A as shown in FIG. 20 being free to slide via the electrode connecting groove 355b.

Figure 21:
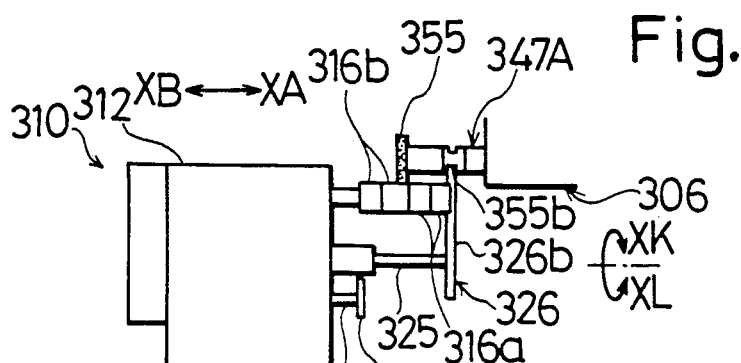

In this way, when the tool electrode 326 is connected with the grinding tool 347A, the rod 333a of the positioning cylinder 333 is retreated together with the pressure plate 333b in the direction as shown by the arrow XB as shown in FIG. 21 by driving the solenoid valve 335 as shown in FIG. 12. Then, the pressure plate 333b is positioned at the position being distant with the predetermined distance from the boss 326a of the tool electrode 326 in the direction as shown by the arrow XB.

Next, the grinding stone 355 of the grinding tool 347A is positioned at the position facing the electrode 316b for rough machining as shown in FIG. 21 in such a manner that the tool rest 306 as shown in FIG. 20 is moved the predetermined distance together with the grinding tool 347A in the direction as shown by the arrow XB. Then, the tool electrode 326 is moved the predetermined distance in the direction as shown by the arrow XB in the shape of going after the grinding tool 347A via the electrode bar 326b which is inserted into the electrode connecting groove 355b of the grinding tool 347A, pressing the rotating shaft 325 into the main body 312. On this occasion, the electrode connecting groove 355b is formed at 90 degrees to the direction as shown by the arrows XA and XB (that is, Z axis direction). And, since the tool electrode 326 is always energized in the direction as shown by the arrow XL by the spring 330, the tool electrode 326 don't slip out of the electrode connecting groove 355b during the movement of the grinding tool 347A in the direction as shown by the arrow XB.

In this state, the driving motor 321 as shown in FIG. 12 is driven to rotate the driving shaft 321a together with the pulley 320b. So, the supporting shaft 315 is rotate together with the machining electrodes 316a, 316a, 316b and 316b via the belt 322 and the pulley 320a in the direction as shown by the arrow XI or XJ. And, the grinding stone 355 is rotated in the shape of being distant the predetermined distance away from the machining electrode 316b. Furthermore, electricity is fed between the grinding stone 355 of the grinding tool 347A and machining electrode 316b via the feed cables 326d, 319 and the like by driving the electric discharge unit (not shown). Then, high voltage is charged between the grinding stone 355 of the grinding tool 347A and the machining electrode for rough machining 316b, and electric discharge occurs. And, electric current runs in the electric discharge circuit being formed by the electric discharge unit, the feed cable 326d, the tool electrode 326, the electrode connecting groove 355b, the grinding stone 355, the machining electrode 316b, the initial power receiving ring 315c, the electrode 317 and the feed cable 319. Therefore, electric discharge machining is performed toward the grinding stone 355 in the outer circumference face and rough truing and dressing are performed. On this occasion, since the electrode bar 326b of the tool electrode 326 is pressured toward the electrode connecting groove 355b of the grinding tool 347A at the predetermined pressure by the elasticity of the spring 330 (see FIG. 13), the electrode bar 326b don't slip out of the electrode connecting groove 355b during the machining, and rough machining and the like are smoothly performed.

In this way, when rough truing and the like are performed toward the grinding stone 355A of the grinding tool 347A, the tool rest 306 as shown in FIG. 21 is moved the predetermined distance together with the grinding tool 347A in the direction as shown by the arrow XA, and the grinding stone 355 of the grinding tool 347A is faced to the machining electrode 316a for finishing truing and dressing. Then, tool electrode 326 is moved the predetermined distance in the direction as shown by the arrow XA by extracting the rotating shaft 325 from the main body 312 in the shape of going after the grinding tool 347A via the electrode bar 326b which is inserted in the electrode connecting groove 355b of the grinding tool 347A. On this occasion, since the electrode connecting groove 355b is formed at 90 degrees to the moving direction of the grinding tool 347A, which directions are ones as shown by the arrows XA and XB (that is, Z axis direction), the tool electrode 326 don't slip out of the electrode connecting groove 355b during the movement of the grinding tool 347A in the direction as shown by the arrow XA.

Next, in this state, high voltage is charged between the grinding stone 355 of the grinding tool 347A and the machining electrode 316a for finishing machining via the feed cable 326d, 319 and the like by driving the electrode discharge unit, and electric discharge occurs.

Then, finishing truing and dressing are performed toward the grinding stone 355. On this occasion, since the electrode bar 326b of the tool electrode 326 is certainly connected with the grinding stone 355 via the electrode connecting groove 355b of the grinding tool 347A as described before, the electric discharge circuit being formed by the electric discharge unit, the feed cable 326d, the tool electrode 326, the electrode connecting groove 355b, the grinding stone 355, the machining electrodes 316a and 316b, the initial power receiving ring 315c, the electrode 317 and the feed cable 319 isn't broke off during machining, finishing truing and dressing is smoothly performed.

Figure 27:
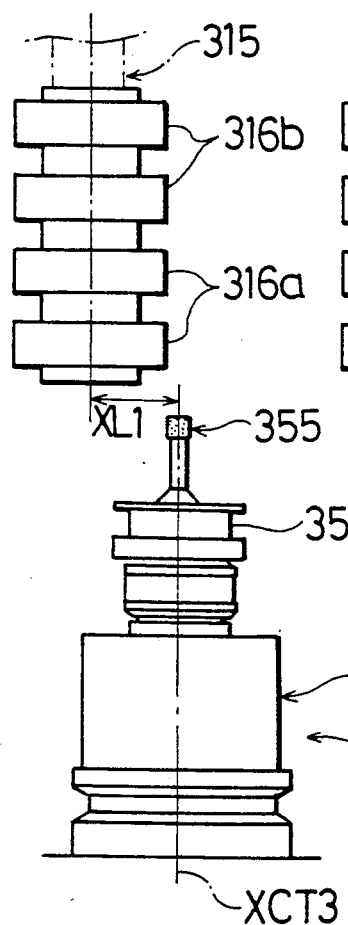
Figure 31:
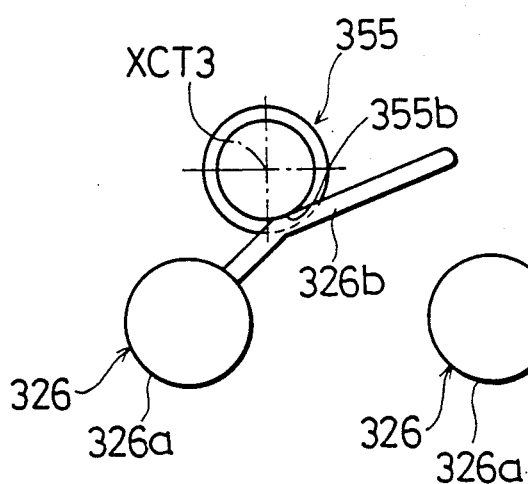
Figure 32:
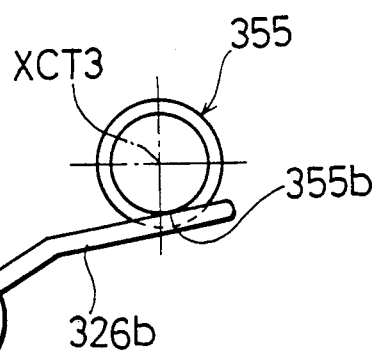

When those truing and dressing are performed, the distance XL1 between the axis center of the machining electrode 316a, 316b for finishing machining and rough machining (the axis center of the supporting shaft 315) and the axis center XCT3 of the grinding stone 355 is different due to the size of the diameter of the grinding stone 355 of the grinding tool 347A as shown in FIGS. 26 through 28 in order to keep at regular interval between the outer circumference face of the machining electrodes 316a and 316b in the figure and the outer circumference face of the grinding stone 355 for performing dressing/truing. However, the electrode bar 326b of the tool electrode 326 is formed in the long and narrow shape. Therefore, in case that the diameter of the grinding stone 355 is large as shown in FIG. 28 and FIG. 32, the top edge portion of the electrode bar 326b in the figure is inserted in the electrode connecting groove 355b of the grinding stone 355. And, in case that the diameter is small as shown in FIG. 27 and FIG. 31, the root portion of the electrode bar 326b is inserted in the electrode connecting groove 355b. Moreover, in case that the diameter of the grinding stone 355 has middle size as shown in FIG. 26 and FIG. 39, the center portion of the electrode bar 326b is inserted in the electrode connecting groove 355b. In all cases as described before, truing and dressing can be performed without hindrance by connecting the tool electrode 326 with the grinding stone 355 via the electrode connecting groove 355b.

Figure 29:
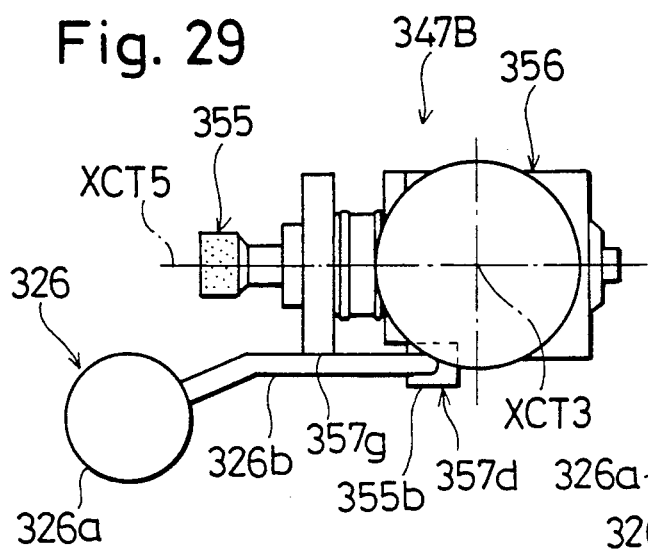
FIGS. 29 through 32 are views for showing the contact condition between each grinding tool as shown in FIGS. 25 through 28 and the tool electrode.
Figure 30:
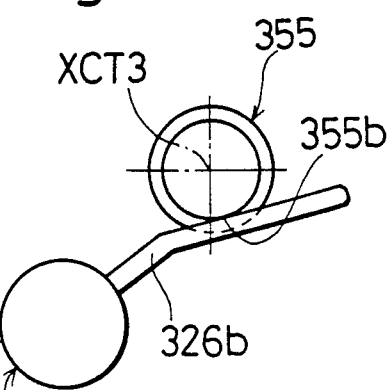

When the grinding tool 347B as shown in FIG. 37 is installed in the tool rest 306 of the complex machining machine tool 301 and truing and dressing is performed toward the grinding tool, in which the axis center XCT5 of the grinding stone 355 intersects the directions as shown by the arrows XA and XB (Z axis direction) at 90 degrees, the axis center of the machining electrode 316a, 316b (the axis center of the supporting shaft 315) and the axis center XCT5 of the grinding stone 355 are orthogonal each other as shown in FIG. 25. In this case, the electrode bar 326b of the tool electrode 326 contacts the electrode contact portion 357g of the grinding stone 355 as shown in FIG. 29 in such a manner that the top edge portion of the electrode bar 326b in the figure is inserted in the electrode connecting groove 355b of the electrode connecting member 357d being formed parallel with the axis center XCT5 of the grinding stone 355, that is perpendicular to Z axis direction. Therefore, truing and dressing can be performed without hindrance by connecting the tool electrode 326 with the grinding stone 355 via the electrode contact portion 357g rotating together with the grinding stone 355.

Moreover, in case that truing and dressing are performed toward the grinding tool 347C for screw grinding as shown in FIG. 39, truing and dressing can be performed without hindrance in such a manner that the tool electrode 326 is connected with the grinding stone 355 via the electrode connecting groove 355b by inserting the electrode bar 326b of the tool electrode 326 in the electrode connecting groove 355b of the grinding stone 355 as shown in FIG. 39.

In this way, when finishing truing and dressing are performed toward the grinding tool 347A and the like, the engaging member 323b is rotated only the predetermined angle in the direction as shown by the arrow XK together with the supporting cylinder 323a in the shape of resisting the elasticity of the spring 330 in such a manner that the solenoid valve 329 as shown in FIG. 15 is switched, and the rod 327a of the cylinder for rotating 327 is projected in the direction as shown by the arrow XG in FIG. 13. Then, the rotating shaft 325 also rotates only the predetermined angle together with the tool electrode 326 in the direction as shown by the arrow XK, the engaging state is released between the electrode 326 and each electrode connecting groove 355b, and the electrode 326 returns to the connecting preparation position XY2.

Figure 22:
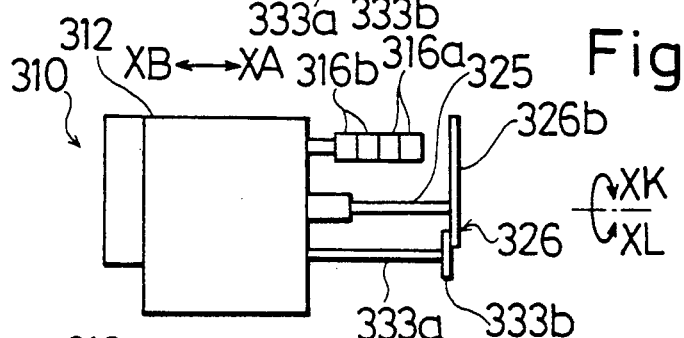

In this state, the rod 333a of the positioning cylinder 333 is projected together with the pressure plate 333b in the direction as shown by the arrow XA as shown in FIG. 22 by switching the solenoid valve 335. Then, the rotating shaft 325 moves in the direction as shown by the arrow XA in such a manner that the tool electrode 326 is pushed by the pressure plate 333b and is positioned at the predetermined waiting position.

Figure 23:
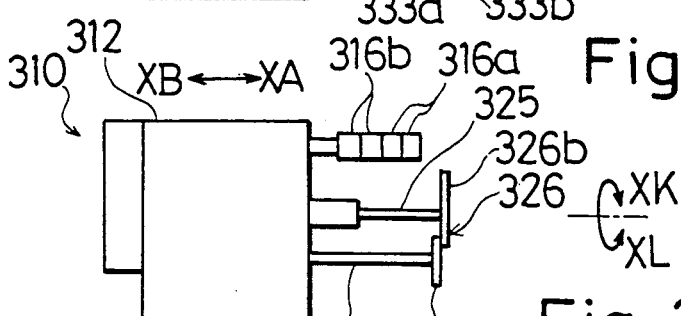

When the rotating shaft 325 moves in the direction as shown by the arrow XA, the grinding tool 347A is retreated together with the tool rest 306 in the direction as shown by the arrow XC, then the rod 327a of the cylinder for rotating 327 is retreated in the direction as shown by the arrow XH in FIG. 13 in such a manner that the solenoid valve 329 is driven, and the engaging member 323b, that is to say, the supporting cylinder 323a is rotated only with the predetermined angle in the direction as shown by the arrow XL by the elasticity of the spring 330. Then, the rotating shaft 325 also rotates with the predetermined angle together with the tool electrode 326 in the direction as shown by the arrow XL as shown in FIG. 23, and returns to the waiting position XY1 from the connecting preparation position XY2.

Figure 24:
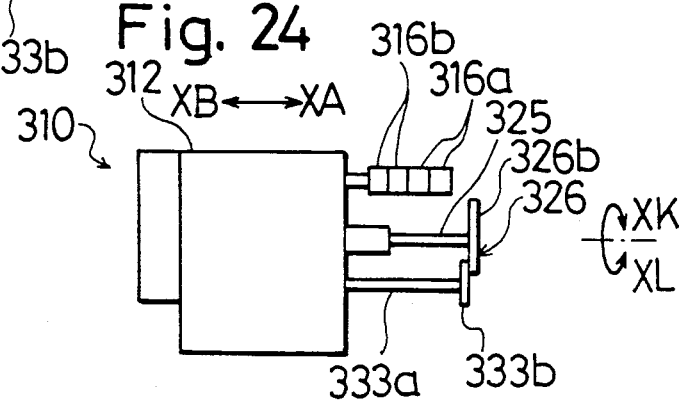

Furthermore, in this state, the rod 337a is retreated with the predetermined distance in the direction as shown by the arrow XA by driving the cylinder 337 as shown in FIG. 12. Then, the main body 312 of which the dressing apparatus 310 is comprised moves in the direction as shown by the arrow XA from the dressing position as shown in FIGS. 17 through 23 in the shape of being pulled via the connecting member 337d, and is positioned at the waiting position as shown in FIG. 16 and FIG. 24.

In case that the machining electrode 316a, 316a is detached from the electrode supporting portion 315a of the supporting shaft 315 as shown in FIG. 12 according to the necessity, the clamping member 315b is took away from the supporting shaft 315, and the machining electrode 316a, 316b are pulled out along the electrode supporting portion 315a in the direction as shown by the arrow XA. And, in order to attach the machining electrode 316a, 316b to the electrode supporting portion 315a, the machining electrode 316a, 316b are faced to the left edge of the electrode supporting portion 315a in the figure. In this state, the machining electrode 316a, 316b are moved with the predetermined distance along the supporting portion 315a in the direction as shown by the arrow XB, and are clamped by means of the clamping member 315b in this state in such a manner that the machining electrode 316a, 316b are pushed to the initial power receiving ring 315c.

In the above-described embodiment, it mentioned that truing and dressing are performed toward the flat portion of each grinding stone 355 of the grinding tool 347A and the like (for instance, the left edge surface in the figure of the grinding stone 355 in FIG. 25 and the outer circumference face in the figure of the grinding stone 355 in FIGS. 26 through 28.) by using the machining electrodes 316a and 316b. That isn't the thing. It is possible that rough truing and finishing truing are performed toward the grinding stone 355 portion having the various shapes by changing the shape of the machining electrode 316a, 316b properly. For instance, in case that the outer circumference face of the grinding stone 355 for performing truing in FIG. 12 is formed in an arc condition, the outer circumference faces in the figure of the partial electrodes among the plural number of the machining electrodes 316a and 316b are formed in the shape of making a dent in an arc condition corresponding to the grinding stone 355. Then, rough truing and finishing truing can performed toward the outer circumference face of the grinding stone 355 by means of the machining electrode. In the above-described embodiment, it is mentioned that the dressing apparatus 310 is disposed on the machine body 302 of the machine tool 301 as shown in FIG. 14 in such a manner that the machining electrode 316a, 316b, the tool electrode 326 and the like locates the right side of the figure of the main body 312. However, that isn't the thing in the installation method of the dressing apparatus 310. Any installation method for the machine tool 301 is available if the tool electrode 326 can be moved in the directions as shown by the arrows XA and XB (the truing/dressing directions) and the machining electrode 316a, 316b can be installed along the same direction. For instance, it is possible that the dressing apparatus 310 is disposed on the machine body 302 of the machine tool 301 in such a manner that the machining electrode 316a, 316b, the tool electrode 326 and the like locate the reverse direction to the position as shown by full line in FIG. 14, that is to say, those machining electrodes 316a, 316b and the like locate the left side in the figure of the main body 312.

The other embodiments of the present invention will be described in FIGS. 40 through 49.

Figure 40:
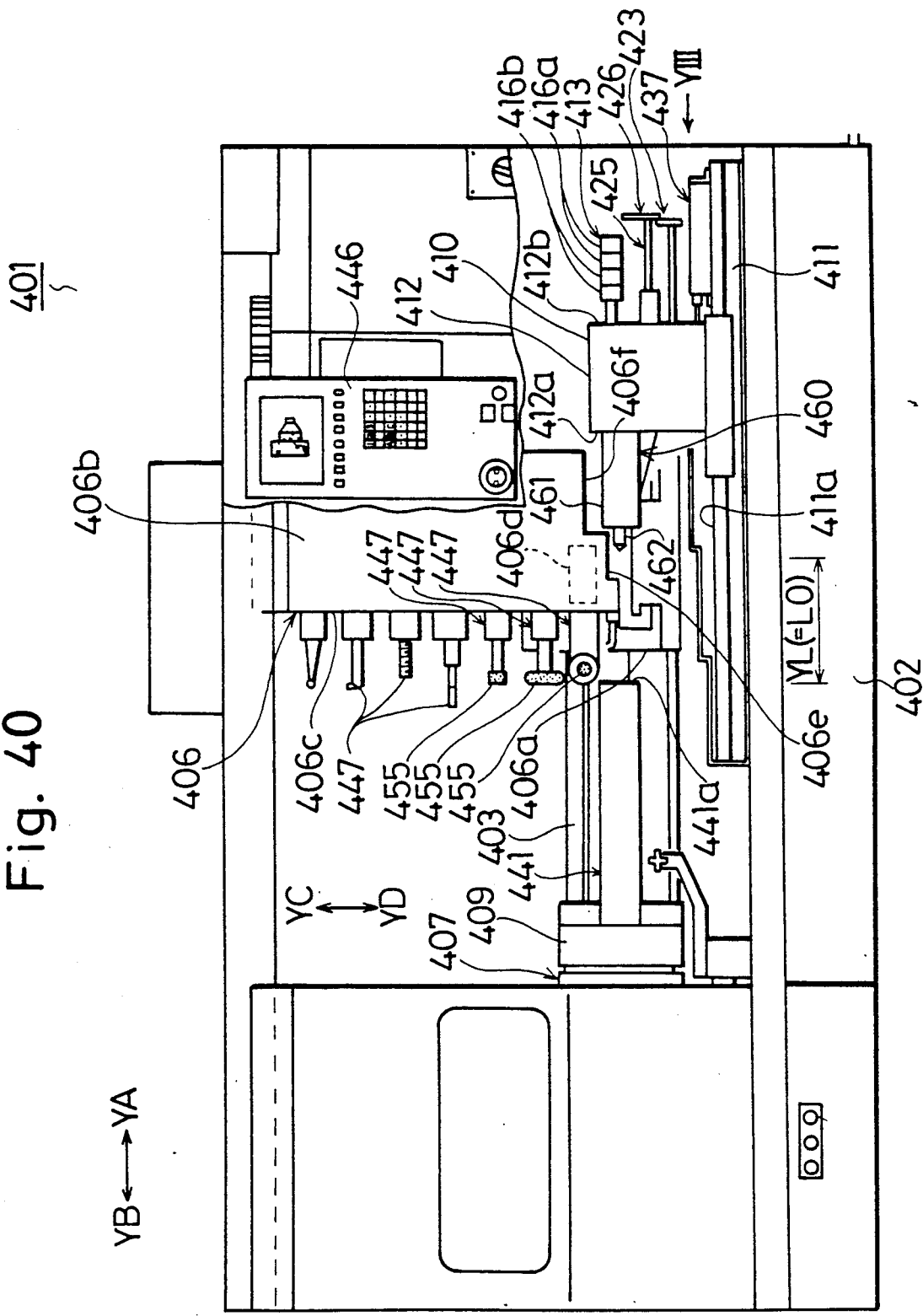
FIG. 40 is a front elevation for showing an embodiment of the complex machining machine tool with truing/dressing apparatus according to the present invention.

A complex machining machine tool 401 has a machine body 402 as shown in FIG. 40. With the machine body 402, a bed 403 is provided. A carrier 406a of which a tool rest 406 is comprised is supported on the bed 403 being free to move and drive along the bed 403 in the directions as shown by the arrows YA and YB (that is, Z axis direction). A tool rest main body 406b of which the tool rest 406 is comprised is provided with the carrier 406a being free to move and drive in the perpendicular direction to the directions as shown by the arrows YA and YB (that is, Z axis direction). A tool holding portion 406d is provided with the tool rest main body 406b as shown in FIG. 40. And, a chain type tool magazine 406c is provided with the tool rest main body 406b in such a manner that a lot of tools 447 storing in the magazine 406c can be selectively supplied with the tool holding portion 406d. Since the tool rest 406 having the chain type tool magazine 406c, the tool holding portion 406d and the like is well-known already, the detail explanation is omitted here.

A spindle stock 407 is provided with the left hand of the machine body 402 in FIG. 40. A chuck 409 is rotatably and drivably installed in the spindle stock 407 via the spindle which isn't shown in the figure. And, a workpiece 441 is held by the chuck 409 being free to detach and attach.

A dressing apparatus 410 is provided with the machine body 402 as shown in FIG. 40. The dressing apparatus 410 has a base 411, a main body 412, a driving cylinder 437, a tail-center portion 460 and the like as shown in FIG. 40. That is, the base 411 is provided with the machine body 402 in the shape of stretching in the directions as shown by the arrows YA and YB (that is, Z axis direction). The main body 412 is movably provided with the base 411 via guide rails 411a and 411a along the base 411 in the directions as shown by the arrows YA and YB (that is, Z axis direction). A machining electrode portion 413 is provided with the main body 412 as shown in FIG. 41, and the machining electrode portion 413 has a supporting shaft 415, machining electrodes 416a, 416b, a driving motor 421 and the like.

Figure 41:
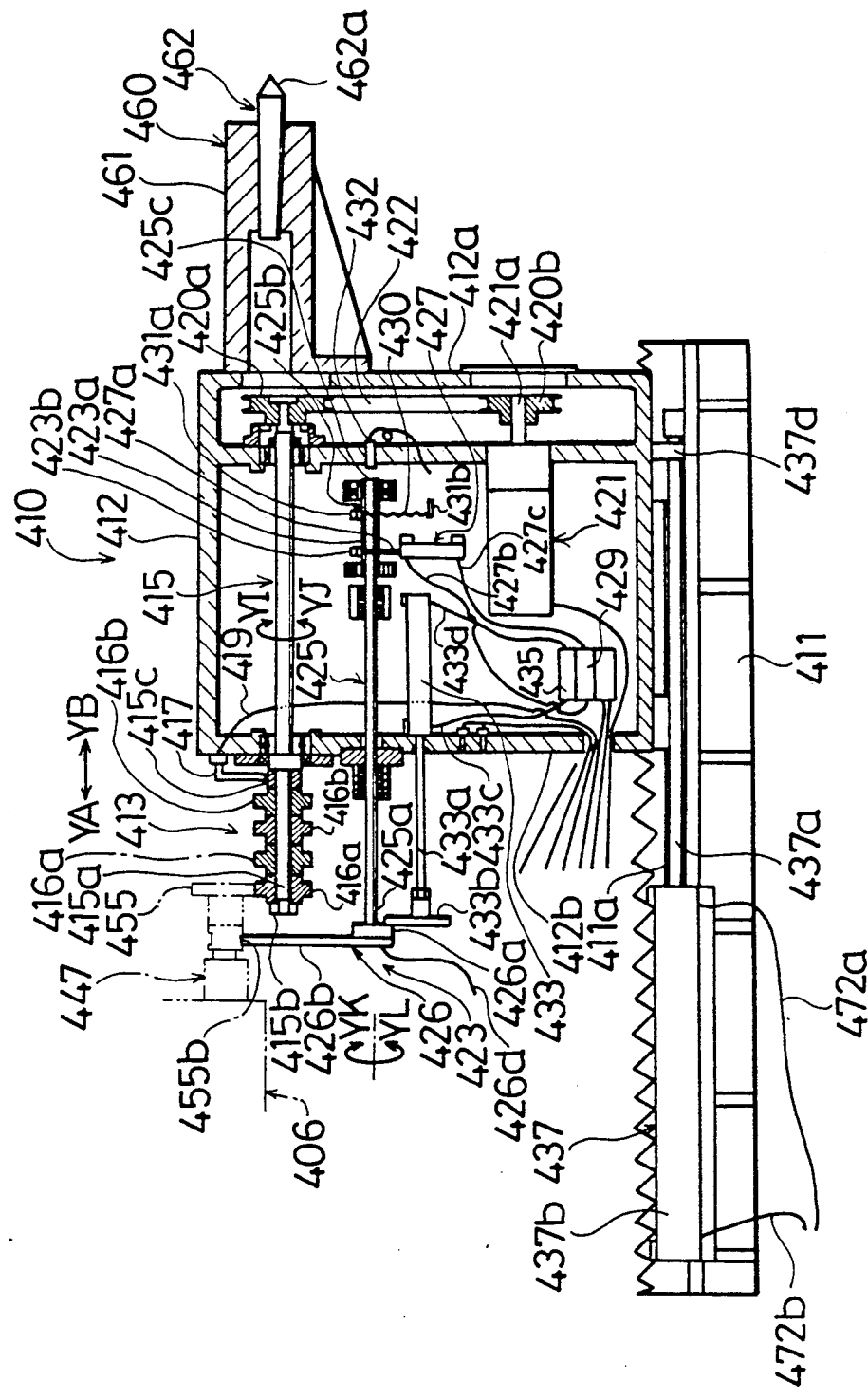
FIG. 41 is a back elevation of the truing/dressing apparatus portion of the complex machining machine tool as shown in FIG. 40.

That is, the supporting shaft 415 is provided with the main body 412 as shown in FIG. 41 via the plural number of bearings and the like in such a manner that the axis center is parallel with the directions as shown by the arrows YA and YB (that is, Z axis direction), and is rotatable in the directions as shown by the arrows YI and YJ. The electrode supporting portion 415a is formed at the supporting shaft 415 in the shape of projecting in the direction as shown by the arrow YA in comparison with the main body 412. An initial power receiving ring 415c having a circular annular form is fixed at the right edge portion of the electrode supporting portion 415a in the figure. And, the machining electrode 416a, 416a which is composed of copper for finishing truing and dressing and the machining electrode 416b, 416b which is composed of black lead for rough truing and dressing are installed in the electrode supporting portion 415a in the shape of being pushed to the initial power receiving ring 415c by means of the clamping member 415b. The electrode 417 connects with the initial power receiving ring 415c slidably. The electrode 417 is connected with the electric discharge unit which isn't shown in the figure via a feed cable 419.

Moreover, a pulley 420a is installed in the right edge portion of the supporting shaft 415 in FIG. 41. And, a driving motor 421 is provided with the lower edge portion of the main body 412 in the figure in the shape of being distant with the predetermined distance to the down portion in the figure from the supporting shaft 415. A driving shaft 421a is rotatably supported by the driving motor 421, and a pulley 420b is installed in the driving shaft 421a. A belt 422 having no edge is provided in the shape of being stretched between the pulley 420b and the pulley 420a being installed in the supporting shaft 415.

Figure 42:
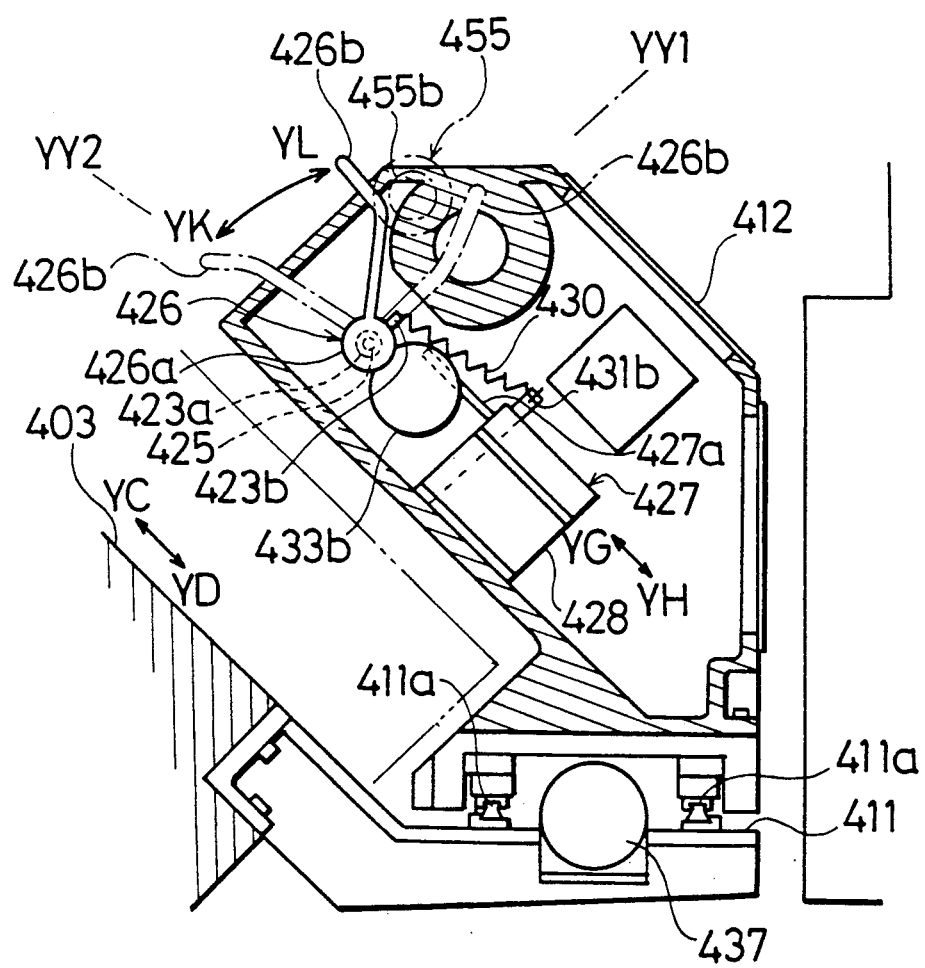
FIG. 42 is a view which is viewed from the direction of the arrow YIII of the complex machining machine tool in FIG. 40.

A electric feed mechanism for tool 423 is provided with the main body 412 as shown in FIG. 41, the electric feed mechanism for tool 423 has a supporting cylinder 423a, a rotating shaft 425, a cylinder for rotating 427, a positioning cylinder 433 and the like. That is, the supporting cylinder 423a being formed in a hollow state is provided with the main body 412 via the plural number of bearings being free to rotate only in the directions as shown by the arrows YK and YL. An engaging member 423b is provided with the outer circumference face of the supporting cylinder 423a in the shape of being bedded as shown in FIG. 42. The rotating shaft 425 is inserted and supported by the supporting cylinder 423a via the slidably moving means (not shown) such as a key being free to move only in the directions as shown by the arrows YA and YB (that is, Z axis direction) as shown in FIG. 41. A tool electrode 426 is installed in the left edge portion 425a of the rotating shaft 425 in the figure via a boss 426a of which the electrode 426 is comprised. A electrode bar 426b being formed in the shape of an elbow is provided with the boss 426a as shown in FIG. 42 in the shape of being capable of engaging and contacting with the above-described tool 427 and the like.

Moreover, the cylinder for rotating 427 is provided with the lower hand of the supporting cylinder 423a of the main body 412 in FIG. 41 via a base 428 as shown in FIG. 42. A rod 427a is supported by the cylinder for rotating 427 being free to project and retreat in the directions as shown by the arrows YG and YH. The cylinder for rotating 427 is connected with the solenoid valve 429 via tubes 427b and 427c as shown in FIG. 41. The solenoid valve 429 connects with the compressed air supply means which isn't shown in the figure.

A spring 430 is provided between the base 428 and the supporting cylinder 423a as shown in FIG. 42 in the shape of stretching via the supporting blocks 431a and 431b. The supporting cylinder 423a (that is, the rotating shaft 425) is always energized in the direction as shown by the arrow YL by means of the spring 430. A rotating shaft terminal acknowledge sensor 432 is provided with the main body 412 portion being distant with the predetermined distance from the right edge 425c of the rotating shaft 425 to the right hand in FIG. 41.

A positioning cylinder 433 of which the electric feed mechanism for tool is comprised is provided with the main body 412 as shown in FIG. 41 in the shape of being distant with the predetermined distance from the rotating shaft 425 to the lower hand in the figure. A rod 433a is supported by the positioning cylinder 433 being free to project and retreat in the directions as shown by the arrows YA and YB (that is, Z axis direction). A pressure plate 433b being formed in the shape of a disk is provided with the top edge portion of the rod 433a in the figure in such a manner that the above-described tool electrode 426 can be pressed in the direction as shown by the arrow YA. A solenoid valve 435 is connected with the positioning cylinder 433 via tubes 433c and 433d. The solenoid valve 435 connects with the compressed air supply source (not shown).

Figure 44:
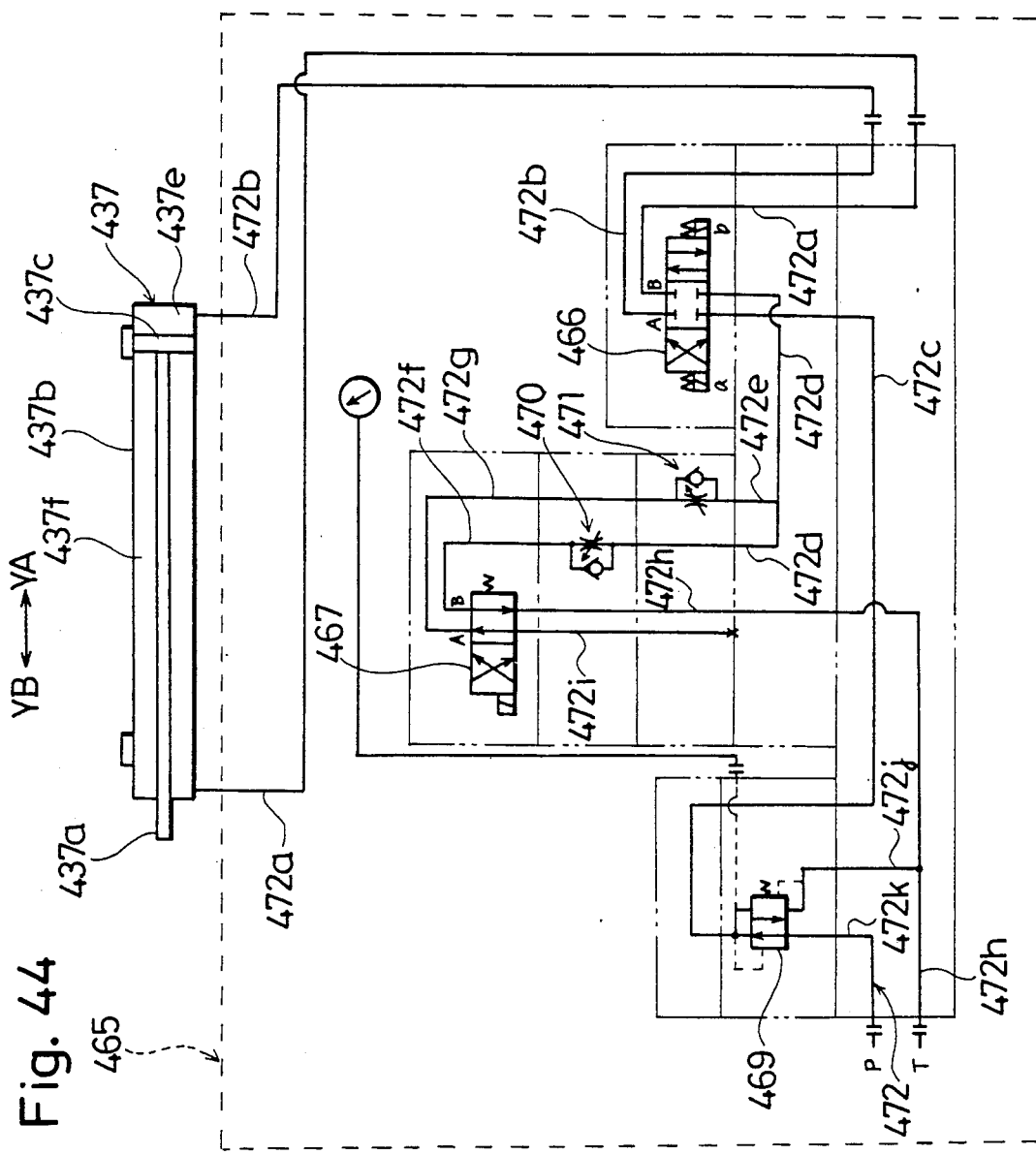
FIG. 44 is a hydraulic pressure circuit view for showing an example of the driving cylinder for moving the truing/dressing apparatus.

On the other hand, a driving cylinder 437 of which the dressing apparatus 410 is comprised is provided between the guide rails 411a and 411a on the base 411 of which the complex machining machine tool 401 is comprised as shown in FIG. 40 and FIG. 41. The driving cylinder 437 has a cylinder main body 437b being formed in the shape of a cylinder as shown in FIG. 41. A piston 437e is inserted and engaged in the main body 437b being free to move slidably in the directions as shown by the arrows YA and YB as shown in FIG. 44. Oil chambers 437e and 437f are formed in the main body 437b in the shape of being partitioned by the piston 437e. A rod 437a is installed in the piston 437b, and the top edge portion of the rod 437a connects with the lower surface in FIG. 41 of the main body 412 of which the dressing apparatus 410 is comprised via a connecting member 437d.

A hydraulic circuit 465 is connected with the driving cylinder 437, and the hydraulic circuit 465 has a solenoid controlled valves 466, 467, a pressure reducing valve 469, a speed control valve for high speed 470 having a little squeezing quantity, a speed control valve for low speed 471 having much squeezing quantity and the like. That is, the solenoid controlled valve 466 for performing the control between two positions connects with the oil chambers 437e and 437f of the cylinder main body 437b of the driving cylinder 437 via the oil paths 472a and 472b. The speed control valves 470 and 471 for high speed and low speed connect with the solenoid controlled valve 466 via the oil paths 472d and 472e respectively. The solenoid controlled valve 467 connects with the speed control valves for high speed and low speed 470 and 471 via the oil paths 472f and 472g, and the pressure reducing valve 469 connects with the solenoid controlled valve 467 via the oil paths 472h and 472j. The above-described solenoid controlled valve 466 connects with the pressure reducing valve 469 via the oil path 472c, and a hydraulic oil supply apparatus (not shown) connects with the pressure reducing valve 469 via the oil paths 472k and 472m.

A tail center portion 460 is provided with the main body 412 of the dressing apparatus 410 as shown in FIG. 40, and the tail center portion 460 has a tail sleeve 461, the center 462 and the like. That is, the tail sleeve 461 is provided with the back face 412a of the main body 412 as shown in FIG. 43 (that is, the face which faces the front face 412b with which the machining electrode portion 413 is provided among the faces of the main body 412). A center supporting hole 461a is provided with the tail sleeve 461 in the directions as shown by the arrows YA and YB (the right and left directions in FIG. 43). The center 462 is inserted and supported by the center supporting hole 461a, and a workpiece supporting portion 462a is formed at the top edge of the center 462 in the shape of a circular cone.

Figure 47:
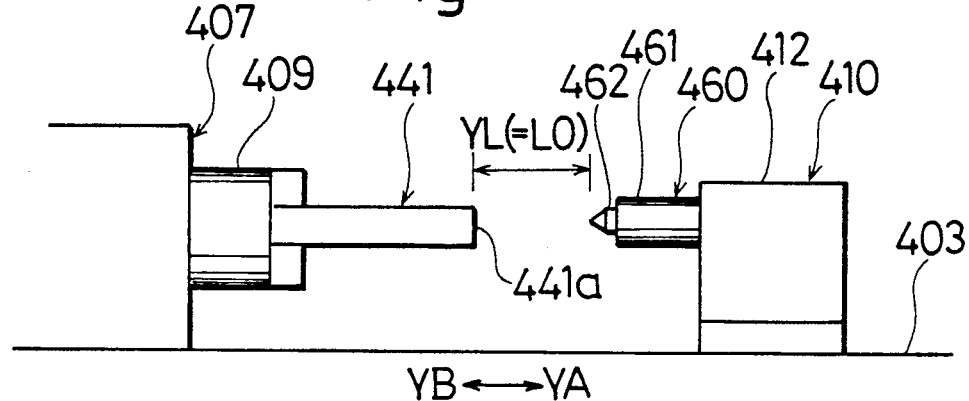
FIGS. 47 through 49 are views for showing the process at which one edge portion of the workpiece being held by the chuck is supported by means of the center portion of the dressing apparatus.
Figure 48:
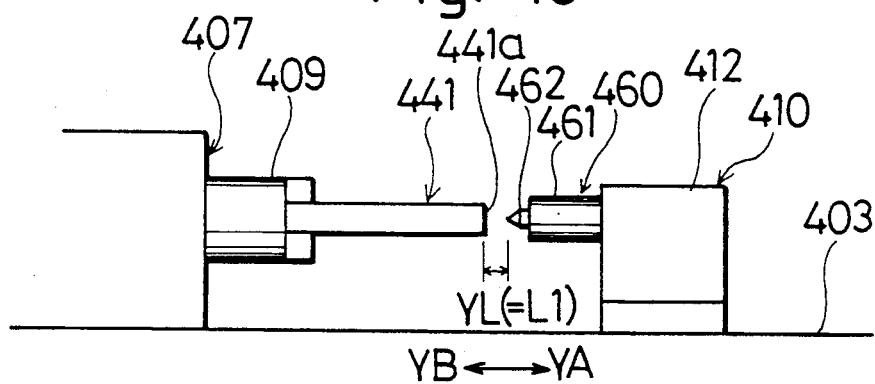

With the above-described constitution of the complex machining machine tool 401, in order to perform the center workpiece machining toward the workpiece 441 by means of the machine tool 401, the workpiece is projected with the predetermined length to the right hand in the figure in comparison with the chuck 441 and is clamped by the chuck 409 as shown in FIG. 40 at first. Thereafter, the right edge 441a of the workpiece 441 as shown in FIG. 47 is supported by the tail center 462 of the center portion 460 being provided with the back face 412a of the main body 412 of the dressing apparatus 410. For the sake of this, it is necessary that the dressing apparatus 410 is moved with the predetermined distance from the waiting position as shown in FIG. 40 and FIG. 47 in the direction as shown by the arrow YB by using the driving cylinder 437. The waiting position means the position at which the distance between the center 462 of the tail center portion 460 and the right edge 441a of the workpiece 441 in FIG. 40, that is to say, the access distance YL becomes the predetermined length L0. In order that the dressing apparatus 410 can be moved, the oil path 472c is connected with the oil path 472b and the oil path 472d is connected with the oil path 472a in such a manner that the pressure oil supply apparatus (not shown) is driven and moreover, the solenoid controlled valve 466 of the hydraulic circuit 465 as shown in FIG. 44 is driven. Then, the pressure oil is supplied with the oil chamber 437e in the cylinder main body 437b from the oil path 472k via the pressure reducing valve 469, the oil path 472c, the solenoid controlled valve 466 and the oil path 472b, and the hydraulic oil in the oil chamber 437f is drained via the oil path 472a, the solenoid controlled valve 466, the oil path 472d, the speed control valve for high speed 470, the solenoid controlled valve 467 and the oil path 472h. Then, the rod 437a moves at high speed in the direction as shown by the arrow YB in the shape of being pushed by the pressure oil being supplied with the oil chamber 437e via the piston 437c. Then, the main body 412 of the dressing apparatus 410 moves together with the tail center portion 460 in the direction as shown by the arrow YB in the shape of being pushed by the rod 437a via the connecting member 437d as shown in FIG. 41. When the tail center portion 460 moves toward the workpiece 441, and the access distance YL becomes the length L1 as shown in FIG. 48, the line 472g is connected with the line 472h by driving the solenoid controlled valve 467. Then, the hydraulic oil in the oil chamber 437f is drained via the oil path 472a, the solenoid controlled valve 466, the oil path 472d, 472e, the control valve having a little squeezing quantity 471 and the oil path 472h. Therefore, the speed at which the pressure oil is drained becomes slow. In result, the moving speed of the rod 437a in the direction as shown by the arrow YB becomes slow, and the main body 412 of the dressing apparatus 410 reduces in the moving speed in the direction as shown by the arrow YB.

Figure 49:
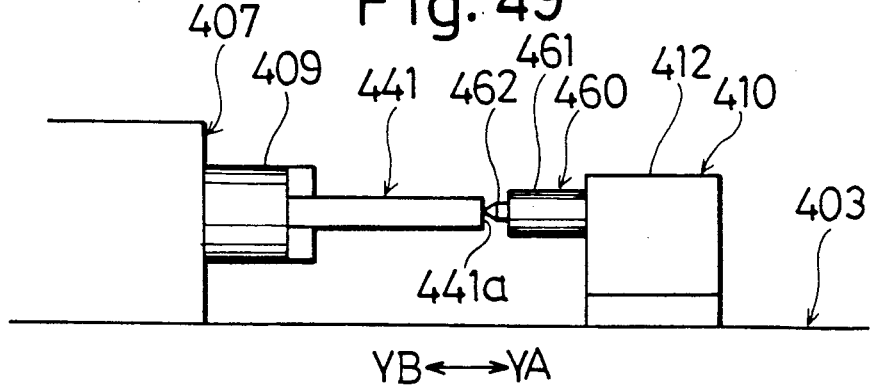

In this way, when the dressing apparatus 410 moves together with the tail center portion 460 in the direction as shown by the arrow YB, the access distance YL becomes 0 as shown in FIG. 49, the center 462 of the tail center portion abuts on the center hole (not shown) being provided with the right edge 441a of the workpiece 441 in the figure, and the workpiece 441 is supported rotatably. In this state, the tool 447 for grinding which is used for the machining is held by the tool holding portion 406d among the tools 447 being stored in the magazine 406c in such a manner that the chain type tool magazine 406c being installed in the tool rest 406 as shown in FIG. 40 is rotated and driven. Next, the chuck 409 is rotated together with the workpiece 441 at the predetermined rotating speed by driving the spindle stock 407 as shown in FIG. 40. And, the grinding stone 455 of the tool 447 is faced to the right edge portion of the workpiece 441 as shown in FIG. 45 in such a manner that the tool rest 406 is moved together with the grinding tool 447 in the direction as shown by the arrow YA or YB. Next, the tool for grinding 447 is driven to rotate. In this state, the tool rest 406 is fed with the predetermined quantity together with the tool 447 in the direction as shown by the arrow YD. Moreover, in this state, the outer circumference portion of the workpiece 441 is grinded with only the predetermined quantity in such a manner that the tool rest 406 is moved together with the tool 447 in the direction as shown by the arrow YB.

On this occasion, since the escape plane 406e and 406f are formed at the lower edge portion of the tool rest 406 in FIG. 43 in the shape of denting according to the form of the upper portion of the main body 412 of the dressing apparatus 410, the tool rest 406 don't interfere with the main body 412, and the workpiece 441 is smoothly grinded by means of the tool 447. And, on this occasion, since the workpiece 441 is rotatably supported by the center 462 of the tail center portion 460 in the right edge 441a in the figure, the deflection don't occur during the machining, and the grinding machining is performed toward the workpiece 441 accurately.

In case that the chucked workpiece machining is performed by means of the complex machining machine tool 401, the dressing apparatus 410 is moved as far as possible in the direction as shown by the arrow YA as shown in FIG. 46. In this state, the workpiece 441 to be machined is held by the chuck 409 in the shape of projecting with the predetermined length toward the right hand in the figure in comparison with the chuck 409. In this state, the chuck 409 is rotated together with the workpiece 441 at the predetermined rotating speed by driving the spindle stock 407. And, the tool for grinding 447 is faced to the right edge 441a in the figure of the workpiece 441 as shown in FIG. 46 in such a manner that the tool rest 406 is moved together with the tool for grinding 447 in the direction as shown by the arrow YA or YB and in the direction as shown by the arrow YD. Next, the tool for grinding 447 is driven to rotate, and the tool rest 406 is fed with the predetermined quantity together with the tool 447 in the direction as shown by the arrow YB. Moreover, in this state, the right edge 441a of the workpiece 441 is grinded with the predetermined quantity in such a manner that the tool rest 406 is moved together with the tool 447 in the directions as shown by the arrows YC and YD. On this occasion, since the escape plane 406f is formed at the tool rest 406, the tool rest 406 doesn't interfere with the main body 412 of the dressing apparatus 410 during the machining, and the right edge 441a of the workpiece 441 is smoothly grinded.

On this occasion, as described before, in case that the workpiece 441 to be machined is big in the projecting quantity in the direction as shown by the arrow YA in comparison with the chuck 409, the dressing apparatus 410 is moved and retreated in the direction as shown by the arrow YA in order that the tool rest 406 can't interfere with the dressing apparatus 410. For the sake of this, the oil path 472c is connected with the oil path 472a and the oil path 472d is connected with the oil path 472b by switching the solenoid controlled valve 466 of the hydraulic circuit 465 as shown in FIG. 44. Then, pressure oil is supplied with the oil chamber 437f in the cylinder main body 437b of which the driving cylinder 437 is comprised from the oil path 472k via the pressure reducing valve 469, the oil path 472c, the solenoid controlled valve 466 and the oil path 472a. And, the hydraulic oil in the oil chamber 437e is drained via the oil path 472b, the solenoid controlled valve 466, the oil path 472d, the speed control valve for high speed 470, the solenoid controlled valve 467 and the oil path 472h. Then, the rod 437a of the driving cylinder 437 moves via the piston 437c in the direction as shown by the arrow YA in the shape of being pulled by the pressure oil being supplied with the oil chamber 437f. Then, the dressing apparatus 410 moves and retreats together with the tail center portion 460 via the connecting member 437d as shown in FIG. 41 in the direction as shown by the arrow YA in the shape of being pulled by the rod 437a.

While the grinding machining is performing toward the workpiece 441 by means of the tool for grinding 447 being installed in the tool rest 406, the grinding stone 455 of the tool for grinding 447 generates blinding. In case that the blinding becomes ugly, it is necessary that dressing is performed toward the tool for grinding 447 in order to keep machining accuracy. Then, the dressing is performed by means of the dressing apparatus 410 as shown in FIG. 40 in state that the tool for grinding 447 is held by the tool holding portion 406d of the tool rest 406.

For the sake of this, the dressing apparatus 410 is pressed via the connecting member 437d in such a manner that the rod 437a is projected in the direction as shown by the arrow YB by driving the driving cylinder 437 as shown in FIG. 41. Then, the dressing apparatus 410 is positioned at the predetermined dressing position by moving in the direction as shown by the arrow YB. Thereafter, the operation at which the tool electrode 426 of the dressing apparatus 410 is connected with the tool for grinding 447 for performing dressing is performed. For the sake of this, at first, the rod 427a of the cylinder for rotating 427 is projected in the direction as shown by the arrow YG in FIG. 42 by switching the solenoid valve 429 as shown in FIG. 41. Then, the rod 427a abuts on the engaging member 423b being provided with the supporting cylinder 423a. And, in this state, the rod 427a moves the predetermined distance in the direction as shown by the arrow YG. Then, the supporting cylinder 423a rotates with the predetermined angle together with the rotating shaft 425 in the direction as shown by the arrow YK by resisting elasticity of the spring 430 in the shape of being pushed by the rod 427a via the engaging member 423b. Therefore, the tool electrode 426 being installed in the rotating shaft 425 rotates with the predetermined angle from the waiting position YY1 in FIG. 42 in the direction as shown by the arrow YK and is positioned at the connecting preparation position YY2.

Thereafter, the tool for grinding 447 for performing dressing is supplied with the tool holding portion 406d by rotating the chain type tool magazine 406c of the tool rest 406 as shown in FIG. 40 properly. Moreover, in this state, the tool is positioned at the position as shown by imaginary line in FIG. 41 in such a manner that the tool rest 406 is properly moved and driven together with the tool for grinding 447 in the directions as shown by the arrows YA and YB and in the directions as shown by the arrows YC and YD.

Next, in this state, the rod 427a of the cylinder for rotating 427 is retreated in the direction as shown by the arrow YH in FIG. 42 by switching the solenoid valve 429. Then, the engaging member 423b rotates with the predetermined angle together with the supporting cylinder 423a in the direction as shown by the arrow YL by the elasticity of the spring 430 since the regulation of the movement in the direction as shown by the arrow YL by the rod 427a is released. Therefore, the rotating shaft 425 being inserted and supported by the supporting cylinder 423a rotates with the predetermined angle together with the tool electrode 426 in the direction as shown by the arrow YL, and the electrode bar 426b of the tool electrode 426 contact with the tool for grinding 447 as shown by the imaginary line in FIG. 41 via the electrode connecting groove 455b in the shape of moving slidably.

In this way, when the tool electrode 426 is connected with the tool for grinding 447, the rod 433a of the positioning cylinder 433 is retreated together with the pressure plate 433b in the direction as shown by the arrow YB by driving the solenoid valve 435 as shown in FIG. 41. Then, the pressure plate 433b is positioned at the position being distant with the predetermined distance from the boss 426a of the tool electrode 426 in the direction as shown by the arrow YB.

And, the grinding stone 455 of the tool 447 is positioned at the position facing the electrode 416a for dressing in such a manner that the tool rest 406 as shown in FIG. 41 is moved with the predetermined distance together with the tool for grinding 447 in the direction as shown by the arrow YB. Then, the tool electrode 426 moves the predetermined distance via the electrode bar 426b being inserted in the electrode connecting groove 455b of the tool for grinding 447 in the direction as shown by the arrow YB in the shape of going after the tool 447 in such a manner that the rotating shaft 425 is pushed into the main body 412. On this occasion, since the electrode connecting groove 455b is formed at 90 degrees to the directions as shown by the arrows YA and YB (that is, Z axis direction) and the tool electrode 426 is always energized in the direction as shown by the arrow YL by the spring 430, the tool electrode 426 doesn't slip out of the electrode connecting groove 455b during the movement of the tool for grinding 447 in the direction as shown by the arrow YB.

In this state, the driving shaft 421a is rotated together with the pulley 420bby driving the driving motor 421 as shown in FIG. 41. Then, the supporting shaft 415 is rotated together with the machining electrodes 416a, 416a, 416b and 416b via the belt 422 and the pulley 420a in the direction as shown by the arrow YI or YJ. And, the grinding stone 455 of the tool for grinding 447 is rotated in the shape of being distant with the predetermined distance from the machining electrode 416a. Moreover, in this state, electricity is fed between the tool for grinding 447 and the machining electrode 416a via the feed cables 426d, 419 and the like by driving the electric discharge unit (not shown). Then, high voltage is charged between the grinding stone 455 of the tool for grinding 447 and the machining electrode 416a, electric discharge occurs, and current flows in the electric discharge circuit being formed by the electric discharge unit, the feed cable 426d, the tool electrode 426, the electrode connecting groove 455b, the grinding stone 455, the machining electrodes 416a and 416b, the initial power receiving ring 415c, the electrode 417 and the feed cable 419. Accordingly, the electric discharge machining is performed toward the outer circumference in the figure of the grinding stone 455 to perform dressing. On this occasion, since the electrode bar 426b of the tool electrode 426 contacts with the electrode connecting groove 455b of the tool for grinding 447 with the predetermined pressure by elasticity of the spring 430, the electrode bar 426b doesn't slip out of the electrode connecting groove 455b during the machining, and dressing is smoothly performed.

In this way, when the dressing is performed toward the grinding stone 455 of the tool for grinding 447, the solenoid valve 429 as shown in FIG. 41 is switched, and the rod 427a of the cylinder for rotating 427 is projected in the direction as shown by the arrow YG in FIG. 42. Then, the engaging member 423b is rotated with the predetermined angle together with the supporting cylinder 423a in the direction as shown by the arrow YK in the shape of resisting elasticity of the spring 430. Then, the rotating shaft 425 rotates with the predetermined angle together with the tool electrode 426 in the direction as shown by the arrow YK, the engaging state between the electrode 426 and the electrode connecting groove 455b is released, and the electrode 426 returns at the connecting preparation position YY2.

In this state, the tool 447 to which dressing has finished is retreated together with the tool rest 406 on the upper portion in FIG. 41. And, the rod 433a of the positioning cylinder 433 as shown in FIG. 41 is projected together with the pressure plate 433b in the direction as shown by the arrow YA by switching the solenoid valve 435. Then, the rotating shaft 425 moves in the direction as shown by the arrow YA in such a manner that the tool electrode 426 is pushed by the pressure plate 433b and is positioned at the predetermined waiting position.

When the rotating shaft 425 moves in the direction as shown by the arrow YA, the rod 427a of the cylinder for rotating 427 is retreated in the direction as shown by the arrow YH in FIG. 42 by driving the solenoid valve 429, and the engaging member 423b, that is to say, the supporting cylinder 423a is rotated with the predetermined angle in the direction as shown by the arrow YL by elasticity of the spring 430. Then, the rotating shaft 425 rotates with the predetermined angle together with the tool electrode 426 in the direction as shown by the arrow YL and returns to the waiting position YY1 from the connecting preparation position YY2.

Moreover, in this state, the rod 437a is retreated with the predetermined distance in the direction as shown by the arrow YA by driving the driving cylinder 437 as shown in FIG. 41. Then, the main body 412 of which the dressing apparatus 410 is comprised moves in the direction as shown by the arrow YA in the shape of being pulled via the connecting member 437d and is positioned at the waiting position as shown in FIG. 40.

Rough truing and finishing truing can be performed toward the tool 447 by the similar procedure to the case in which dressing is performed toward the tool for grinding 447. In case that rough truing is performed toward the tool for grinding 447, the grinding stone 455 of the tool 447 is faced to the machining electrode 416b for rough machining. In case of finishing truing, the grinding stone 455 is faced to the machining electrode 416a for finishing machining/ dressing. Then, electric discharge machining is performed.

In the above-described embodiment, it is mentioned that the tool for grinding 447 is supplied with the tool holding portion 406d of the tool rest 406, and the center work grinding machining and the chuck work grinding machining are performed toward the workpiece 441 by means of the tool for grinding 447. But, that isn't the thing. Various kinds of machining can be performed toward the workpiece 441 by supplying all kinds of tools 447 with the tool holding portion 406d. For instance, it is possible that the tool for turning 447 such as a cutting tool is supplied with the tool holding portion 406d, and turning machining is performed toward the workpiece 441 by the tool 447.

In the above-described embodiment, it is mentioned that the driving cylinder 437 as shown in FIG. 41 is used as moving and driving means of the dressing apparatus 410 in the directions as shown by the arrows YA and YB, and in case that dressing is performed toward the tool for grinding 447 being installed in the tool rest 406, the dressing apparatus 410 is moved with its maximum stroke from the waiting position in the direction as shown by the arrow YB to position at the predetermined dressing position by driving the driving cylinder 437. However, the moving and driving means of the dressing apparatus 410 isn't limited to the driving cylinder 437. Any actuator is available as long as the dressing apparatus 410 can be smoothly moved in the directions as shown by the arrows YA and YB. For instance, it is available that a servo-motor is connected with the main body 412 of the dressing apparatus 410 via a ball screw stretching in the directions as shown by the arrows YA and YB instead of the driving cylinder 437, the servo-motor is driven, the ball screw is rotated in the two reciprocal directions, and then, the dressing apparatus 410 is moved in the directions as shown by the arrows YA and YB (The servo-motor and the ball screw aren't shown in the figure.). This case is different from the case at which the dressing apparatus 410 is moved between the waiting position and dressing position by means of the driving cylinder 437, the movement quantity of the dressing apparatus 410 in the directions as shown by the arrows YA and YB can be optionally changed by controlling the rotating quantity of the ball screw, and dressing can be performed toward the tool for grinding 447 by means of the dressing apparatus 410 at the optional position on the machine body 402 as shown in FIG. 40.

That is, in case that the grinding stone 455 of the tool for grinding 447 generates the blinding during the center work grinding machining and the bad influence appears in machining accuracy, the grinding machining stops for a while, and the tool rest 406 is moved and retreated with the predetermined quantity together with the tool 447 in the direction as shown by the arrow YC. In this state, the tool rest 406 is moved with the predetermined distance together with the tool for grinding 447 in the direction as shown by the arrow YA. Moreover, the tool rest 406 is moved with the predetermined distance in the direction as shown by the arrow YD to position at the position as shown by the imaginary line in FIG. 41. Next, the electric feed mechanism for tool 423 is driven as described before, and the tool electrode 426 is connected with the tool for grinding 447. In this state, dressing is performed toward the grinding stone 455 of the tool 447 by the machining electrode portion 413. When dressing is performed toward the grinding stone 455, the connection between the tool 447 and the tool electrode 426 is released. In this state, the tool rest 406 is properly moved together with the tool 447 to which dressing is performed in the directions as shown by the arrows YC and YD and in the directions as shown by the arrows YA and YB. Then, the tool 447 is returned to the position as shown in FIG. 45 and the center work grinding machining is started again. On this occasion, since the dressing apparatus 410 supports by the center 462 at one edge of the workpiece 441 during dressing, the center work grinding machining can be started immediately after the dressing of the tool for grinding 447.

The another embodiment of the present invention will be explained in FIGS. 50 through 52.

Figure 50:
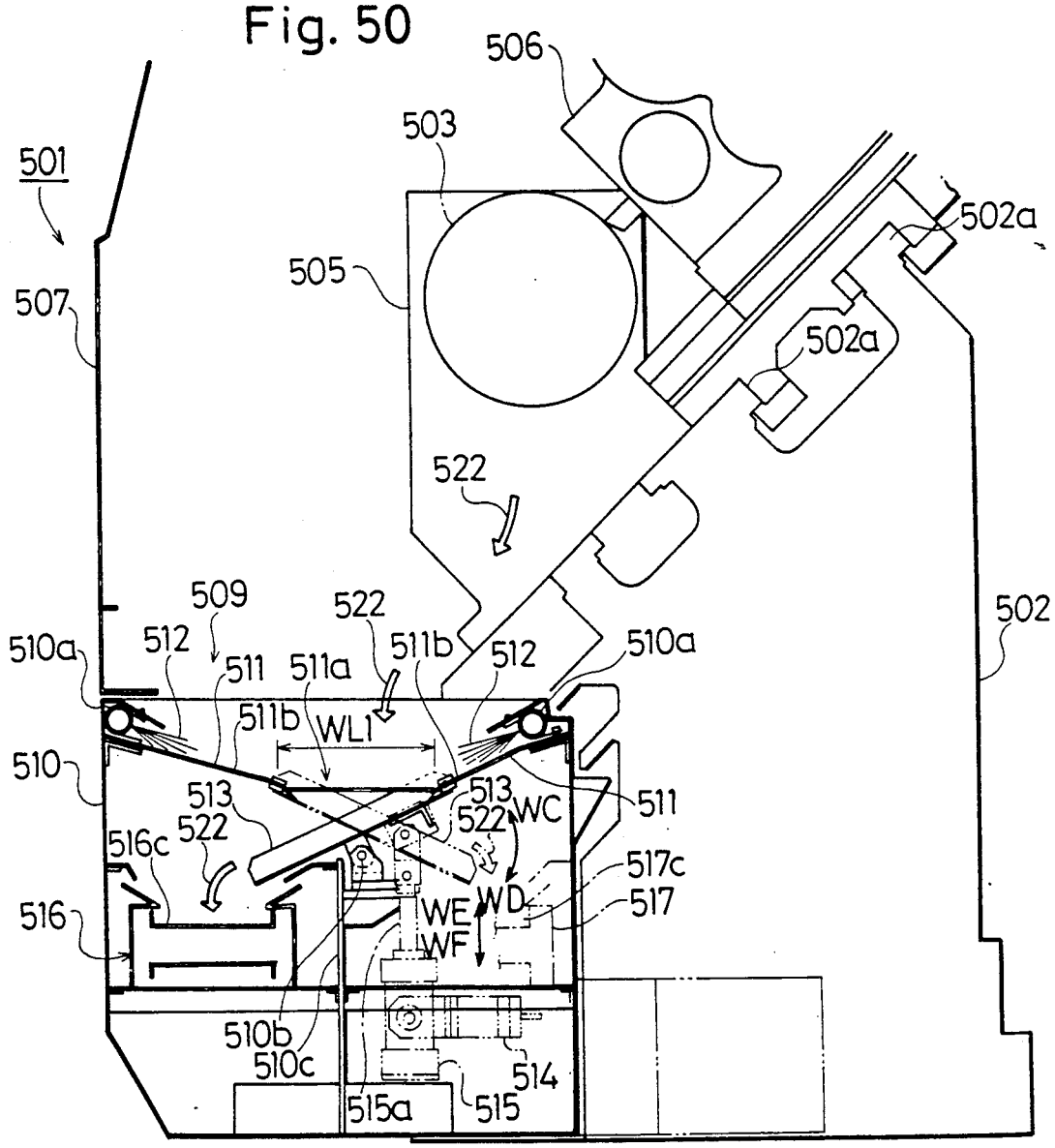
FIG. 50 is a sectional view for showing an embodiment of the chip collecting apparatus according to the present invention.

A machine tool 501 such as a lathe has a bed 502 as shown in FIG. 50. A spindle stock 505 by which the workpiece spindle 503 is rotatably supported is provided on the bed 502. A guide rail 502a is formed at the bed 502 in the perpendicular direction to the paper of the figure (Z axis direction), and a tool rest 506 for installing the tool is movably supported by the guide rail 502a. A cover 507 is provided with the front face of the bed 502, that is to say, the left hand in the figure in the shape of covering the whole machine tool 501, and a chip collecting apparatus 509 according to the present invention is provided with the lower hand of the cover 507 in the figure, the front of the bed 502.

Figure 51:
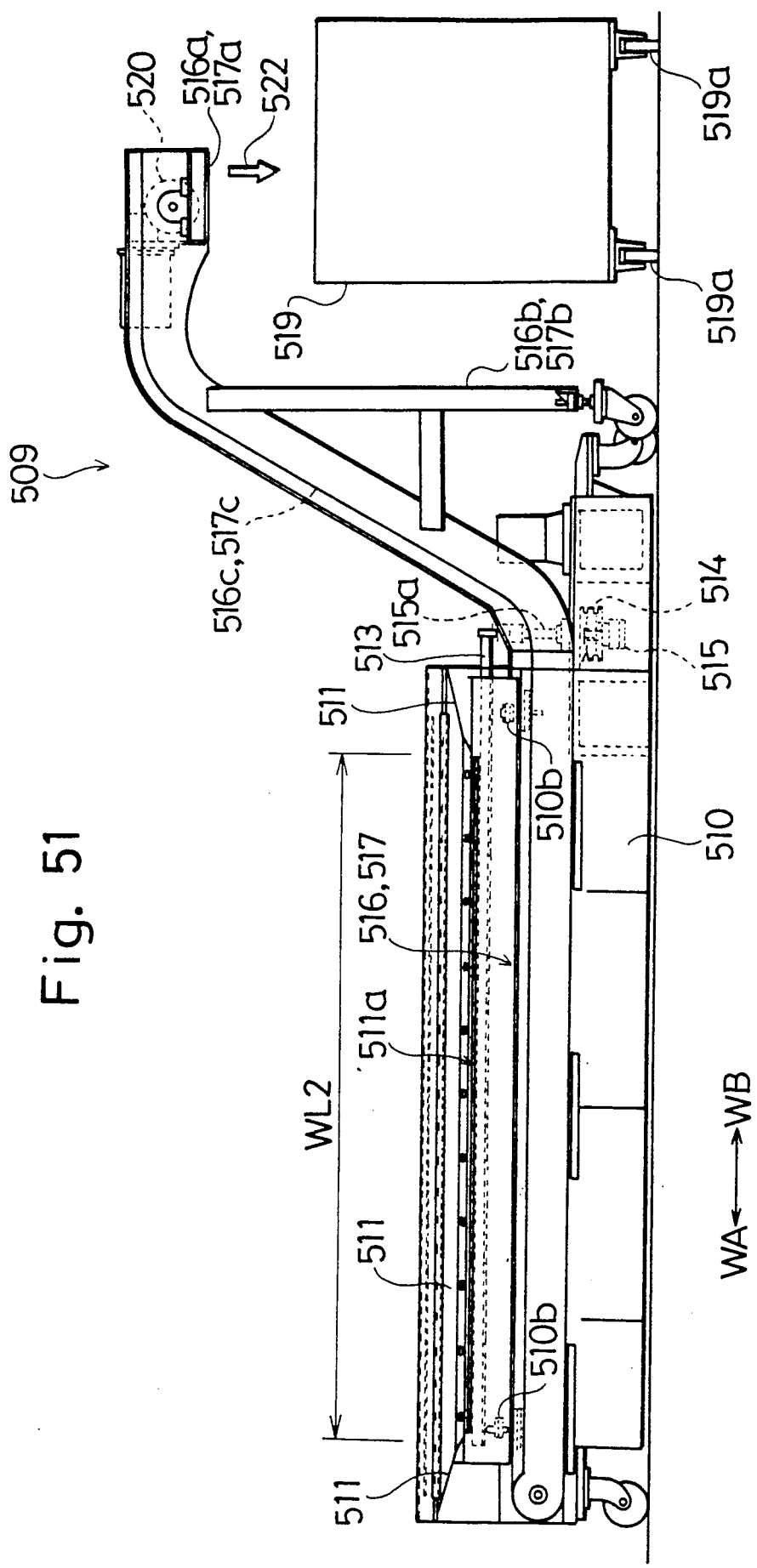
FIG. 51 is a front elevation of the chip collecting apparatus of FIG. 50.

The chip collecting apparatus 509 has a frame 510 which is formed as a whole in a box shape as shown in FIG. 50 and FIG. 51, and chip pans 511 and 511 are disposed on the upper portion of the frame 510 in FIG. 50 in the shape of facing each other in the perpendicular direction to the paper in FIG. 50, that is, in the directions as shown by the arrows WA and WB in FIG. 51. The chip pans 511 and 511 are formed obliquely in such a manner that the nearer portion to the center portion in FIG. 50 becomes lower, and in the shape of a funnel in the whole as shown in FIG. 51. A chip falling space 511a is formed at the center having the width WL1 and the length WL2. Washing pipes 510a and 510a are formed at both sides of the chip pans 511 and 511 in FIG. 50 along the chip pans 511 and 511 in the perpendicular direction to the paper face. A lot of discharge holes which aren't shown in the figure are provided with each washing pipe 510a in the installation direction of the chip pans 511 and 511 in order to discharge the coolant 512 for washing toward the chip pan face 511b.

At the down portion of the chip falling space 511a in FIG. 50, a change-over plate 513 being formed in the shape of ranging over the entire length in the directions as shown by the arrows WA and WB in FIG. 51 is supported at the both sides via the pins 510b and 510b by the frame 510 being free to rotate and move in the directions as shown by the arrows WC and WD in FIG. 50. A driving cylinder 515 is provided near the pin 510b of the right hand in FIG. 51 of the change-over plate 513 via a bracket 514 being fixed to the frame 510 between the change-over plate 513 and the frame 510. A rod 515a is provided with the driving cylinder 515 being free to project and drive in the directions as shown by the arrows WE and WF, and the top edge of the rod 515a is connected with the change-over plate 513 being free to rotate and move.

A pair of chip conveyers 516 and 517 are disposed at the down portion of the change-over plate 513 in FIG. 50 via a partition plate 510c in the directions as shown by the arrows WA and WB (The only a part of the chip conveyer 517 is shown in FIG. 50.), and those chip conveyers 516 and 517 project from the right side face of the frame 510 in the figure to the outside in the shape of stretching to the right hand in FIG. 51 in the frame 510. The chip conveyers 516 and 517 stretch in the gentle S-form at the upper portion in the figure in the shape of being supported by the legs 516b and 517b, and chip elimination orifices 516a and 517a are provided with the top edge in the shape of opening toward the down portion in the figure. Two chip boxes 519 being in a row in the perpendicular direction to the paper face in FIG. 51 are provided with the down portion of the chip elimination orifices 516a and 517a being free to move via wheels 519a being provided with the down faces of the chip boxes 519. In the chip conveyer 516, 517, velt 516c, 517c having no edge and being provided for delivering the chip is provided between the left edge portion of the frame 510 in FIG. 51 and the chip elimination orifice 516a, 517a of the chip conveyer 516, 517, that is, in the directions as shown by the arrows WA and WB in the frame 510. Motor 520, 520 are disposed at the edge portion of the chip elimination orifice 516a, 517a side. The motors 520 are provided with the chip conveyers 516 and 517 respectively. Therefore, the chip conveyer 516, 517 can be driven selectively by driving the motor 520 selectively.

With the above-described constitution of the machine tool 501 and the chip collecting apparatus 509 and the like, in case that the workpiece which is composed of the first material is machined by means of the machine tool 501, the workpiece is installed in the workpiece spindle 503 of the spindle stock 505. In this state, the predetermined machining such as turning, grinding and milling machining is performed by means of the tool being installed in the tool rest 506 in such a manner that the workpiece spindle 503 is rotated together with the workpiece. The chip 522 which is generated during the machining falls to the down portion in FIG. 50 on the bed 502 and falls on the chip pan 511, 511 of the chip collecting apparatus 509. A coolant 512 is always spouted from the washing pipe 510a to the chip pan 511, 511, and the chip 522 which falls on the chip pan 511, 511 is moved in the shape of washing and falling into the chip falling space 511a being formed at the center portion of the chip pan 511, 511 by means of spouting coolant 512.

The chip 522 which is flowed together with the coolant 512 into the chip falling space 511a falls on the change-over plate 513. On this occasion, the change-over plate 513 is in a state that the rod 515a of the driving cylinder 515 is projected in the direction as shown by the arrow WE. Accordingly, the change-over plate 513 is in a state of rotating and moving with the pin 510b, 510bas its center in the direction as shown by the arrow WC. Then, the chip falling space 511a is in a state of communicating with the chip conveyer 516 of the left side in FIG. 50, and the chip 522 which falls on the change-over plate 513 falls on the belt 516c of the chip conveyer 516 by means of the coolant 512 furthermore. The coolant 512 passes through the chip conveyer 516 and is retrieved in the drain tank which isn't shown in the figure, and is fed to the washing pipe 510a side by a circulating pump for reclamation. Moreover, when the coolant 512 falls to the down portion in FIG. 50 from the chip conveyer 516, the chip 522 remains on the belt 516c of the chip conveyer 516. Then, the motor 520 of the chip conveyer 516 side is rotated and driven, the belt 516c is moved and driven between the chip elimination orifice 516a and the chip falling space 511a, the chip 522 which falls on the belt 516c is conveyed to the chip elimination orifice 516a, and the chip 522 is discharged in the chip box 519 being disposed at the down portion of the elimination orifice 516a from the chip elimination orifice 516a.

In this way, while the workpiece which is composed of one kind of material is being machined, the change-over plate 513 is kept in state of rotating and moving in the direction as shown by the arrow Wc in FIG. 50, and all the chip 522 which is generated during machining is fell to the chip conveyer 516 side and is retrieved.

In case that the material of a workpiece to be machined changes from the first material into the second material, before the start of machining, the coolant 512 is flowed via the washing pipe 510a, the chip 522 which adheres to the chip pan 511, 511 and which is composed of the first material is washed and fell to the chip conveyer 516 side. When this washing operation finishes, the rod 515a of the driving cylinder 515 is retreated in the direction as shown by the arrow WF. Then, the change-over plate 513 rotates and moves by the retreat of the rod 515a via the pin 510bin the direction as shown by the arrow WD, the communication between the chip falling space 511a and the chip conveyer 516 is broken, the breaking state being generated by the change-over plate 513 between the chip falling space 511a and the chip conveyer 517 being provided with the right side in FIG. 50 is released, and the chip falling space 511a and the chip conveyer 517 are communicated with each other.

In this state, the motor 520 of the chip conveyer 517 side is rotated and driven, the belt 517c of the chip conveyer 517 side is driven, and the machining of the workpiece of the second material which is different from the prior is started. Then, the chip 522 which is generated during machining falls from the chip pan 511, 511 to the change-over plate 513 in the shape of being washed and being flowed by means of the coolant 512 as described before. Moreover, the chip 522 is discharged from the change-over plate 513 to the chip conveyer 517 side and is expelled from the chip elimination orifice 517a into the other chip box 519 being disposed at the down portion of the elimination orifice 517a by the same procedure.

In this way, in case that the workpiece which is composed of the first material is machined again when the machining of the workpiece being different in material is performed and the machining finishes, as the above-described case, washing by the washing pipe 510a is performed during the predetermined time, thereafter the driving cylinder 515 is driven to rotate and move the change-over plate 513 in the direction as shown by the arrow WC again, the chip falling space 511a and the dhip conveyer 516 are communicated with each other, and the communicating state is broken between the chip conveyer 517 and the chip falling space 511a. In this state, when the maching is started toward the workpiece of the first material, the chip 522 is fallen to the chip conveyer 516 side by the change-over plate 513 and is stored in the chip box 519 in which the chip 522 was stored when the machining of the workpiece of the first material was perfomed at last time.

In the above-described embodiment, it is mentioned that the change-over plate 513 is provided with the machine tool side in the chip collecting apparatus 509, that is to say, the chip collection side. However, the installation position of the change-over plate 513 isn't restricted to the chip collection side. It is off course that the change-over plate 513 can be provided with the chip elimination orifice side at which the chip is thrown in the chip box. The case in which the change-over plate is provided with the chip elimination orifice side at which the chip is thrown in the chip box will be explained in FIG. 52 hereinafter. The explanation of the same portion with the explained portion in FIGS. 50 and 51 is omitted by using the same numerals.

A chip collecting apparatus 527 has a chip conveyer 523 as shown in FIG. 52. In the chip conveyer, only one is provided. This is different from the prior case in FIG. 50. At the down portion in the figure of the chip elimination orifice 523a of the chip conveyer 523, a change-over plate 525 is supported by the frame 510 being free to rotate and move in the directions as shown by the arrows WG and WH via the shaft 525a. An arm 525b is provided with one edge of the shaft 525a. The top edge of the rod 526a of the driving cylinder 526 being rotatably supported by the frame 510 is connected to the arm 525b being free to rotate and move. Moreover, two chip boxes 519 and 519 are disposed at the down portion of the change-over plate 525 in the figure.

With the above-described constitution of the chip collecting apparatus 527, the chip 522 which is generated at the machine tool 501 side falls together with coolant in the chip conveyer 523 in the frame 510 as the regular chip collecting apparatus, and only chip 522 is conveyed to the chip elimination orifice 523a side being provided at the right upper portion in the figure in the shape of being separated from coolant by means of the chip conveyer 523. The chip 522 which is conveyed to the chip elimination orifice 523a falls and is expelled on the change-over plate 525 immediately. On this occasion, regarding to the change-over plate 525, the rod 526a of the driving cylinder 526 is properly projected and retreated according to the material of the workpiece which is machined by the machine tool 501. When the rod 526a projects, the change-over plate 525 rotates and moves via the shaft 525a in the direction as shown by the arrow WH, and the chip elimination orifice 523a is connected with the chip box 519 being at the right side in the figure. When the rod 526a retreats, the change-over plate 525 rotates and moves via the shaft 525a in the direction as shown by the arrow WG, and the chip elimination orifice 523a is connected with the chip box 519 being at the left side in the figure. Accordingly, the chip 522 is thrown and stored in the chip box 519 according to the material in such a manner that the driving cylinder 526 is driven on the basis of manual operation or the machining program whenever the material of the workpiece to be machined changes, and the change-over plate 525 is properly switched in the direction as shown by the arrow WG or WH.

The present invention is explained on the basis of the embodiments hereinbefore. However, the embodiments which is described in the present specification is illustrative, not limited. And, the scope of the invention is designated by the accompanying the claims and isn't restricted by the description of the embodiments. Accordingly, all the transformation and change belonging to the claims are included in the scope of the present invention.

We claim:

1. A machine tool having an electric discharge truing and dressing apparatus with a grinding function, comprising:
   a single machine body;
   a workpiece spindle mounted on said machine body so as to be free to be rotated;
   a holding means on said workpiece spindle for selectively holding a workpiece or an electrode for performing electric discharge truing and dressing on a grinding stone for performing grinding machining on the workpiece;
   a tool rest mounted on said machine body so as to be free to be moved and driven;
   a turning tool for turning an electrode and a grinding stone installed on said tool rest so as to be free to be selectively used;
   an electricity feed means and a contact means for electrically contacting said electricity feed means with said holding means and said tool rest when electric discharge truing and dressing is performed on said grinding stone while an electrode is held by said holding means;
   a storage magazine for storing a plurality of workpieces and a plurality of electrodes; and
   a loading means for carrying a workpiece or an electrode between said storage magazine and said workpiece spindle.

2. The machine tool as set forth in claim 1, wherein said contact means comprises a feed electricity brush movably disposed adjacent said holding means and a feed electricity brush disposed adjacent said tool rest and means for selectively urging said feed electricity brushes against and away from said holding means and said tool rest, respectively.

3. The machine tool as set forth in claim 1, wherein said loading means is disposed on said single machine body.

4. The machine tool as set forth in claim 3, wherein said loading means comprises a loading arm pivotably mounted on a side surface of said single machine body, said arm having a clamp at an end thereof.

5. A method of truing and dressing a grinding stone in a machine tool, said machine tool comprising:
   a single machine body;
   a workpiece spindle mounted on said machine body so as to be free to be rotated;
   a holding means on said workpiece spindle for selectively holding a workpiece or an electrode for performing electric discharge truing and dressing on a grinding stone for performing grinding machining on the workpiece;
   a tool rest mounted on said machine body so as to be free to be moved and driven;
   a turning tool for turning an electrode and a grinding stone installed on said tool rest so as to be free to be selectively used;
   an electricity feed means and a contact means for electrically contacting and said electricity feed means with said holding means and said tool rest when electric discharge truing and dressing is performed on said grinding stone while an electrode is held by said holding means;
   a storage magazine for storing a plurality of workpieces and a plurality of electrodes; and
   a loading means for carrying a workpiece or an electrode between said storage magazine and said workpiece spindle;
   wherein said machine tool is used for grinding machining a workpiece with said grinding stone on said tool rest while the workpiece is held by said holding means;
   said method of truing and dressing a grinding stone comprising:
   loading an electrode corresponding to a grinding stone on which electric discharge truing and dressing is to be performed onto said workpiece spindle from said magazine with said loading device;
   performing a turning machining operation on said electrode with said turning tool installed on said tool rest so as to shape said electrode into a form corresponding to said grinding stone on which electric discharge truing and dressing is to be performed;
   positioning said grinding stone on which electric discharge truing and dressing is to be performed on said tool rest at a predetermined truing and dressing position, and actuating said contact means such that said electricity feed means, said holding means and said tool rest are electrically contacted with each other; and
   performing electric discharge truing and dressing on said grinding stone installed on said tool rest with said electrode shaped by said turning tool and by said holding means;
   wherein said grinding machining of said workpiece with said grinding stone, said step of turning machining of said electrode for performing electric discharge truing and dressing on said grinding stone and said step of electric discharge truing and dressing on said grinding stone with said shaped electrode are all performed on said single machine body.

6. A machine tool having an electric discharge truing and dressing apparatus with a grinding function, comprising:

a single machine body;

a workpiece spindle mounted on said machine body so as to be free to be rotated and driven about an axis parallel to a first direction;

a workpiece holding means on said workpiece spindle for holding a workpiece;

a tool rest mounted on said machine body so as to be free to be moved and driven;

a turning tool for turning an electrode and a grinding stone installed on said tool rest so as to be free to be selectively used;

an electrode holding means for holding an electrode, provided above said workpiece spindle so as to be free to be rotated and driven about an axis parallel to said first direction; and an electrode for performing electric discharge truing and dressing on said grinding stone rotatably provided on said electrode holding means.

7. The machine tool as set forth in claim 6, wherein said electrode holding means is disposed on said single machine body.

8. The machine tool as set forth in claim 6, wherein said loading means is disposed on said single machine body.

9. The machine tool as set forth in claim 8, wherein said loading means comprises a loading arm pivotably mounted on a side surface of said single machine body, said arm having a clamp at an end thereof.

10. A machine tool having an electric discharge truing and dressing apparatus with a grinding function, comprising:

a single machine body;

a workpiece spindle mounted on said machine body so as to be free to be rotated and driven about an axis parallel to a first direction;

a workpiece holding means on said workpiece spindle for holding a workpiece;

a tool rest mounted on said machine body so as to be free to be moved and driven;

a turning tool for turning an electrode and a plurality of grinding stones installed on said tool rest so as to be free to be selectively used;

a turret mounted above said workpiece spindle so as to be free to be indexed and rotated;

a plurality of electrode holding means for holding electrodes on said turret so as to be free to be rotated and driven about an axis parallel to said first direction; and a plurality of electrodes for performing electric discharge truing and dressing on said grinding stones, wherein said plurality of electrodes are rotatably provided on said plurality of electrode holding means.

11. The machine tool as set forth in claim 10, wherein said turret is mounted on said single machine body.

12. The machine tool as set forth in claim 10, wherein said loading means is disposed on said single machine body.

13. The machine tool as set forth in claim 12, wherein said loading means comprises a loading arm pivotably mounted on a side surface of said single machine body, said arm having a clamp at an end thereof.

14. A method of truing and dressing a grinding tool in a machine tool, said machine tool comprising:

a single machine body;

a workpiece spindle mounted on said machine body so as to be free to be rotated and driven about an axis parallel to a first direction;

a workpiece holding means on said workpiece spindle for holding a workpiece;

a tool rest mounted on said machine body so as to be free to be moved and driven;

a turning tool for turning an electrode and a grinding stone installed on said tool rest so as to be free to be selectively used;

an electrode holding means for holding an electrode, provided above said workpiece spindle so as to be free to be rotated and driven about an axis parallel to said first direction; and an electrode for performing electric discharge truing and dressing on said grinding stone rotatably provided on said electrode holding means;

wherein said machine tool is used for performing grinding maching on said workpiece with said grinding stone on said tool rest while said workpiece is held by said workpiece holding means;

said method of truing and dressing a grinding stone comprising:

performing a turning maching on said electrode held by said electrode holding means with said turning tool on said tool rest by rotating said electrode holding means so as to shape said electrode into a form corresponding to said grinding stone on which electric discharge truing and dressing is to be performed;

positioning said grinding stone on said tool rest, on which electric discharge truing and dressing is to be performed, at a predetermined truing and dressing position; and performing electric discharge truing and dressing on said grinding stone installed on said tool rest with said shaped electrode held by said electrode holding means;

wherein performing said machining on said workpiece with said grinding stone, said step of turning maching said electrode for performing electric discharge truing and dressing on said grinding stone and said step of performing electric discharge truing and dressing on said grinding stone with said shaped electrode are performed on said single machine body.

15. A machine tool having an electric discharge truing and dressing apparatus with a grinding function, comprising:

a single machine body;

a workpiece spindle mounted on said machine body so as to be free to be rotated and driven about an axis parallel to a first direction;

a workpiece holding means on said workpiece spindle for holding a workpiece;

a tool rest mounted on said machine body so as to be free to be moved and driven;

a turning tool for turning an electrode and a grinding stone installed on said tool rest so as to be free to be selectively used;

an electrode holding means for holding an electrode, provided above said workpiece spindle so as to be free to be rotated and driven about an axis parallel to said first direction;

an electrode for performing electric discharge truing and dressing on said grinding stone rotatably provided on said electrode holding means;

an electricity feed means for feeding electricity during electric discharge machining between said electrode holding means and said tool rest;

a storage magazine for storing a plurality of workpieces on which grinding machining is to be performed and a plurality of electrodes; and a loading device for carrying a said workpiece and/or a said electrode between said storage magazine and said workpiece spindle and said electrode holding means.

16. A truing and dressing method of a grinding stone in a machine tool, said machine tool comprising:

a single machine body;

a workpiece spindle mounted on said machine body so as to be free to be rotated and driven about an axis parallel to a first direction;

a workpiece holding means on said workpiece spindle for holding a workpiece;

a tool rest mounted on said machine body so as to be free to be moved and driven;

a turning tool for turning an electrode and a grinding stone installed on said tool rest so as to be free to be free to be moved and driven;

an electrode holding means for holding an electrode, provided above said workpiece spindle so as to be free to be rotated and driven about an axis parallel to said first direction;

an electrode for performing electric discharge truing and dressing on said grinding stone rotatably provided on said electrode holding means;

an electricity feed means for feeding electricity during electric discharge machining between said electrode holding means and said tool rest;

a storage magazine for storing a plurality of workpieces on which grinding machining is to be performed and a plurality of electrodes; and a loading device for carrying a said workpiece and/or a said electrode between said storage magazine and said workpiece spindle and said electrode holding means;

wherein said machine tool is used for performing grinding machining on said workpiece with said grinding stone on said tool rest while said workpiece is held with said workpiece holding means;

said truing and dressing method of a grinding stone comprising:

loading said electrode holding means with said electrode corresponding to said grinding stone on which electric discharge truing and dressing is to be performed from said magazine;

performing a turning machining on said electrode with said turning tool on said tool rest so as to shape said electrode into a form corresponding to said grinding stone on which electric discharge truing and dressing is to be performed;

positioning said grinding stone on which electric discharge truing and dressing is to be performed on said tool rest at a predetermined truing and dressing position; and performing an electric discharge truing and dressing operation on said grinding stone installed on said tool rest with said shaped electrode held by said electrode holding means;

wherein performing said grinding machining on said workpiece with said grinding stone, said step of turning machining said electrode for performing electric discharge truing and dressing on said grinding stone and said step of performing an electric discharge truing and dressing operation on said grinding stone with said shaped electrode are all performed on said single machine body.

* * * * *